United States Patent [19]
Mark

[11] Patent Number: 5,732,133
[45] Date of Patent: Mar. 24, 1998

[54] SYSTEM AND METHOD FOR SELECTING AND GENERATING TELEPHONE ACCESS NUMBERS FOR LIMITING ACCESS TO A TELEPHONE SERVICE

[75] Inventor: Andrew R. Mark, New York, N.Y.

[73] Assignee: Smart Tone Authentication, Inc., New York, N.Y.

[21] Appl. No.: 660,370

[22] Filed: Jun. 7, 1996

Related U.S. Application Data

[62] Division of Ser. No. 286,825, Aug. 5, 1994, Pat. No. 5,583,933.

[51] Int. Cl.[6] .................... H04M 1/00; H04M 3/16
[52] U.S. Cl. .................... 379/355; 379/95; 379/196; 379/201; 379/280; 379/288
[58] Field of Search ............................ 379/201, 216, 379/200, 95, 199, 355, 131, 196, 112, 192, 188, 189, 190, 356, 361, 67, 280, 288

[56] References Cited

U.S. PATENT DOCUMENTS

| | | |
|---|---|---|
| 3,706,855 | 12/1972 | Pitroda et al. . |
| 3,806,874 | 4/1974 | Ehrat . |
| 3,896,266 | 7/1975 | Waterbury . |
| 3,976,840 | 8/1976 | Cleveland et al. . |
| 4,007,355 | 2/1977 | Moreno . |
| 4,126,768 | 11/1978 | Grenzow . |
| 4,130,738 | 12/1978 | Sandstedt . |
| 4,201,887 | 5/1980 | Burns . |
| 4,205,203 | 5/1980 | Mehta et al. . |
| 4,223,185 | 9/1980 | Picou . |
| 4,302,810 | 11/1981 | Bouricius et al. . |
| 4,320,387 | 3/1982 | Powell . |
| 4,342,882 | 8/1982 | Gravenhorst et al. . |
| 4,355,210 | 10/1982 | Soulliard . |
| 4,399,535 | 8/1983 | Southard . |
| 4,451,701 | 5/1984 | Bendig . |
| 4,471,165 | 9/1984 | DeFino et al. . |

(List continued on next page.)

FOREIGN PATENT DOCUMENTS 5-308302 11/1993 Japan .
WO 88/03294 5/1988 WIPO .

OTHER PUBLICATIONS

Fitzgerald, Karen, "The quest for intruder–proof computer systems", IEEE Spectrum, vol. 26, No. 8, pp. 22–26, Aug. 1989.

Davis et al., "Wallet Terminal Keyboard with Acoustic Coupler", IBM Technical Disclosure Bulletin, vol. 10, No. 3, pp. 188–189, Aug. 1967.

Marven, Craig, "General purpose tone decoding and DTMF detection", Texas Instruments Ltd., Regional Technology Centre, Bedford, England (date unknown).

*Primary Examiner*—Krista M. Zele
*Assistant Examiner*—Scott Wolinsky
*Attorney, Agent, or Firm*—Testa, Hurwitz & Thibeault, LLP

[57] ABSTRACT

A system and method for selecting and generating telephone access numbers for limiting access to a telephone service. The system includes an auto-dialer having a system clock, a memory device, a processor, and a tone generator. The auto-dialer is used to transmit user-associated data to a telephone service. The system clock generates a system time and the memory device stores data and a plurality of telephone numbers, each of which is capable of accessing the telephone service at different times. The processor is electrically coupled to the system clock and to the memory device and can select the telephone number capable of accessing the telephone service at any moment in time as a function of the system time. The auto-dialer can also include a number generator operating according to a preselected pseudo random sequence, in electrical communication with the system clock and the processor, where the output of the system clock is used as a seed number to the number generator. In this embodiment, the processor selects the telephone number capable of accessing the telephone service as a function of the preselected number generated by the number generator.

15 Claims, 18 Drawing Sheets

U.S. PATENT DOCUMENTS

| | | |
|---|---|---|
| 4,482,802 | 11/1984 | Aizawa et al. . |
| 4,490,579 | 12/1984 | Godoshian . |
| 4,494,114 | 1/1985 | Kaish . |
| 4,563,548 | 1/1986 | Misherghi et al. . |
| 4,570,260 | 2/1986 | Basehore . |
| 4,571,462 | 2/1986 | Janssen . |
| 4,571,463 | 2/1986 | Shefler . |
| 4,585,904 | 4/1986 | Mincone et al. ......................... 379/112 |
| 4,614,861 | 9/1986 | Pavlov et al. . |
| 4,620,064 | 10/1986 | Kessler et al. . |
| 4,638,481 | 1/1987 | Crane et al. . |
| 4,667,087 | 5/1987 | Quintana . |
| 4,677,657 | 6/1987 | Nagata et al. . |
| 4,679,233 | 7/1987 | Richardson et al. . |
| 4,689,478 | 8/1987 | Hale et al. . |
| 4,689,760 | 8/1987 | Lee et al. . |
| 4,697,072 | 9/1987 | Kawana . |
| 4,710,613 | 12/1987 | Shigenaga . |
| 4,719,322 | 1/1988 | Guzik et al. . |
| 4,720,860 | 1/1988 | Weiss ............................................ 380/23 |
| 4,759,056 | 7/1988 | Akiyama . |
| 4,761,807 | 8/1988 | Matthews et al. . |
| 4,763,355 | 8/1988 | Cox . |
| 4,776,006 | 10/1988 | Comerford et al. . |
| 4,797,910 | 1/1989 | Daudelin . |
| 4,799,254 | 1/1989 | Dayton et al. . |
| 4,815,128 | 3/1989 | Malek . |
| 4,817,135 | 3/1989 | Winebaum . |
| 4,827,512 | 5/1989 | Hirokawa et al. . |
| 4,856,062 | 8/1989 | Weiss ............................................ 380/23 |
| 4,866,756 | 9/1989 | Crane et al. . |
| 4,866,773 | 9/1989 | Lubarsky . |
| 4,868,852 | 9/1989 | Tsumura . |
| 4,879,743 | 11/1989 | Burke et al. . |
| 4,882,750 | 11/1989 | Henderson et al. . |
| 4,885,778 | 12/1989 | Weiss ............................................ 380/48 |
| 4,910,767 | 3/1990 | Brugliera et al. . |
| 4,922,527 | 5/1990 | Nonami . |
| 4,930,129 | 5/1990 | Takahira . |
| 4,930,160 | 5/1990 | Vogel . |
| 4,935,608 | 6/1990 | Tanaka . |
| 4,935,961 | 6/1990 | Gargiulo et al. ............................ 380/21 |
| 4,939,470 | 7/1990 | Kang . |
| 4,941,172 | 7/1990 | Winebaum et al. . |
| 4,972,469 | 11/1990 | Saltwick et al. . |
| 4,972,479 | 11/1990 | Tobias, Jr. et al. . |
| 4,980,910 | 12/1990 | Oba et al. . |
| 4,995,077 | 2/1991 | Malinowski . |
| 4,998,279 | 3/1991 | Weiss . |
| 5,022,080 | 6/1991 | Durst et al. ................................. 380/23 |
| 5,023,908 | 6/1991 | Weiss ............................................ 380/23 |
| 5,027,389 | 6/1991 | Chiue et al. . |
| 5,027,401 | 6/1991 | Soltesz . |
| 5,036,461 | 7/1991 | Elliott et al. . |
| 5,050,207 | 9/1991 | Hitchcock . |
| 5,054,051 | 10/1991 | Hoff . |
| 5,056,141 | 10/1991 | Dyke ............................................ 380/25 |
| 5,058,150 | 10/1991 | Kang . |
| 5,060,255 | 10/1991 | Brown . |
| 5,063,590 | 11/1991 | Koshiishi . |
| 5,068,894 | 11/1991 | Hoppe . |
| 5,070,233 | 12/1991 | Takizawa et al. . |
| 5,073,941 | 12/1991 | Locke . |
| 5,120,939 | 6/1992 | Claus et al. . |
| 5,125,078 | 6/1992 | Matsuda et al. . |
| 5,131,038 | 7/1992 | Puhl et al. ................................... 380/23 |
| 5,168,519 | 12/1992 | Scarinci et al. . |
| 5,168,520 | 12/1992 | Weiss ............................................ 380/23 |
| 5,170,046 | 12/1992 | Kusakabe . |
| 5,177,781 | 1/1993 | Ponton et al. . |
| 5,177,785 | 1/1993 | Itani et al. . |
| 5,181,238 | 1/1993 | Medamana et al. . |
| 5,181,744 | 1/1993 | Betheil . |
| 5,182,767 | 1/1993 | Bernard . |
| 5,193,114 | 3/1993 | Moseley . |
| 5,199,061 | 3/1993 | Kim . |
| 5,199,062 | 3/1993 | Von Meister et al. . |
| 5,199,081 | 3/1993 | Saito et al. . |
| 5,208,446 | 5/1993 | Martinez . |
| 5,212,373 | 5/1993 | Fujioka et al. . |
| 5,220,158 | 6/1993 | Takahira et al. . |
| 5,223,699 | 6/1993 | Flynn et al. . |
| 5,227,612 | 7/1993 | Le Roux . |
| 5,227,613 | 7/1993 | Takagi et al. . |
| 5,239,166 | 8/1993 | Graves . |
| 5,239,583 | 8/1993 | Parrillo . |
| 5,243,175 | 9/1993 | Kato . |
| 5,245,652 | 9/1993 | Larson et al. ............................... 379/98 |
| 5,247,578 | 9/1993 | Pailles et al. . |
| 5,251,259 | 10/1993 | Mosley . |
| 5,257,309 | 10/1993 | Brandman et al. . |
| 5,276,735 | 1/1994 | Boebert et al. . |
| 5,297,194 | 3/1994 | Hunt et al. . |
| 5,329,578 | 7/1994 | Brennan et al. .......................... 379/201 |
| 5,343,519 | 8/1994 | Feldman . |
| 5,353,342 | 10/1994 | Pietrowicz . |
| 5,357,566 | 10/1994 | Dowling, Jr. et al. . |
| 5,363,443 | 11/1994 | Petty . |
| 5,365,574 | 11/1994 | Hunt et al. . |
| 5,369,685 | 11/1994 | Kero . |
| 5,369,689 | 11/1994 | Kawamura ................................. 379/355 |
| 5,377,263 | 12/1994 | Bazemore et al. . |
| 5,392,342 | 2/1995 | Rosenthal .................................. 379/211 |
| 5,392,477 | 2/1995 | Schlack et al. . |
| 5,406,619 | 4/1995 | Akhteruzzaman et al. . |
| 5,408,582 | 4/1995 | Colier . |
| 5,414,755 | 5/1995 | Boaler et al. . |
| 5,420,914 | 5/1995 | Blumhardt ................................. 379/131 |
| 5,425,084 | 6/1995 | Brinskele ................................... 379/112 |
| 5,425,085 | 6/1995 | Weinberger et al. ..................... 379/131 |
| 5,428,678 | 6/1995 | Fitzpatrick et al. ....................... 379/355 |
| 5,430,827 | 7/1995 | Rissanen . |
| 5,440,627 | 8/1995 | Puri . |
| 5,452,352 | 9/1995 | Talton . |
| 5,454,035 | 9/1995 | Oba et al. . |
| 5,465,290 | 11/1995 | Hampton et al. . |
| 5,469,499 | 11/1995 | Lanning .................................... 379/200 |
| 5,485,370 | 1/1996 | Moss et al. . |
| 5,499,288 | 3/1996 | Hunt et al. . |
| 5,506,885 | 4/1996 | Hamilton . |
| 5,510,777 | 4/1996 | Pilc et al. . |
| 5,537,102 | 7/1996 | Pinnow ................................... 340/825.3 |
| 5,550,575 | 8/1996 | West et al. . |
| 5,608,784 | 3/1997 | Miller . |
| 5,619,564 | 4/1997 | Canniff et al. . |
| 5,623,539 | 4/1997 | Bassenyemuskasa et al. . |

DTMF DECODER

DTMF ENCODER

FIG. 8A — Standard DTMF Tone Schedule

| Symbol (11) | Lo grp Freq (Hz) (13) | Hi grp Freq (Hz) (15) | FundDiff (Hz) (17) |
|---|---|---|---|
| 1 | 697 | 1209 | 512 |
| 2 | 697 | 1336 | 639 |
| 3 | 697 | 1494 | 797 |
| a | 697 | 1633 | 936 |
| 4 | 770 | 1209 | 439 |
| 5 | 770 | 1336 | 566 |
| 6 | 770 | 1450 | 680 |
| b | 781 | 1655 | 874 |
| 7 | 770 | 1209 | 439 |
| 8 | 852 | 1336 | 484 |
| 9 | 852 | 1477 | 625 |
| c | 840 | 1642 | 802 |
| * | 941 | 1209 | 268 |
| 0 | 941 | 1338 | 397 |
| # | 941 | 1477 | 536 |
| d | 950 | 1610 | 660 |

FIG. 8B — Standard Detector Accept Range: 1.5% + 2Hz

| Nom.+1.5% (Hz) | Nominal Freq (Hz) | Nom.-1.5% (Hz) |
|---|---|---|
| 709 | 697 | 685 |
| 784 | 770 | 756 |
| 867 | 852 | 837 |
| 957 | 941 | 925 |
| 1229 | 1209 | 1189 |
| 1358 | 1336 | 1314 |
| 1501 | 1477 | 1453 |
| 1659 | 1633 | 1607 |

FIG. 8C — Standard Detector Reject Range ±3.5%

| Nom.+3.5% (Hz) | Nominal Freq (Hz) | Nom.-3.5% (Hz) |
|---|---|---|
| 721 | 697 | 673 |
| 797 | 770 | 743 |
| 882 | 852 | 822 |
| 974 | 941 | 908 |
| 1251 | 1209 | 1167 |
| 1383 | 1336 | 1289 |
| 1529 | 1477 | 1425 |
| 1690 | 1633 | 1576 |

FIG. 8D

| Out of Range(Hz) |
|---|
| <672 |
| 721-743 |
| 797-822 |
| 882-908 |
| 974-1166 |
| 1251-1289 |
| 1383-1425 |
| 1528-1575 |
| 1590+ |

| Range of Valid, Reject and Out of Detector Range Frequencies (Hz) | | | | |
|---|---|---|---|---|
| Reject if less than (Hz) | Accept if greater than (Hz) | Nominal (Hz) | Accept if less than (Hz) | Reject if greater than (Hz) |
| 672.61 | 686.55 | 697.00 | 707.48 | 721.40 |
| 743.06 | 783.45 | 770.00 | 721.55 | 795.95 |
| 822.18 | 839.22 | 862.00 | 864.78 | 881.82 |
| 908.07 | 926.89 | 941.00 | 955.12 | 973.94 |
| 1166.69 | 1190.87 | 1209.00 | 1227.14 | 1251.32 |
| 1289.24 | 1316.98 | 1336.00 | 1356.04 | 1382.76 |
| 1625.31 | 1464.85 | 1477.00 | 1499.10 | 1528.70 |
| 1573.85 | 1608.51 | 1633.00 | 1657.60 | 1690.16 |

FIG. 8E

| ILLUSTRATIVE REVISED DTMF VALUES | | | |
|---|---|---|---|
| Symbol | Lo grp Freq (Hz) | Hi grp Freq (Hz) | Fund Diff (Hz) |
| 1 | 697 | 1209 | 512 |
| 2 | 697 | 1336 | 639 |
| 3 | 690 | 1492 | 802 |
| a | 705 | 1610 | 905 |
| 4 | 770 | 1209 | 439 |
| 5 | 770 | 1336 | 566 |
| 6 | 781 | 1450 | 669 |
| b | 770 | 1655 | 885 |
| 7 | 852 | 1209 | 357 |
| 8 | 852 | 1336 | 484 |
| 9 | 852 | 1477 | 625 |
| c | 840 | 1642 | 802 |
| * | 941 | 1209 | 268 |
| 0 | 941 | 1336 | 395 |
| # | 941 | 1477 | 536 |
| d | 950 | 1610 | 660 |

FIG. 9A

| SYMBOL | HI FREQ Hz | HI FREQ dB(SPL) | LO FREQ Hz | LO FREQ dB(SPL) | HI FREQ dBm | LO FREQ dBm | TWIST dBm |
|---|---|---|---|---|---|---|---|
| 1 | 1209 | 83 | 697 | 92 | -12 | -4 | -8 |
| 2 | 1336 | 95 | 697 | 98 | 2 | 2 | 0 |
| 3 | 1477 | 93 | 697 | 98 | -2 | 2 | -4 |
| 4 | 1209 | 89 | 770 | 88 | -6 | -6 | 0 |
| 5 | 1336 | 91 | 770 | 98 | -4 | 2 | -6 |
| 6 | 1477 | 85 | 770 | 92 | -8 | -2 | -6 |
| 7 | 1209 | 85 | 852 | 90 | -8 | -6 | -2 |
| 8 | 1336 | 89 | 852 | 92 | -8 | 0 | -8 |
| 9 | 1477 | 85 | 852 | 92 | -8 | -2 | -6 |
| 0 | 1336 | 91 | 941 | 89 | -4 | -6 | +2 |

FIG. 9B

| Characteristic | Measure | Value |
|---|---|---|
| Hi Tone Level | dBm | -6 |
| Lo Tone Level | dBm | -6 |
| Twist | dBm | 0 |
| Tone-On time | ms | 60 |
| Tone-Off time | ms | 60 |
| Freq Deviation-High | % | 0.15 |
| Freq Deviation-Low | % | 0.5 |

FIG. 11

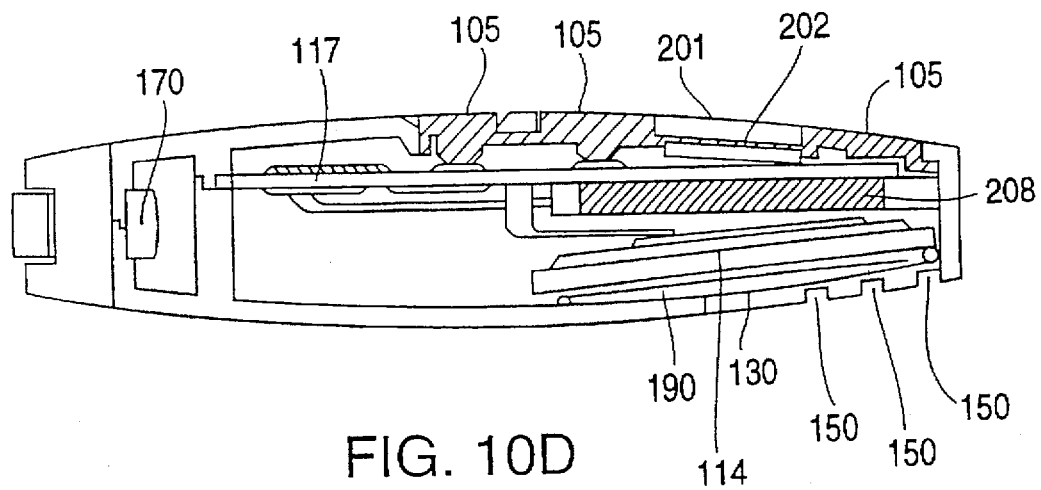
FIG. 10D
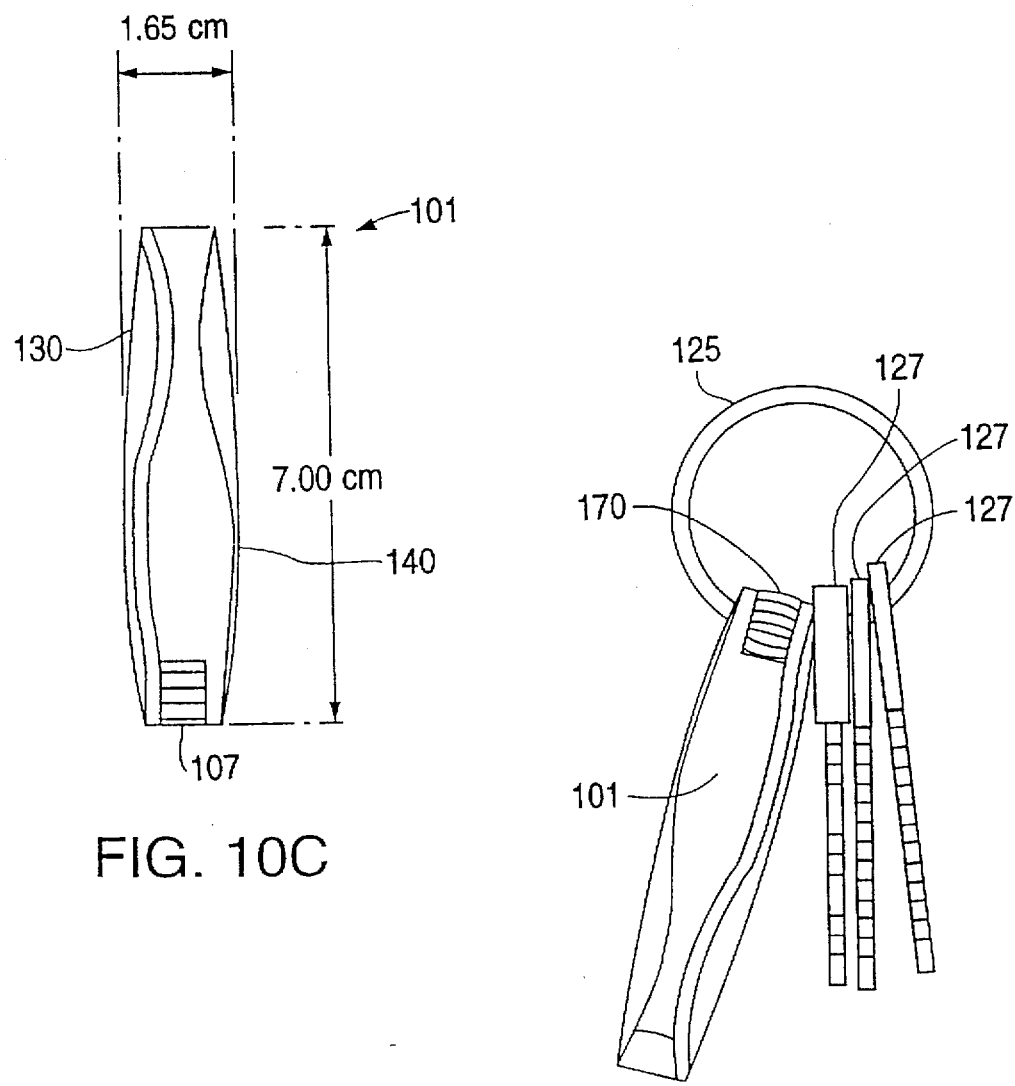
FIG. 10C
FIG. 10E

| Lo Tone Level | |
|---|---|
| Min. | -15dBm |
| Signal (dBm) | Data |
| -12 | 0 |
| -10 | 9 |
| -8 | 8 |
| -6 | 7 |
| -4 | 6 |
| -2 | 5 |
| 0 | 4 |
| 2 | 3 |
| 4 | 2 |
| 6 | 1 |

FIG. 12A

| Hi Tone Level | |
|---|---|
| Min. | -15dBm |
| Signal (dBm) | Data |
| -12 | 0 |
| -10 | 9 |
| -8 | 8 |
| -6 | 7 |
| -4 | 6 |
| -2 | 5 |
| 0 | 4 |
| 2 | 3 |
| 4 | 2 |
| 6 | 1 |

FIG. 12B

| Tone-On Time | |
|---|---|
| Min: 40ms | |
| Signal (ms) | Data |
| 40 | 0 |
| 50 | 9 |
| 60 | 8 |
| 70 | 7 |
| 80 | 6 |
| 90 | 5 |
| 100 | 4 |
| 110 | 3 |
| 120 | 2 |
| 130 | 1 |

FIG. 12C

| Tone-Off Time | |
|---|---|
| Min: 35 ms | |
| Signal (ms) | Data |
| 40 | 0 |
| 50 | 9 |
| 60 | 8 |
| 70 | 7 |
| 80 | 6 |
| 90 | 5 |
| 100 | 4 |
| 110 | 3 |
| 120 | 2 |
| 130 | 1 |

FIG. 12D

| Frequency Deviation | |
|---|---|
| Lo-Tone | |
| Max deviation | +-1% of nominal |
| Freq Deviation | Data |
| -30: -75% | 3 |
| +25%-25% | 2 |
| 30: 75% | 1 |

FIG. 12E

| Frequency Deviation | |
|---|---|
| Hi-Tone | |
| Max deviation: | +-1% of nominal |
| Freq Deviation | Data |
| -30: -75% | 3 |
| +25%-25% | 2 |
| 30:75% | 1 |

FIG. 12F

| Twist | |
|---|---|
| Standard: Hi Tone cannot be less than -9dBm lower than Lo Tone nor more than +4dBm greater | |
| Twist (dBm) | Data |
| -8>x>-5 | 3 |
| -4>x>0 | 2 |
| 1>x>+4 | 1 |

FIG. 12G

| Characteristic | Value | Interpreted Data |
|---|---|---|
| Hi Tone Level | -6 dBm | 7 |
| Lo Tone Level | -6 dBm | 7 |
| Twist | 0 dBm | 1 |
| Tone-On time | 60 ms | 8 |
| Tone-Off time | 60 ms | 8 |
| Freq Deviation-High | 0.25 | 3 |
| Freq. Deviation-Low | 0.5 | 2 |

FIG. 13

ACCESS CONTROL DEVICE

SYSTEM AND METHOD FOR SELECTING AND GENERATING TELEPHONE ACCESS NUMBERS FOR LIMITING ACCESS TO A TELEPHONE SERVICE

CROSS-REFERENCE TO RELATED APPLICATIONS

This application is a divisional of application Ser. No. 08/286,825 filed on Aug. 5, 1994, which was issued as U.S. Pat. No. 5,583,933 on Dec. 10, 1996.

FIELD OF THE INVENTION

The present invention is directed to methods and apparatus for communicating data, telecommunications access methods, and, more particularly, to auto-dialers, security and information devices that can transmit and receive data.

BACKGROUND OF THE INVENTION

In the modern world, telephone transactions involving extensions of credit, payment of bills, fund transfers and the providing of other types of services are commonplace. Generally, such services are provided in response to a user dialing the telephone number of a service and by then entering identification information and/or credit card information using standard "touch tones", i.e., dual tone multi-frequency signals ("DTMF tones"), to represent the identification information being entered and transmitted. Normally, such touch tone signals are produced using a standard telephone keypad input device.

Touch tones are generated using a dual tone multi-frequency (DTMF) encoding technique, as opposed to a frequency shift key (FSK) encoding, which is frequently used for data transmission purposes. In accordance with the DTMF technique used to generate touch tone signals, tone signals are produced by generating two tones such that one tone is selected from a high frequency band group and the other tone is selected from a low frequency band group. In standard telephone systems, the high frequency band group includes four high frequencies (1209, 1336, 1477, and 1633 Hz) while the low band frequency group includes four low frequencies (697, 770, 852 and 941 Hz). Each of the high and low frequencies is referred to as a fundamental frequency.

Each one of the low frequencies corresponds to one of the four rows of keys on a standard extended telephone keypad while each one of the four high frequencies corresponds to one of the four columns of keys on standard extended telephone keypads. Accordingly, low frequency tones represent row tones and high frequency tones represent column tones. It should be noted that extended and non-extended keypads differ in that extended keypads include the additional fourth column of keys not found on non-extended standard keypads such as those commonly used with public telephones and household telephones, although these additional tones are found in most modern hardware/software systems.

Each different telephone key is represented by a signal including a unique combination of one tone from the high band and one from the low band. Sixteen different signal states may be represented by this encoding technique with one signal state corresponding to each one of the sixteen keys that can be found on a standard telephone keypad. Referring now to FIG. 8A, there is illustrated a chart which lists the 16 different numbers/symbols that are represented by the 16 different signal states and the Hi-tone and Lo-tone frequency associated with each of the 16 different signal states.

A received DTMF tone signal is determined, in telephone switching and DTMF tone signal detection devices, as having a valid signal state if five conditions are met. The first of these is that the tone signal contain exactly one valid tone, and only one valid tone, from each of the low and high band frequency groups, i.e., the signal must contain only one valid Hi-tone and one valid Lo-tone frequency. The second condition is that the low and high tones are present for a predetermined minimum time duration, i.e., at least 35–40 milliseconds. Third, the difference in power (level), commonly referred to as "twist", between the low and the high tone must fall within a predetermined range, i.e., the Hi-band tone signal power level can not be more than 4 dBm greater or 8 dBm less than the Lo-band tone signal power level, where dBm is a logarithmic measure of power with respect to a reference power of 1 milliwatt. Fourth, the amplitude level of each tone signal in the tone pair must be in the range of 0 to −25 dBm. Fifth, consecutive tone-pairs must be separated by a period of silence for at least 35–40 milliseconds.

Thus, if too many or too few tones are detected the detection criteria will not be met and a valid signal state will not be indicated. When a valid signal state does occur, the particular combination of low and high tones is decoded to produce an indication of the corresponding key or signal state that was responsible for the generator of the DTMF tone signal. It is this key or signal state information that represents, e.g., one of the numerical digits comprising a telephone or credit card number.

Placing a voice call, using a calling card number or other credit card number, is exemplary of one of the most common types of telephone credit transactions involving the use of DTMF tones.

Referring now to FIG. 1, there is illustrated a flow chart illustrating a standard telephone call transaction involving the use of a credit card for billing purposes. As illustrated, the standard telephone call transaction comprises the first step of making a decision to place a credit card call 1001 followed by the actual step of dialing 1002. As part of the dialing step 1002 a user enters, using, e.g., the telephone keypad, an access code identifying the desired long distance telephone carrier, and a destination number, i.e., the telephone number of the party being called. Both the access code and telephone number are represented as DTMF tones, i.e., touch tones, generated by the telephone in response to the keypad input.

The telephone system, e.g., the local switching office to which the telephone is linked, connects the caller to the appropriate long distance carrier represented by the access code input by the user. The long distance carrier then generates an audible signal/message indicating to the caller that it is ready to receive billing information as indicated in step 1003.

In response to the audible signal/message generated by the long distance carrier, the caller then inputs, e.g., using the telephone keypad, a credit card number as illustrated in step 1004. In response to receiving DTMF tones representing the credit card number, generated by the telephone, the long distance carrier checks the credit card number for validity as illustrated in step 1006. If the credit card number is determined to be valid, the call is placed as illustrated in step 1008. However, if the credit card number is determined to be invalid, the call is rejected and the telephone connection is disconnected as illustrated in step 1010.

The standard procedure for placing a call using a credit card has several drawbacks. For example, requiring a caller to manually input through the telephone keypad a carrier access number, a destination number, and a credit card number introduces into the calling procedure ample opportunity for a user to accidentally input an incorrect number for any one of the required values, which can exceed, e.g., 35 required inputs—more if the call is placed to or from a foreign country.

It is generally understood that the likelihood of entry errors increases in proportion to the number of digits to be entered. Such an error normally results in the call being rejected by the telephone carrier, requiring the caller to repeat the entire calling procedure from the point of connection to the long distance carrier. Generally, the long distance carrier pays fees to the company which owns the originating local switching office of the caller from the moment of connection, and is unable to start billing for the ultimate connection until the moment of connection. In such a case, each entry error is an increase in the unbillable time that a long distance carrier must absorb without any offsetting revenue.

Generally, the requirement that a caller manually input a large series of numbers to place a call leads to a higher error rate during call placement than results when the caller has to input fewer numbers, e.g., when calls are placed without the use of credit cards. In addition, requiring a caller to manually input a calling card number discourages some callers from using a credit card to place a call because of the additional time and frequent input errors associated with the initiation of a call as compared to calls placed without using credit cards.

In addition to error problems associated with the manual input of credit card number information, security problems are also associated with the manual input of credit card data into a telephone using a standard keypad. For example, a person viewing the initiation of a telephone transaction can record the credit card number input to the telephone keypad and then later use the calling card number to place unauthorized calls.

Portable electronic information cards and auto-dialers that are capable of being acoustically coupled to telephone systems to perform dialing functions are well known in the art.

Such known devices which generate a series of DTMF tones representing the numbers which must be input to initiate a call, have reduced or eliminated the need to input telephone number, carrier number, and credit card number information manually each time a call is placed.

Frequently, to enhance the versatility of such devices, they are made programmable with individual devices being programmed to store different telephone numbers, and/or calling card, credit card or personal identification numbers (PINs). While such programming is generally performed by electronically coupling such programmable devices to a programming unit, for example, as described in U.S. Pat. No. 4,882,750 to Henderson et al., it has been suggested that such devices should be designed to be capable of being programmed by acoustic signals received from a telephone. For example, PCT patent application Ser. No. 02,837, now abandoned, suggests a portable electronic information card capable of being programmed in response to acoustic signals.

While known portable electronic information cards and auto-dialers that can be acoustically coupled to telephone systems facilitate telephone dialing and the supplying of billing information over the phone, the lack of a practical workable device which deals with past data transmission errors and security problems has inhibited widespread acceptance and use of such auto-dialer devices.

The introduction of errors into the data being sent to the telephone system, e.g., as the result of the use of an acoustic coupling, is one example of a data error problem that may prevent the telephone system from completing a call. As will be discussed in detail below, errors associated with the use of an acoustic coupling result from various factors affecting the acoustical transmission of DTMF tones. Such factors include variations between components used in present auto-dialers to generate the DTMF tones, temperature variations affecting battery voltages and the amplification levels applied to DTMF signals, speaker proximity to a telephone handset's microphone used to receive the acoustic DTMF tones, distortions introduced by the microphone receiving DTMF tones output by an auto-dialer, as well as, ambient noise levels. Errors may also be introduced from the lines that connect a caller to the ultimate telephone call destination as well as from other sources.

In addition to the error problems associated with the use of known auto-dialers, known devices for providing calling card and caller identification information acoustically to a telephone system present many security problems. For example, an unauthorized tape recording of a calling card number generated by the known systems, can easily be created by connecting an input cable to the telephone cable connected to a coin phone and then played back by an unauthorized user seeking to obtain access to the telephone system. Generally, the known calling card systems fail to provide a security method for preventing unauthorized users from gaining access to the telephone system via the use of such an unauthorized recording. Furthermore, known systems fail to prevent an unauthorized person from obtaining a calling card number and its related Personal Identification Number(PIN), both of which can be repeatedly used in their identical form for subsequent calls, through other methods, e.g., video-taping an authorized caller in a public place, going through the trash outside of large office facility, etc. Once known, calling card number and PIN data can be used to initiate multitudes of calls, often to foreign countries. The aggregate cost of the fraudulent use of unauthorized calling card calls in the United States is estimated to exceed $1 billion per year. While long distance carriers are now providing software analysis of many calls placed on their network to determine if there is a likelihood of unauthorized use, many such calls are paid by authorized customers who fail to notice the unauthorized calls on their bills.

Accordingly, there is a need to provide a secure device and method for storing and providing information regarding a user, and, more specifically, for providing such information locally or transmitting it remotely by, e.g., calling card, credit card, and user identification information either through or to a telephone system.

In addition to the reliability and security issues discussed above, there are also several convenience problems associated with known auto-dialer devices some of which are inherent in the standard credit card calling transaction illustrated in FIG. 1. These convenience problems include the need to generate and/or input separate telephone number and calling card identification information when attempting to place a credit card call. Furthermore, the procedures often used to initiate a calling card call often require that a user interlace carrier access codes (up to 20 digits) followed by the user's desired destination number (up to 17 digits) followed by an account/pin number array (usually at least 14 digits). These input sequences, which may expand in the future to accommodate greater call/user volumes are difficult sequences for a user to supply without input errors, and because of their complexity often result in users holding a publicly viewable card showing the account number and dialing sequences needed, creating security risks from scrupulous users of calling card account and access data.

Additionally, because many countries have a distinct dialing sequence and numbering plan, carrier access codes are rarely identical from country to country, thereby increasing the difficulty that a traveler experiences when placing a calling card call.

Other convenience problems with the known devices relate to size and general ease of use issues. For example, known devices may be of such a size that it is inconvenient for a user to keep the device with them throughout the day. In addition, the size and shape of many of the known auto-dialers makes it difficult to properly align the auto-dialer with the microphone of a standard telephone handset making it somewhat difficult to use if accurate transmission of DTMF signals is to be achieved. Furthermore, the number of keys and the complexity of the controls frequently encountered on the known portable electronic information cards and auto-dialers have tended to inhibit the known devices from gaining widespread acceptance.

While the problems described above mainly refer to the problems and errors associated with the initiation of calling card calls, each of these problems may also affect access security and convenience in relation to any telephone based transaction (e.g. credit card purchases of over the phone, access to secure voice and data networks, etc.).

SUMMARY OF THE PRESENT INVENTION

The present invention provides a communication device capable of transmitting and receiving data. In accordance with the present invention, data may be encoded into a signal comprising a series of tones or tone pairs, e.g., a conventional DTMF signal, by controlling various identifiable components or aspects of the signal, e.g., the amplitude, frequency, lack of tone, or the period between tones, etc. When multiple signals are used, e.g., a combined Lo-frequency tone signal and a Hi-frequency tone signal, the twist, i.e., amplitude difference between the signals, may also be used to encode data.

In accordance with one embodiment of the present invention, the signal characteristics described above are used to encode data into a DTMF signal which is still detectable by a standard DTMF signal detector. In this manner, the present invention permits data to be embedded or encoded into a DTMF signal being used, e.g., to place a call. The embedded data may represent, e.g., a telephone calling card number, destination telephone number information or other data.

In one embodiment, the present invention is implemented as an auto-dialer also suitable for use as a smart card which is capable of transmitting and receiving information over conventional telephone lines, e.g., between a database and the auto-dialer, without the need for a specialized interface (other than a standard telephone). The auto-dialer of the present invention is capable of being acoustically coupled to the receiver of a telephone and being reprogrammed in response to acoustic signals. The programming and other features of the auto-dialer can be individually enabled or disabled in response to pre-selected signals, e.g., a string of DTMF tones received by the auto-dialer. In this manner, in one embodiment, the auto-dialer of the present invention requires an acoustic "key" to enable/disable some functions.

Using the encoding technique described above, an auto-dialer according to the present invention can encrypt calling card and other data into, e.g., destination telephone numbers by selectively altering pre-selected characteristics of a DTMF tone sequence, such as the duration of tones, the period of silence between tones and the twist between Lo-band and Hi-band tones of DTMF tone pairs in the conventional DTMF protocol which represent the desired destination telephone number. In accordance with the present invention, the encryption of data into the destination telephone number does not affect the ability of standard telephone switching equipment to recognize the destination number. However, information encrypted into the DTMF signals will be undetectable to standard telephone switching circuitry because it is encrypted using DTMF signal characteristics not normally used to represent data related to conventional call processing. In one embodiment, other tones or frequencies are also used to transmit data which cannot be detected by standard DTMF tone detectors.

In addition to the encryption capability described above, the auto-dialer of the present invention, in one embodiment, has a system clock that is used to drive a pseudo random number generator used in various data security schemes.

The auto-dialer of the present invention incorporates various calibration features which permit the calibration of the audio output and system clock. In one embodiment calibration adjustments are made by programming the auto-dialer with various calibration factors. This programming may be done by an acoustic coupling device incorporated into the auto-dialer or via another input device, e.g., wired to the auto-dialer either at the time of manufacture or over the phone at a later time. The calibration features permit the easy calibration of both the system clock and various characteristics of the tones generated by the auto dialer.

In addition to the various encoding and calibration features of the present invention, the present invention is also directed to a variety of security schemes and features which are designed to generally increase security when placing a telephone call and/or when providing other confidential or user-identification-related information.

Each of the above described features of the present invention, as well as numerous other features, will be described in greater detail below.

BRIEF DESCRIPTION OF THE DRAWINGS

FIG. 8A is a chart illustrating the fundamental difference between the tones of various DTMF tone pairs generated by standard DTMF generators.

FIGS. 8B–8E are charts illustrating the accept/reject and out-of-range frequencies, of a standard DTMF detector circuit, in relationship to each of the four fundamental Lo-band frequencies and four fundamental Hi-band frequencies used to generate standard DTMF signals.

FIG. 9A is a chart illustrating the fundamental difference between the various tone pairs when the frequency of the Lo-band and Hi-band tones are selected, in accordance with the present invention, to reduce third tone errors.

FIG. 9B is a chart illustrating twist values of DTMF tone pairs generated in accordance with one embodiment of the present invention.

FIG. 10C is an illustration a side view of the auto-dialer illustrated in FIG. 10A.

FIG. 10D is an illustration of a cut away side view of the auto-dialer illustrated in FIG. 10A.

FIG. 10E is an illustration of the auto-dialer illustrated in FIG. 10A mounted on a key ring.

FIG. 11 is a chart illustrating exemplary signal characteristic values, for a DTMF tone pair representing the digit 3, that can be used to represent data in accordance with the present invention.

FIG. 12A illustrates an exemplary Lo-band tone level to data conversion table in accordance with the present invention.

FIG. 12B illustrates an exemplary Hi-band tone level to data conversion table in accordance with the present invention.

FIG. 12C illustrates an exemplary tone duration to data conversion table in accordance with the present invention.

FIG. 12D illustrates an exemplary interdigit period duration to data conversion table in accordance with the present invention.

FIG. 12E illustrates an exemplary Lo-band tone frequency deviation to data conversion table in accordance with the present invention.

FIG. 12F illustrates an exemplary Hi-band tone frequency deviation to data conversion table in accordance with the present invention.

FIG. 12G illustrates an exemplary tone pair twist level to data conversion table in accordance with the present invention.

FIG. 13 illustrates a chart which displays the data conversion results obtained by using the signal characteristic values of chart 11 in conjunction with the conversion tables of FIGS. 12A through 12G to decode information encoded into a DTMF tone pair in accordance with the present invention.

DETAILED DESCRIPTION

The present invention is directed to methods and apparatus for communicating data through the use of acoustic or electrical signals including, e.g., DTMF signals. Various embodiments of the present invention are directed to, e.g., portable acoustically coupled auto-dialers, calling cards, credit cards, paging devices, smart cards, and other information card type devices, debit cards, etc. In addition to such portable embodiments, several embodiments of the present invention are directed to telephone switching circuitry and DTMF and other tone recognition circuitry which may be incorporated into existing telephone systems, as well as other data systems.

Figure 2:
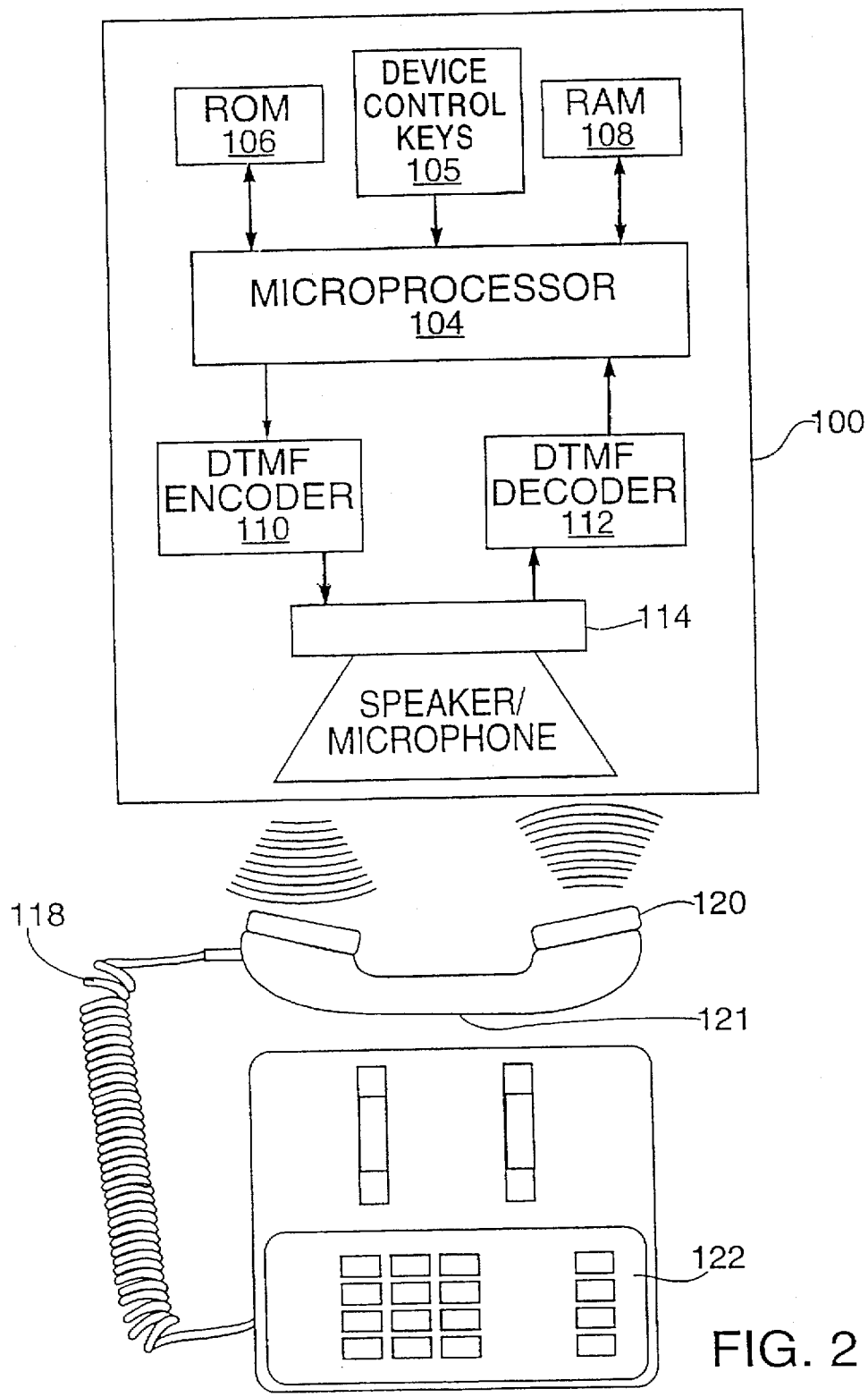
FIG. 2 is a schematic block diagram of an exemplary embodiment of an auto-dialer in accordance with one embodiment of the present invention.

Referring now to FIG. 2 there is illustrated an auto-dialer device, generally indicated by the reference numeral 100, in accordance with one exemplary embodiment of the present invention. As illustrated, the auto-dialer 100 comprises a microprocessor 104 coupled to a read only memory (ROM) 106, device control keys 105, and a random access memory (RAM) 108. The ROM 106 may be located within the microprocessor 104 or externally thereto.

Via device control keys 105, the microprocessor 104 receives input signals from a user, which input is stored in the RAM 108 or processed by the microprocessor 104 using other information stored in the ROM 106. In addition, in various embodiments, the RAM 108 is used to store data relating to voice signals and/or tone signals.

The auto-dialer 100 further comprises a DTMF encoder 110 and a DTMF decoder 112 which are coupled to the microprocessor 104 and to a speaker/microphone 114. In the illustrated embodiment, the speaker/microphone 114 serves as both an input device for receiving acoustic signals, such as DTMF tones, and as an output device for outputting signals such as DTMF tones and other signals generated by the encoder 110. In other embodiments, a separate microphone is used for receiving audio signals and the speaker/microphone 114 is used only for outputting signals.

As illustrated in FIG. 2, the auto-dialer 100 may be acoustically coupled to a standard telephone 122 such as a public pay phone. While the speaker/microphone 114 is illustrated in FIG. 2 as receiving a signal from and sending a signal to, a telephone handset 121, it is to be understood that the speaker/microphone 114, in this embodiment, can not be used to perform these operations simultaneously. Furthermore, it should be noted that when receiving signals from the handset 121, the speaker/microphone 114, which serves as a transducer, is positioned in close proximity to the handset's speaker 120 and while sending signals to the handset's microphone 118 the speaker/microphone 114 is positioned in close proximity to the microphone 118. Thus, to change between the send and receive functions, in the illustrated embodiment, a user must move the auto-dialer 100 from being in close proximity to the microphone 118 to a position where it is in close proximity to the speaker 120. However, in another embodiment, a separate microphone is included for the receipt of data in addition to the speaker/microphone 114. In accordance with such an embodiment, data may be received and transmitted simultaneously by the auto-dialer 100, without the requirement of moving the auto-dialer 100.

In another embodiment, the auto-dialer 100 is designed to acoustically monitor its output and perform an auto-calibration sequence prior to or at the beginning of each period of use of the auto-dialer 100 which follows a period of dormancy of a preselected time period, e.g., a selected number of hours or days or when the autodialer 100 senses a temperature outside of a preselected temperature range, e.g., representing the temperature the autodialer 100 is expected to work at.

As is well known, battery voltage output varies as a function of temperature. Variations in voltage output are particularly noticeable in cold weather. Additionally, other components of the autodialer 100 are subject to the effects of temperature. Accordingly, in one embodiment, the auto-dialer 100 incorporates an auto-calibration feature which causes the generation of a preselected group of tones used for calibration purposes. As these tones are generated, the microphone 109 receives the tones and converts them to electrical signals which are analyzed by the microprocessor 104. The microprocessor 104 analyzes the generated signal levels and compares them against stored desired signal level values. In the event that an adjustment is required in any tone output level, or other signal characteristic, the microprocessor 104 calculates the appropriate change, and alters a tone generation control parameter stored in the RAM 108 to correct the output signal level. The autodialer 100 may then re-test the generation of the tone which had a tone signal level problem to insure accurate generation of the tone to insure that the calculated parameter change produced the desired result. If the desired output level was not achieved, the microprocessor 104 repeats the calibration sequence. In one embodiment, when it is detected that a tone signal level fails to achieve the pre-determined level, e.g., desired signal level after one or more attempts to adjust the output level, the auto-dialer 100 indicates a "don't use" condition on a display device 202.

Figure 1:
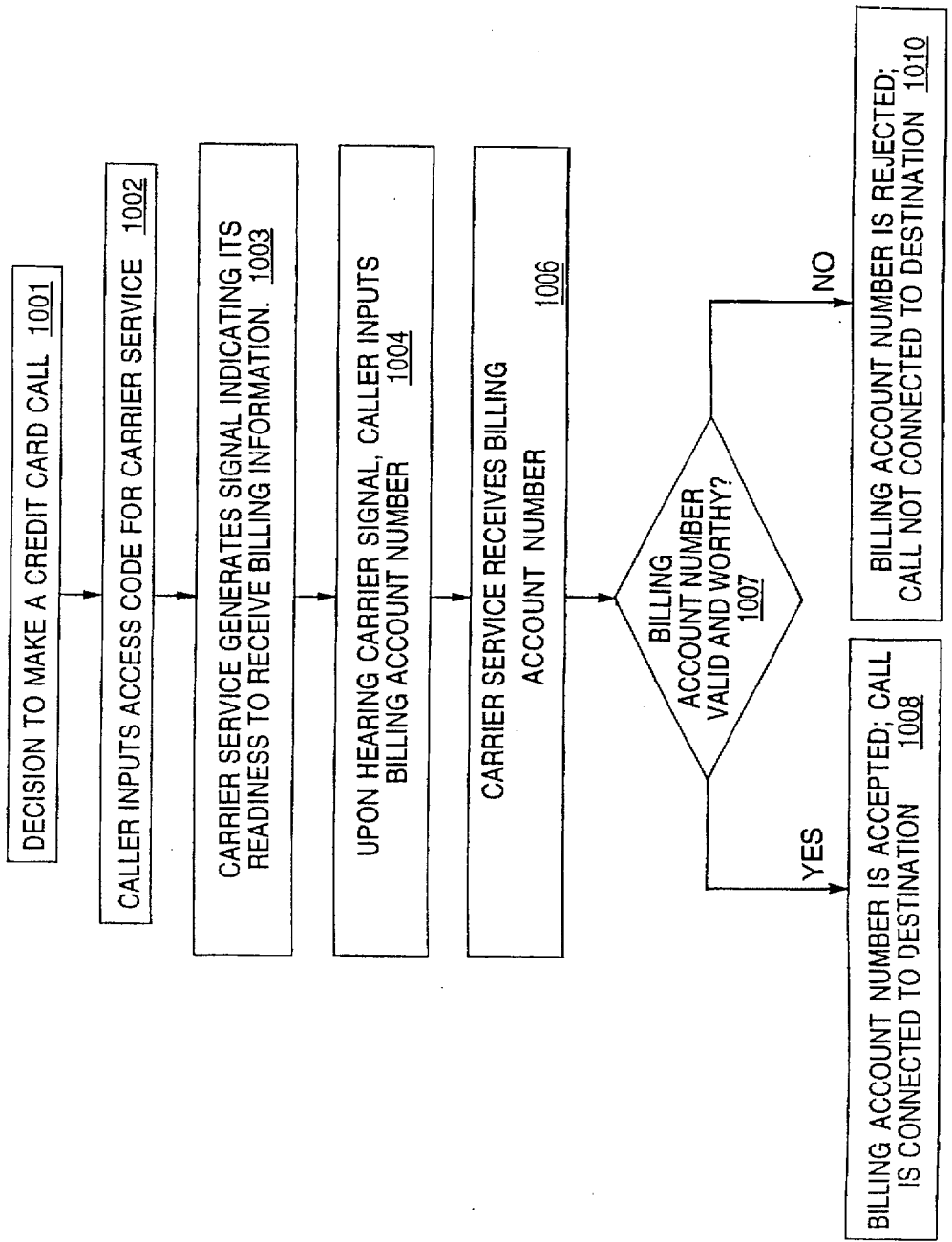
FIG. 1 is a flow chart illustrating the steps involved with placing a standard telephone call using a credit card.
Figure 3:
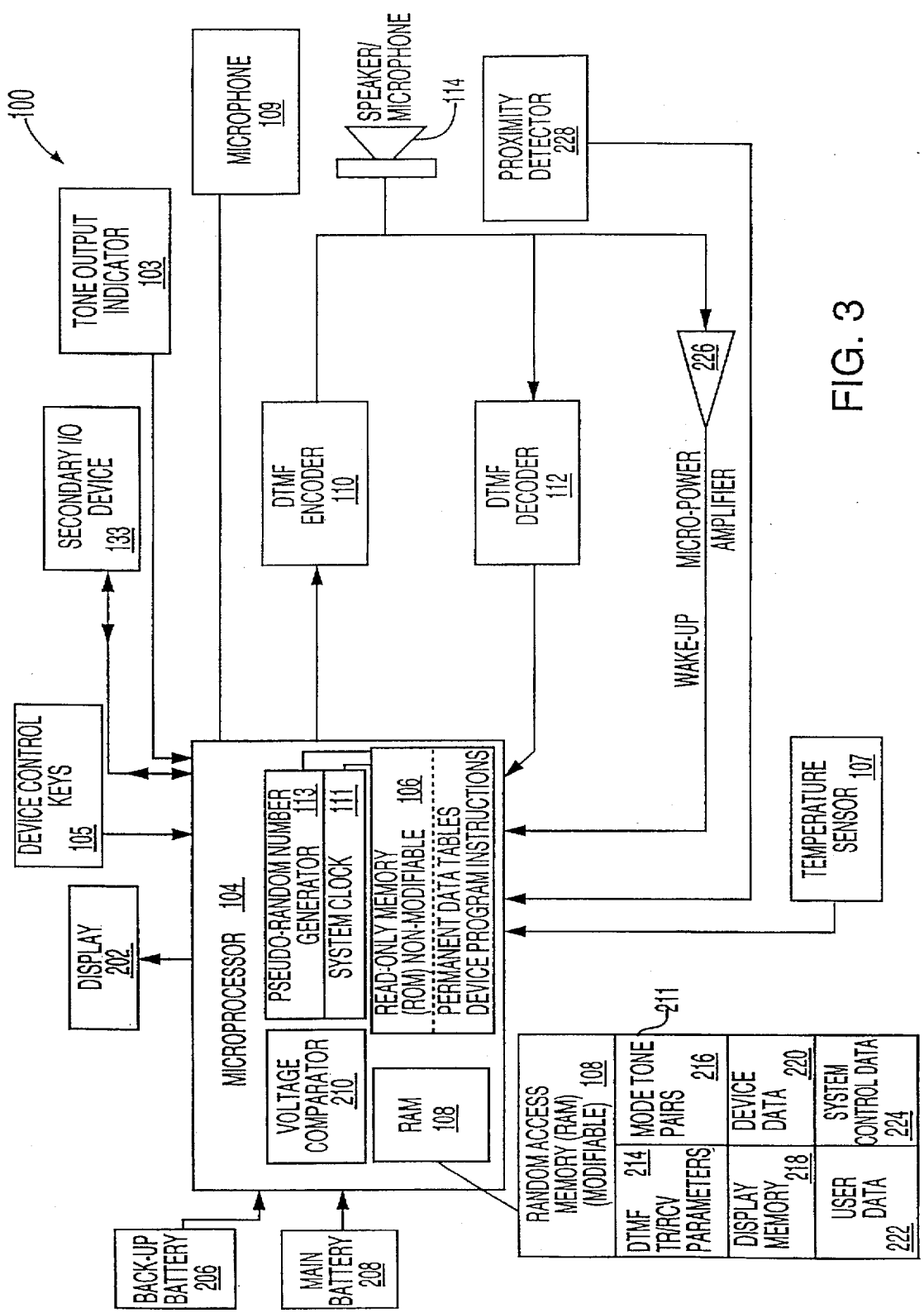
FIG. 3 is a more detailed diagram of the auto-dialer illustrated in FIG. 2.

Referring now to FIG. 3, the auto-dialer 100 of FIG. 1 is illustrated in greater detail. In FIG. 3, components that are the same or similar to those of FIG. 2, will be referred to using the same reference numerals as used in FIG. 2. As illustrated in FIG. 3, the auto-dialer 100 may further comprise the display device 202 for displaying data and other information output by the microprocessor 104 and/or system components, a main battery 208 for powering the auto-dialer 100, a back-up battery 206 for supplying power to the microprocessor 104 as well as other system components when the main battery fails, and a voltage comparator 210 for detecting the condition of the main and backup batteries 206, 208.

As illustrated in FIG. 3, the auto-dialer further includes a micro-power amplifier 226 coupled to the output of the speaker/microphone 114. The amplifier 226 serves to provide a wake-up signal to the microprocessor 104 as described below. The amplifier 226 generates a signal in response to a signal generated by the speaker 114 in response to received acoustic signals. The signal output by the amplifier 226 causes the microprocessor 104 to become fully active from, e.g., a sleep mode which is automatically entered into after a long period of inactivity in order to conserve power. In an alternative embodiment, an input of the microprocessor 104 is coupled to a light sensor or other activation device such as a radio frequency sensor, which causes the auto-dialer 100 to become fully active in response to an outside stimulus which may be provided by, e.g., a light or sound source associated with an automatic teller machine (ATM) or telephone device. Thus, in accordance with such an embodiment the auto-dialer 100 can be made active by the excitation of a transducer or other sensor by, e.g., a light, radio frequency signal or the receipt of an acoustic signal having a pre-defined frequency and a minimum, pre-defined intensity level. These pre-defined levels or values are a matter of design choice and may be programmed into the ROM 106 or RAM 108 at, e.g., the time of manufacture.

Figure 10A:
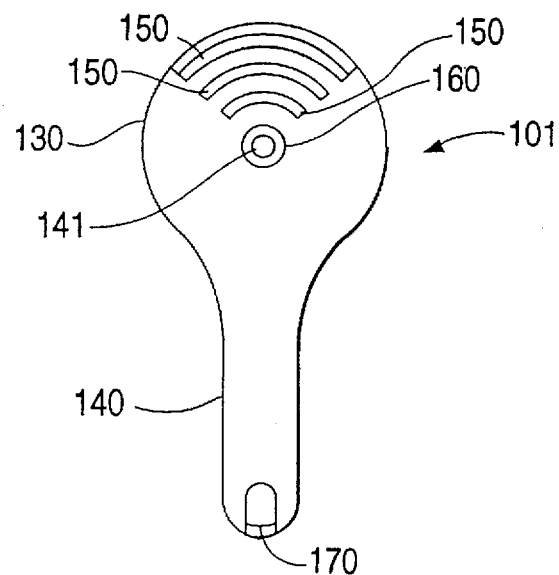
FIG. 10A is an illustration of a bottom view of one embodiment of the auto-dialer of the present invention.

With regard to "wake-up" features, in one embodiment, the auto-dialer 100 incorporates a reflective surface, e.g., a reflective ring 160 as illustrated in FIG. 10A or other component which can be detected by an interface of e.g., an ATM machine. For example, an ATM machine may detect the presence of the auto-dialer 100 because of its unique shape when it is place in contact with the ATM machine. As will be discussed below, with regard to FIG. 10A, the auto-dialer 100 may include a notch or cut out designed to mate with the shape of the input area of the interface with which the auto-dialer 100 is intended to communicate. Because of the auto-dialer's reflective ring 160 shape, or other physical characteristic, the interface of the machine with which the auto-dialer 100 is designed to communicate can detect the presence of the auto-dialer 100 and signal the auto-dialer through, e.g., a series of tones, to become active, e.g., "wake-up". Accordingly, the auto-dialer 100 permits interfacing hardware to recognize the presence of the auto-dialer 100 by, e.g., the presence of a highly reflective material, e.g., a mirrored film or other similar material, which reflects an emitted light from the interfacing hardware in such a fashion as to cause a light detecting sensor in the interfacing hardware to sense the reflection of such light, and upon the sensation of such light, cause the interfacing hardware to emit a predetermined set of tones which will cause the autodialer 100 to become active and enter a mode of operation which may not otherwise be available to the user.

The ROM 106 includes a series of memory locations which contain information that serves as a set of permanent data tables, as well as a computer program instructions for controlling the operation of the microprocessor 104. The permanent data tables may contain e.g., long distance carrier information, area code information, data encoding/decoding information, and/or credit service related information as will be described further below.

The RAM 108, on the other hand, is used to store information that is device dependent, is likely to change, or for other reasons is more easily stored in an alterable memory device than in a ROM. As illustrated by the representative memory map 211, the RAM 108 may dedicate memory space to storing DTMF transfer and receive parameters 214 used for encoding/decoding signals, mode tone pairs information 216, e.g., frequency information relating to supported tone pairs, display memory 218, system control data 224, e.g., calibration parameters, user data 222, (e.g., destination phone numbers and billing information relating to the individual who is authorized to use the auto-dialer 100) and device data 220, (e.g., one or more numeric or alpha-numeric sequences which identify the particular auto-dialer 100, manufacturing date information, etc.).

Figure 4:
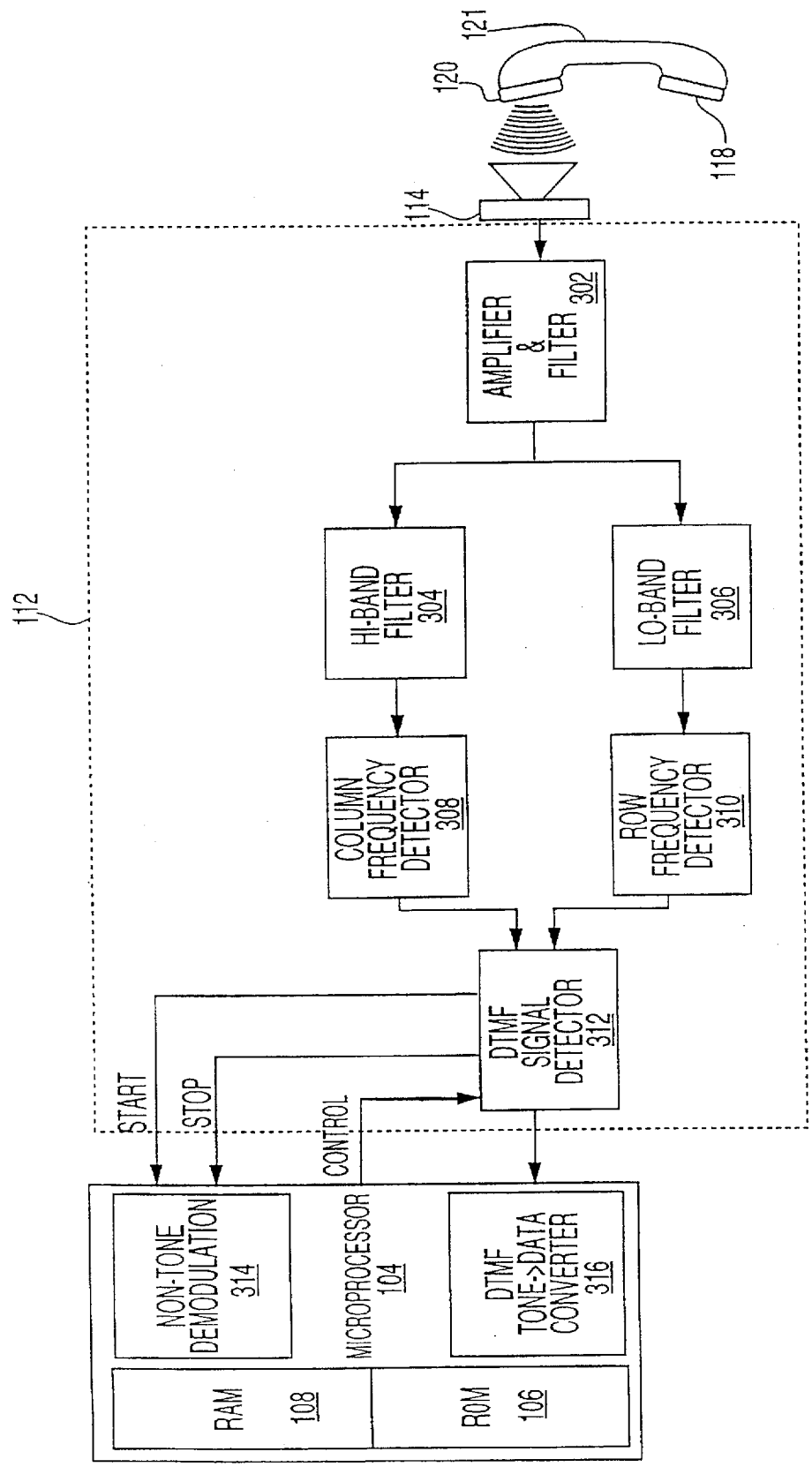
FIG. 4 is a diagram illustrating DTMF decoder circuitry suitable for use in the auto-dialer of FIGS. 2 and 3.

A circuit suitable for use as the DTMF decoder circuit 112 illustrated in FIGS. 2 and 3 will now be described with reference to the schematic block diagram of FIG. 4. As illustrated in FIG. 4, the DTMF decoder circuit 112 comprises an amplifier and filter circuit 302 that has an input coupled to the output of the speaker/microphone 114 and a received signal output coupled to the input of a Hi-band passband filter 304 and a Lo-band passband filter 306. In this embodiment, the speaker 114 acts as an inductor converting acoustic signals received from, e.g., the speaker 120 of the telephone handset 121, into electrical signals which are amplified and filtered by the amplifier and filter circuit 302 and then further filtered by the passband filters 304, 306. The Hi-band passband filter 304, is designed to pass the corresponding Hi-band frequency DTMF signals while eliminating noise and other signals. Similarly, the Lo-band passband filter 306 is designed to pass the Lo-band frequency DTMF signals and to eliminate other signals. In this manner, the Lo-band and Hi-band signals are segregated from each other with noise, i.e., signals having frequencies outside the bands of the DTMF signals being removed to facilitate the later decoding of the signals.

An output of the Hi-band filter 304 is coupled to the input of a column frequency detector 308 for detecting which frequency of the set of Hi-band tone frequencies is being received. Similarly, the Lo-band filter 306 has an output coupled to an input of a row frequency detector 310 for detecting which frequency of the set of Lo-band frequencies is being received. In particular embodiments, the column and row frequency detectors 308, 310 as well as Hi and Lo band filters 304, 306 may be designed to recognize and pass additional Hi-band and Lo-band tones, respectively, which are outside the range of standard DTMF tones to thus increase the number of signals which can be used to transmit data to add additional security, increase data transmission rates, or provide additional features.

An output of the column frequency detector 308 and an output of the row frequency detector 310 are coupled to corresponding inputs of a DTMF signal detector 312. The DTMF signal detector 312 receives the Lo-band and Hi-band tones output by the column and row frequency detectors 308, 310 along with information signals indicating the frequency of the received tones. The DTMF detector 312 determines if the received tones constitute a valid tone pair or other signal which the DTMF signal detector 312 is programmed to recognize. If the DTMF signal detector 312 detects a valid tone pair or a signal it recognizes, it sends a signal to a DTMF tone to data converter circuit 316 of the microprocessor 104 to convert the detected DTMF tone or signal into the data it represents, e.g., a symbol or number.

Because the auto-dialer 100 is programmable, it may be programmed or reprogrammed to accept one or more signals as valid tones. These tones may include tones other than those used for standard DTMF signals. Furthermore, it can be programmed to reject or ignore input data which does not conform to predetermined signal characteristics which are stored in the RAM 108 of the auto-dialer 100. In one embodiment, these signal characteristics (e.g. maximum tone-length) may be remotely modified via, the acoustic reprogramming of the auto-dialer 100 in response to the auto-dialer 100 receiving a series of DTMF tones. Such tones act as a signal or key which is required to enable the reprogramming of the auto-dialer 100. In addition, because the auto-dialer 100 is designed to be both responsive to, and capable of, generating audio tones, e.g., both standard and encoded DTMF tones, as will be described below, the auto-dialer 100 is capable of receiving, storing and transmitting both standard and encoded DTMF tones for a variety of purposes including for use as passwords and "keys" to enable certain functions of the auto-dialer 100 or the device which the auto-dialer 100 is used to communicate with.

In yet another embodiment, the auto-dialer 100 is programmed to, upon the receipt of pre-selected series or group of tones, representing commands or instructions to the microprocessor 104, perform mathematical computations based on either data stored within the auto-dialer 100 and/or on data which is received by the auto-dialer 100 in response to the received commands. In such an embodiment, the performed computation(s) is in accordance with a received instruction and is performed in such a manner that a user can not effect the result of the computation by manipulating the keys on the auto-dialer 100. In this manner, the auto-dialer 100, because of its programming and ability to receive commands and data from an outside source, can perform, e.g., debit/credit calculations with the user being unable to manipulate the result from the device control keys 105 of the auto-dialer 100. Additional security features to prevent unauthorized manipulation of data stored in various locations within the memory 106, 108 of the auto-dialer 100 will be discussed below.

As discussed above, for security reasons, the reprogramming feature is, in some embodiments, enabled only upon the receipt of a pre-selected group of acoustic tones which serve as a key to indicate to the auto-dialer 100 that an authorized individual is in fact reprogramming the device. Different acoustic keys or tone sequences may be used to limit access to different memory locations. In this manner, one key, e.g., a series of tones, may be required to reprogram one memory location while another key may be required to reprogram another memory location. In this manner, the ability to alter the contents of various memory locations containing, e.g., personal identification telephone numbers, prefix information, etc. can be restricted so that the user cannot change the contents of certain memory locations and so that only services authorized to alter particular items in memory, dialing prefixes, country codes, etc. can alter such information. In such an embodiment, a first series of tones is required to alter the contents of a first memory location while a second series of tones is required to alter a second memory location. Additional tone sequences or "keys" may be associated with additional memory locations.

In one embodiment, the DTMF signal detector 312 of the present invention referred to as an enhanced DTMF signal detector is able to detect alterable characteristics of a DTMF signal, e.g., signal twist, Lo-band and Hi-band tone amplitude, Lo-band and Hi-band tone duration, tone frequency, etc. which may be used to encode information into a DTMF signal without affecting the ability of a standard DTMF signal detector to detect the symbol/number represented by a DTMF tone pair. If the DTMF signal detector 312 detects encoded information the encoded information is supplied to the DTMF tone to data converter 316 for processing. A particular signal or sequence of tones is used in some embodiments to provide an indicator signal to indicate to a receiver that encoded DTMF signals are being transmitted. In such embodiments, a DTMF signal detector detects the receipt of encoded DTMF signals by checking a received signal for such an indicator signal or indicator sequence of tones.

The DTMF signal detector 312 also has start and stop signal outputs coupled to corresponding inputs of a non-tone demodulation circuit 314 of the microprocessor 104. In this manner, the non-tone demodulation circuit 314 receives timing information concerning the starting and stopping of each received signal. As will be discussed below, this information can be used, in accordance with one embodiment of the present invention, for decoding information encoded into one or more DTMF signals and/or for distinguishing of a string of signals which represent meaningful data as opposed to nonsense signals added for security reasons as well as to enable the device to provide non-frequency dependent data that is encoded into the interdigit periods, i.e., the time between DTMF tone pairs.

Figure 5:
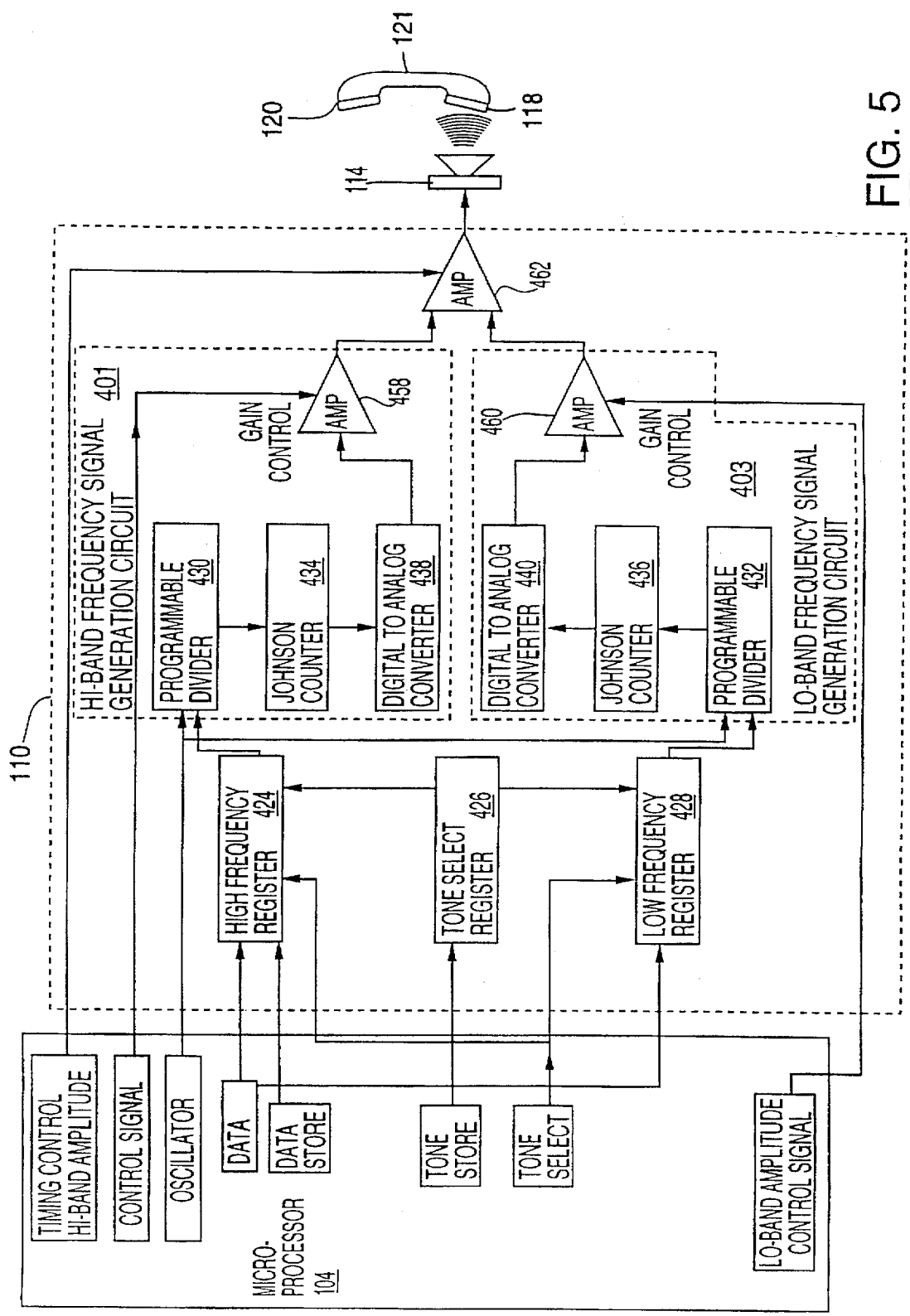
FIG. 5 is a diagram illustrating DTMF encoder circuitry suitable for use in the auto-dialer of FIGS. 2 and 3.

Referring now to FIG. 5, DTMF encoder circuit 110, which may be used as illustrated in FIGS. 2 and 3, will now be described in detail. The DTMF encoder 110 comprises a high frequency register 424, a tone select register 426, and a low frequency register 428.

The high and low frequency registers 424, 428 have a first input coupled to a data output of the microprocessor 104, a second input coupled to a tone select output of the microprocessor 104 and a third input coupled to a tone select signal output of the tone select register 426.

The tone select register 426 receives tone signal information from a tone store output of the microprocessor 104 which is then processed to generate a control signal which is supplied to the low and high frequency registers 424, 428 through the third input of the registers 424, 428.

The high and low frequency registers 424, 428 are responsive to signals receiver from the microprocessor 104 and the tone select register 426 to produce a control signal indicating the fraction of the microprocessor's clock frequency the desired Hi and Lo tones correspond to.

The Hi-band DTMF tone of each DTMF tone signal pair is generated by a Hi-band frequency signal generation circuit 401. The Hi-band frequency signal generation circuit 401 comprises a programmable divider 430, which is coupled to a Johnson counter 434. The Johnson counter 434 is coupled to digital to analog converter 438 which has an output coupled to an amplifier 458 which is responsible for amplifying the Hi-band DTMF tone signals of each tone pair.

The programmable divider 430 receives as input signals the output of the high frequency register 424 and the microprocessor's oscillator. Using the control information provided by the high frequency register 424, the programmable divider generates a digital signal having the desired frequency of the Hi-band tone to be generated from the oscillator signal. This digital signal is then further processed by the Johnson counter 434 before being converted into an analog signal by the D/A converter 438.

It should be noted that to avoid the problems that may result from harmonics associated with squarewaves, the D/A converter 438 only generates pure sine waves. The analog Hi-tone output signal, output of the D/A converter 438, is amplified by the amplifier 458 which has a gain control input coupled to a Hi-band amplitude control signal output of the microprocessor 104.

As will be discussed below, the degree of amplification performed by the amplifier 458 is controlled by the microprocessor 104. In this manner, the microprocessor 104 can introduce intentional twist into the DTMF signal being generated and/or encode information into the DTMF signal by selectively varying signal strength and/or twist associated with the tone pairs comprising the DTMF signal being generated.

A Lo-band frequency signal generation circuit 403 comprising a programmable divider 432, a Johnson counter 436, a (D/A) digital to analog converter 440, and an amplifier 460 is responsive to the output of the low frequency register 428, the microprocessor's oscillator, and the microprocessor's Lo-band amplitude control signal, to generate the Lo-band DTMF tone in the same manner as described above with regard to the generation of Hi-band DTMF tones.

The output of each of the amplifiers 458 and 460 which comprise the Hi-band and Lo-band tones, respectively, of each DTMF tone pair being generated, are supplied to first and second inputs of a dual ported amplifier 462 for additional amplification. The amplifier 462 has a control input which is coupled to a timing control output of the microprocessor 104.

The timing control signal is used to control the amount or level of amplification the amplifier 462 provides. In addition, by asserting the timing control signal the microprocessor 104 enables the amplifier 462 during periods of data transmission. On the other hand, when the speaker/microphone 114, which has an input coupled to the output of the amplifier 462, is being used as a receiving device or microphone, the microprocessor 104 de-asserts the timing control signal thereby deactivating the amplifier 462 and thus the output of the DTMF tone encoder 110. The timing control signal may also be used to inhibit signal output during the interdigit periods.

Various features of the present invention, directed to overcoming the data error, security and convenience problems associated with known auto-dialer devices will now be described with reference to the auto-dialer 100.

Each feature of the present invention will be discussed in detail below beginning with a discussion of the features of the present invention which are directed to reducing the error rate associated with the acoustic transmission of information represented by DTMF signal tones, e.g., telephone number and credit card number information, from the auto-dialer 100 of the present invention to a DTMF signal receiver such as a telephone handset 121. This particular feature of the present invention may be described as an error avoidance feature.

I. Error Avoidance Features

In accordance with the present invention, several methods are used to avoid or compensate for the occurrence of errors commonly associated with the acoustic transmission of a DTMF signal to a standard telephone system, e.g., a handset. These methods are directed to eliminating, or compensating for, common sources of errors that are associated with acoustic transmission of a DTMF signal. The methods of error avoidance of the present invention will generally be discussed according to the source of the error and the particular method of the present invention directed to eliminating or compensating for such error sources.

A. Third Tone Errors

One of the most common sources of errors associated with known acoustically coupled auto-dialers is generally referred to as the "third tone" problem. This problem is, as the name suggests, associated with the detection of a third, otherwise valid tone, at the detector stage of a receiver where a DTMF tone signal is being decoded. As described above, a DTMF tone signal is only considered valid if it includes a single pair of valid tones, i.e., one valid Hi-band tone and one valid Lo-band tone. Thus, when multiple valid Hi-band or Lo-band tones are received at the same time, the DTMF signal is considered invalid and can not be properly decoded. The relative amplitude of a received tone compared to the other received tones may, in some cases, be used to distinguish valid tones from erroneous invalid tones.

When used as collectors of DTMF tones, carbon based microphones, which are commonly used in standard telephone handsets because of their low cost and high degree of reliability, often generate and transmit erroneous tones, e.g., third tones, in addition to the tones actually received by the microphone. Such errant third tones can cause errors in some tone detection receivers, and particularly those systems which do not utilize digital signal processing equipment for tone detection.

The transmission of DTMF tone signals through carbon microphones causes the carbon granules within the carbon microphone to vibrate in relation to the driving frequencies. As a result of the harmonic effect of the varying vibrations of the granules, various residual tones are generated, with the third tone being the most powerful of these residual tones. This third tone can be relatively powerful, e.g. as much as one half the power level of the higher of the two received acoustic DTMF tones passing through the microphone. The frequency of this third tone will normally be the arithmetic difference between the frequencies of Hi-band and Lo-band tones being received by the carbon microphone.

Referring now to FIG. 8A, there is illustrated a chart with four columns. In the chart, the number or symbol in the first column 11 represents those numbers or symbols available on a standard telephone keypad. The second column 13 represents the no-band frequency associated with the corresponding number or symbol in the first column 11 while the third column 15 represents the corresponding Hi-band frequency. The fourth column 17 represents the fundamental difference between the no-band and Hi-band frequencies listed in columns two and three 13, 15. It is this fundamental difference in frequency that represents the frequency of the third tone that is generated by a carbon microphone when the corresponding Lo-band and Hi-band frequencies are received. As will be discussed further below, the fundamental difference frequency, or third tone frequency associated with the symbols/numbers 3, 6, a, b, c, and d will fall within the passband of the filters of many standard DTMF detectors.

The third tone error problem is particularly significant with regard to the tone pairs representing the numbers symbols 3, 6, a, b, c, and d because, in their case, the third tone created from the harmonic effect associated with the carbon microphone falls within the tolerance range of the low frequency band tones and the band pass filters corresponding to these frequencies. Thus, in the case of these numbers and symbols, the third tone signal will fall within the passband of the filters of many standard DTMF detectors and will therefore not be filtered out.

As discussed above, the presence of such an errant tone within the frequency range of valid tones, may cause a detector to detect two valid Lo-band tones, when only one should be present. While the power level of the deliberately generated tone will normally be much higher than the errant signal tone, without the use of digital signal processing which is able to select the tone with the higher power level, a detector will have difficulty in determining which of the two Lo-band tones received should be used. Normally, when the DTMF detector is unable to select the valid or deliberate tone from the two Lo-band tones, the DTMF tone detector will ignore the tone-pair signal which includes the third tone, causing the entire dialed string to be lacking the errant digit and, thus, preventing the connection of the call or the completion of a data string being used for other purposes.

While the third tone will not always be of such an intensity that it results in an error, and while digital signal processing in DTMF detectors is becoming more common, for an acoustically coupled auto-dialer 100 to offer maximum versatility it must be capable of transmitting telephone and credit card number information accurately to the vast majority of existing telephone systems including those that do not perform such digital signal processing. Accordingly, the third tone problem associated with carbon microphones needs to be reduced or compensated for to increase the reliability of acoustically coupled auto-dialers if such auto-dialers are to work reliably with the vast majority of existing telephone systems.

The present invention, addresses the third tone problem in two ways. The first approach is directed to avoiding using symbols/numbers which are likely to produce third tone errors. The second approach is directed to altering the nominal frequency of the tones which are likely to generate third tone errors in an attempt to avoid such errors.

i. Avoidance Of The Use OF Symbols/Numbers Likely To Produce Third Tone Error Problems As discussed above, the first approach of the present invention for dealing with the third tone problem revolves around avoiding the use of numbers/symbols that are most likely to produce the problem in the first place, i.e., the numbers/symbols 3, 6, a, b, c, and d. Because most credit card, calling card, and telephone numbers use only the digits 0 through 9 found on standard, non-extended keypads such as those found on pay phones, most third tone problems can be eliminated by merely avoiding the use of the numbers 3 and 6.

Thus, in accordance with one embodiment of the present invention, when assigning numbers, e.g., telephone numbers which must be used to obtain connection, e.g., via a local telephone switching office which may not contain digital signal processing equipment, to a central office, only the digits 0, 1, 2, 4, 5, 7, 8, and 9 are used. In this manner, third tone problems associated with the numbers/symbols 3, 6, a, b, c, and d are avoided when sending information to telephone switching offices which may not have digital signal processing equipment capable of distinguishing the actual tone from the undesired third tone signal.

Once a connection has been made to a telephone switching network with digital signal processing equipment, such as the type currently found in most long distance carrier telephone switching offices, the risk of errors due to third tone problems will be greatly reduced. Thus, all digits may be used including 3, 6, a, b, c, and d once a connection has been established to a system known to include digital signal processing equipment. Accordingly, the primary time for avoiding the digits associated with third tone problems is when establishing connections to local offices or other telephone switching networks which may not contain the digital signal processing circuitry required to avoid third tone problems.

By avoiding the use of the numbers/symbols 3, 6, a, b, c, and d in the above described manner, the vast majority of third tone problems can be avoided without the need for digital signal processing circuitry in a DTMF detector and without modifying the DTMF signal generator.

ii. Generation Of Tone Pairs Wherein The Arithmetic Difference of the Generated Tones Comprising Each Tone Pair Will Fall Outside The Range Of The Bandpass Filters Included In Standard DTMF Detectors The second approach of the present invention to avoiding third tone error problems involves the generation of tone pairs wherein the arithmetic difference between the generated tones comprising each tone pair will fall outside the range of the bandpass filters included in standard DTMF generators.

Because of manufacturing tolerances and component differences, DTMF generators will vary slightly in output frequency from one DTMF signal generator to another even though the nominal frequencies, which represent the frequencies the DTMF generators are designed to produce, will normally be the same. Thus, DTMF detectors are designed to detect, i.e., accept as valid, a range of frequencies corresponding to the Lo-band and Hi-band DTMF tone frequencies.

Referring now to FIG. 8B, there is illustrated a chart of the frequency accept range of a standard DTMF detector circuit. As illustrated, the accept range is ±1.5%+2 Hz of the nominal frequency illustrated in the center column of the chart shown in FIG. 8B. Referring now to FIG. 8C there is illustrated a chart of the frequency reject range of a standard DTMF detector circuit. As illustrated, the reject range is ±3.5% of the nominal frequency illustrated in the center column of FIG. 8C. Referring now to FIG. 8D, there is illustrated a chart of the out of range frequencies of a standard DTMF detector circuit. These frequencies represent frequencies outside the accept/reject ranges of a standard DTMF detector which cannot be recognized by a standard DTMF detector circuit in a reliable manner. Referring now to FIG. 8E, there is illustrated a composite chart of standard DTMF tone detector circuit reject and accept ranges. In particular, the chart of FIG. 8E illustrates the standard accept/reject ranges associated with each of the eight nominal tone frequencies listed in the center column of the chart.

Because the Lo-band and Hi-band tones which will be accepted by a DTMF detector are permitted to vary over a limited range, e.g., as illustrated in the charts of FIGS. 8A–8E, it is possible to control the generation of Lo-band and Hi-band tones so that acceptable tones are generated while the arithmetic difference between the tones of any generated tone pair will be such that it will fall outside the accept range of a standard DTMF detector.

This may be done, by, e.g., providing the DTMF tone generator which produces tones having a nominal frequency that is closer to the outside limits of the acceptable frequency range of those symbols/numbers that cause third tone problems. For example, in one embodiment the auto-dialer 100 is designed to generate Lo-band frequency and Hi-band frequency tones, for the tone pairs representing, e.g., the digits 3 and 6, that will fall within a standard DTMF detector's accept range, e.g., the accept range of a MITEL™ model number MT8870D DTMF detector circuit, but will have an arithmetic difference that falls outside the detector's accept range. This can be achieved by selecting the nominal center frequencies of the DTMF tones generated by the auto-dialer 100 of the present invention, for the tones used to represent the numbers 3 and 6, towards the outer edge of the "accept range" of standard DTMF detector circuits. It should be noted that in accordance with the present invention, the microprocessor 104 can be programmed to select and control the generation of DTMF tones of various tone pairs, so that the tones of a tone pair will fall within the accept range of conventional detectors, but create an arithmetic difference which is outside the tolerance range of such detectors.

Figure 8F:
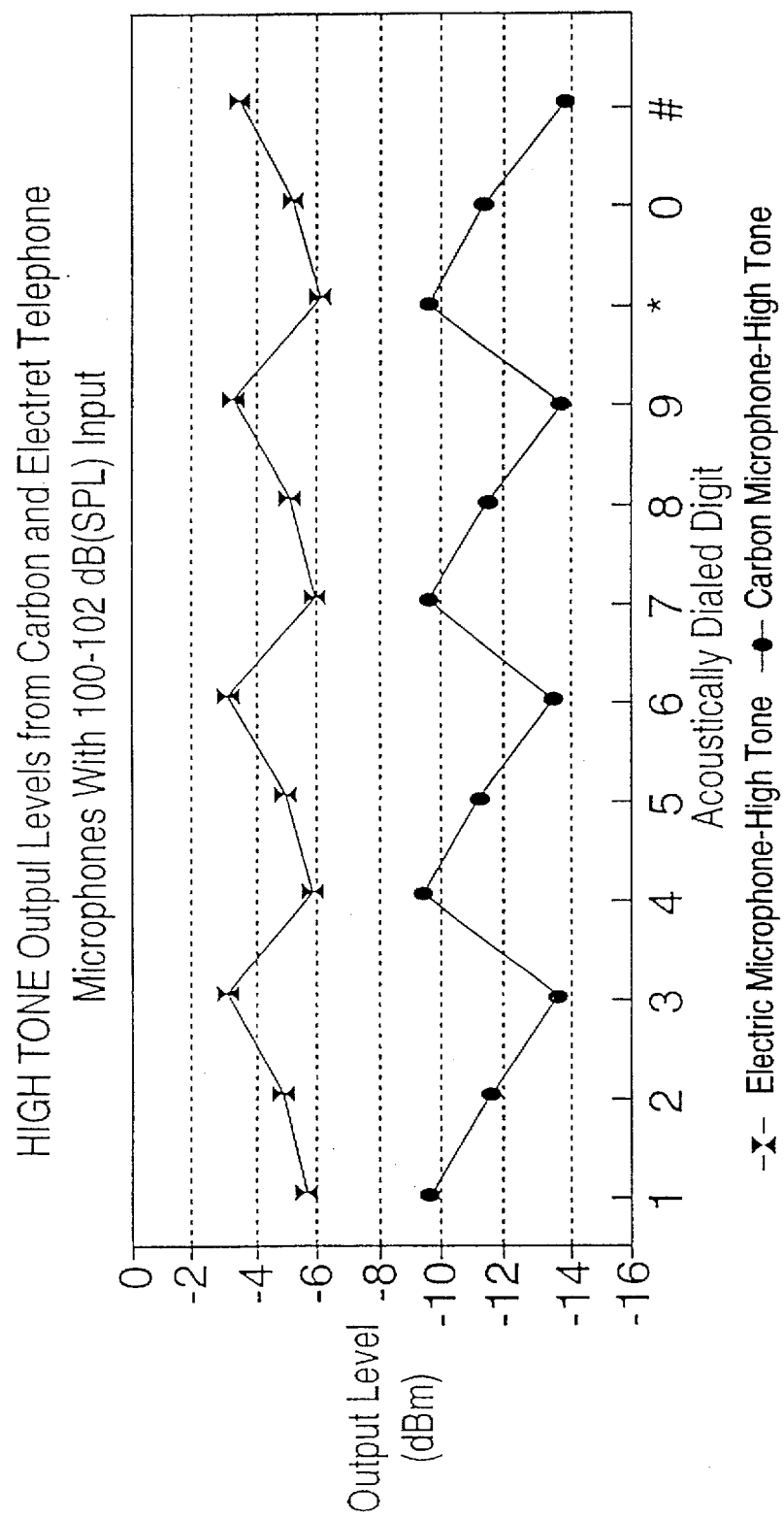
FIG. 8F is a chart illustrating exemplary output levels of both carbon and electret microphones when receiving acoustic high-frequency tones associated with the DTMF tone pair representing the indicated digits.

Referring now to FIG. 8F, there is illustrated a graph of the high tone output levels from carbon and electret telephone microphones with 100–102 dB (SPL) input for the twelve acoustically dialed digits 0–9, * and #. As illustrated, the output levels for each acoustically dialed digit is different depending on whether a carbon or electret microphone is used. In the graph, the output level varies from approximately −6 dBm to approximately −3 dBm for electret microphones and from approximately −13.5 dBm to approximately −9 dBm for carbon microphones.

Figure 8G:
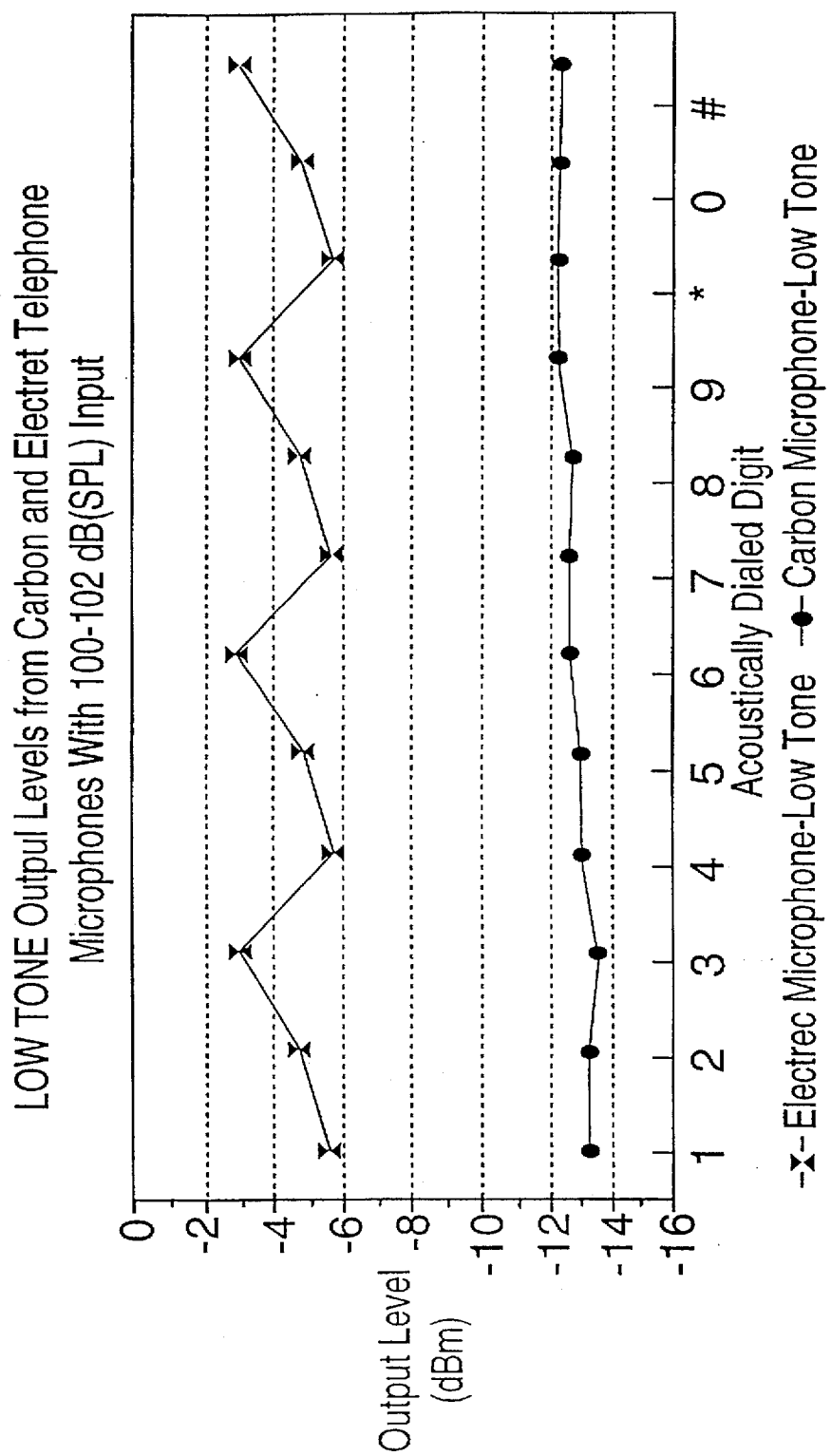
FIG. 8G is a chart illustrating exemplary output levels of both carbon and electret microphones when receiving acoustic low-frequency tones associated with the DTMF tone pairs representing the indicated digits.

Referring now to FIG. 8G, there is illustrated a graph of the low tone output levels from carbon and electret telephone microphones with 100–102 dB (SPL) input for the twelve acoustically dialed digits 0–9, * and #. As illustrated, the output levels for each acoustically dialed digit is different depending on whether a carbon or electret microphone is used. In the graph, the output level varies from approximately −6 dBm to approximately −3 dBm for electret microphones and from approximately −13.5 dBm to approximately −12 dBm for carbon microphones. The relative intensities of the high and low tones vary according to which digit is encoded. The output levels of the carbon microphone low tones vary less than −2 dBm among the twelve different acoustically dialed digits, whereas the output levels of the carbon microphone high tones vary approximately 4 dBm among the twelve different acoustically dialed digits.

Referring now to FIG. 9A, there is illustrated a chart indicating the Lo-band frequency and Hi-band frequency of the tones which the auto-dialer 100, in accordance with one embodiment is programmed to generate, for each of the listed tone pairs. As will be noted, the values in FIG. 9A vary from those of FIG. 8A as the result of the intentional use of tones which will produce valid DTMF tone pairs while avoiding third tone problems by generating fundamental differences between the Hi and Lo tones that will fall outside the frequency accept range of most DTMF signal detectors.

The significance of the fundamental frequency differences is particularly significant in light of the relative power of the third tone noise (margin) which accompanies the digits 3, 6, a, b, c, d. These noise levels approach the lower acceptable limits of standard detectors, and can, because of their frequency, be interpreted by the detectors as being considered valid tones, thus providing the detector with two Lo tone frequencies to decode.

While the generation of tones towards the outer limits of the acceptable frequency ranges in accordance with the present invention offers a method of reducing third tone problems, it also requires that the DTMF generator of the present invention be more accurate and stable than would otherwise be required to insure that the tone generator only produces DTMF tones that will fall within the acceptance range of a standard DTMF detector circuit. As will be discussed below, calibration features of the present invention help insure that the required accuracy in frequency output is achieved.

In accordance with the second approach to reducing third tone problems, the third tones generated by a carbon microphone will not be interpreted as valid Lo-frequency tones because of their frequency. In this manner, third tone problems are substantially reduced without the need for the DTMF detector circuitry to include digital signal processing circuitry.

It should be noted that while this approach provides a suitable method for eliminating or reducing third tone problems, it requires the auto-dialer 100 of the present invention to generate DTMF tones with a higher degree of accuracy then would otherwise be required. In a device that is designed to incorporate automatic calibration features, such as the auto-dialer 100 of the present invention, it may be possible to achieve the required higher standards at little or no additional cost.

B. Amplitude Variation Between Low-band And Hi-Band Frequencies Errors

In addition to errors caused by the presence of a third tone, errors may also be caused by power differences between the Lo-band and the Hi-band tone signals comprising a tone pair. These differences depend largely on the type of microphone used. Referring now to FIGS. 8F and 8G which are charts illustrating exemplary output levels of both carbon and electric microphone, for the high-tones and low-tones, respectively, it can be seen that for the carbon microphone in particular, there are significant differences between Hi-band tone signal power output levels and Lo-band tone signal power output levels of many DTMF tone pairs. This difference in signal output levels results in the introduction of twist into the received signal. As can be seen, the twist which represents distortion, that is introduced by carbon microphones can be significant.

As discussed above, each of the numbers/symbols of a standard telephone keypad is represented by a DTMF tone signal, i.e., a tone pair, comprising one Lo-band tone and one Hi-band tone. Furthermore, for such a signal to be detected as a valid signal, the difference, referred to as twist, in the power level between the Hi-band and Lo-band tone signals of any particular received tone pair must fall within a specific range for the signal to be considered valid. The acceptable range of power levels received by standard DTMF receivers in a tone pair requires that the Hi-band tone signal power level is not more than 4 dBm greater or 8 dBm less than the Lo-band tone signal power level. If these power level conditions are not met, a received tone pair will be rejected.

It has been found that carbon microphones tend to be less efficient at converting low frequency sound waves, e.g., acoustic Lo-band frequency tones, into electrical signals then they are at converting high frequency sound waves, e.g., acoustic Hi-band frequency tones, into electrical signals. This disparity in conversion efficiency introduces twist or power level differences into received tone pairs with a predictable bias generally in favor of the Hi-band tone signal.

This introduced twist, resulting from the use of carbon microphones, adds to any twist that may exist in a tone pair signal generated by an auto-dialer. While, in some cases the twist introduced by a carbon microphone may act to counter twist existing in a received tone pair, in other cases it will simply add to the degree of twist. In such a case, it may cause a tone pair which would otherwise have an acceptable degree of twist to be rejected because of the twist introduced by the use of a carbon microphone.

Because the vast majority of public telephones presently in use include carbon microphones (due to their relative ruggedness and low cost), the twist introduced by such microphones presents a potentially significant source of errors for the acoustic transmission of DTMF signals to telephone systems.

To counter this problem, in one embodiment of the present invention, the Lo-band and Hi-band tone signals are amplified separately before being supplied to the audio output device, e.g., speaker. In such an embodiment, microprocessor 104 controls the independent amplification of the Lo-band and Hi-band tones via the amplitude control signals supplied the amplifiers 458, 460 with the Lo-band tones being amplified to a greater extent than the Hi-band tones. The difference in amplification is of such a degree that the auto-dialer 100 is designed to compensate for the varying efficiency of carbon microphones in converting acoustic tone signals of different frequencies into electrical signals.

Accordingly by intentionally introducing twist into the tone pairs, e.g., by the separate amplification of each individual tone in a tone pair being generated by the auto-dialer 100 of the present invention, it is possible to counter the predictable non-linear signal conversion caused by the use of carbon microphones.

In a sense, this approach to error avoidance may be thought of as introducing intentional distortion into the relative power levels of a DTMF tone pair to compensate for the distortion expected to be introduced into the signal upon reception by a carbon microphone.

While the twist introduced by the use of carbon microphones is somewhat predictable, twist introduced by, e.g., line loss introduced by lines coupling the DTMF signal receiver to the microphone receiving acoustic DTMF signals from the auto-dialer 100 are somewhat less predictable. As the result of empirical field tests conducted using a variety of telephones, it has been found that the introduction of certain twist values into a DTMF signal will generally produce better tone recognition then will be achieved without the introduction of twist. The varying amplification of Lo-band and Hi-band tones in the tone pairs being generated is to cause the electrical signal leaving the receiving telephone instrument to be in accordance with industry standards established for optimum performance after the conversion of the received signals into electrical signals.

The amplification of the low tone at a higher gain level than that of the high tone will also tend to cause any resulting third tone to be of a lower level than that which would be achieved by amplifying both signals at a higher rate.

Referring now to FIG. 9B there is illustrated a chart which shows twist values for each of the ten DTMF tone pairs normally used for telephone dialing which have shown to produce satisfactory results under a wide range of field conditions, e.g. both urban and rural telephone conditions.

While FIG. 9B does not include the extended character set (a, b, c, d), it should be noted that these tone-pairs are not included on standard dialing pads and, therefore, are not recognized by common switching systems for the placement of calls. The use of these digits is generally limited to post-access data collection where one can be reasonably certain that digital processing equipment will be available to decode such tones, including their otherwise errant third tones.

While, as described above, it is often desirable to intentionally vary the level of amplification of each tone of a tone pair, the amount of amplification intentionally introduced should be small enough so that the maximum twist detected by a standard receiving DTMF decoder will be such that the Hi tone level is not more than 4 dB greater or 8 dB less than the Lo tone, i.e., such that the twist falls within the range of what is defined as a standard valid DTMF signal. Since different telephone microphones (e.g. carbon, electric) will transmit Hi and Lo tones with varying efficiency, because line losses can vary significantly, and because varying speakers will have different spectral output curves, the determination of optimum twist levels should be based on field tests including the generation of a plurality of twist levels, in conjunction with the use of level detection equipment at a central receiving site to determine optimum twist levels for a particular device or type of speaker that will provide for the accurate detection of the tones by a wide variety of telephones under varying conditions.

Referring now briefly to FIG. 9B, audio output signal levels and twist levels which have provided satisfactory results for the indicated tone pairs are illustrated. As can be seen from the chart in FIG. 9B, the introduction of twist levels of between −8 and +2 dBm, e.g., through the separate amplification of the Lo and Hi tones, has provided satisfactory results.

Figure 9C:
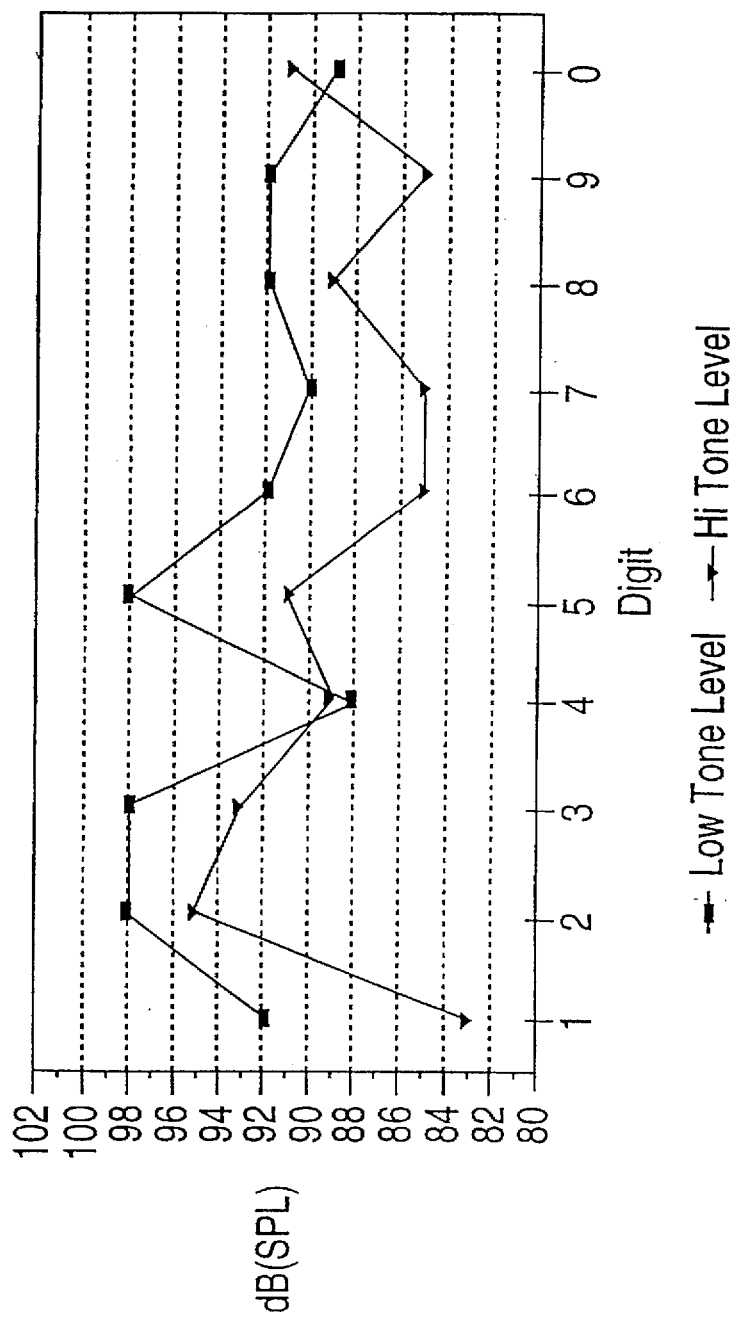
FIG. 9C illustrates acoustic output levels of Hi and Lo tones.

Referring now to FIG. 9C acoustic output levels of Hi and Lo tones corresponding to the digits 0–9 are shown. As illustrated, in order to compensate for e.g., the uneven energy conversion of Lo and Hi acoustic tones into electrical signals by carbon microphones, it is desirable to generate Lo and Hi tones having different acoustic sound pressure levels. As illustrated, by varying the sound pressure levels by as much as 9 dB (SPL), e.g., for the Lo and Hi tones corresponding to the digit 1 has proven to provide satisfactory results.

It has been found that when testing to determine the twist levels that are appropriate to be used with a device, the determination should be based on the signal characteristics received following transmission through the public telephone network or those received at the line end of one of more telephone instruments, and not simply the characteristics of locally generated/received signals.

As discussed above, the auto-dialer 100 includes separate Hi-band and Lo-band frequency signal generation circuits 401, 403 for independently amplifying both fundamental frequencies of a DTMF tone pair. This amplification of individual Lo-band and Hi-band tones may be done to pre-established, e.g., pre-programmed, and remotely alterable levels for any selected tone-pair. In addition, the autodialer's microprocessor 104 and RAM 108 can be used to store and modify parameters used to control amplification levels for each fundamental frequency, i.e., tone, of a tone-pair. As discussed further below with regard to security features of the present invention, the ability to reprogram or modify the stored amplification values may be enabled or disabled in response to the receipt by the auto-dialer 100 of a pre-selected group of tones which can serve as an access key, instruction or reprogramming command.

Just as the amplification levels of the DTMF signal, e.g., tone pairs generated by the auto-dialer 100, can be controlled by stored values or parameters, the auto-dialer 100 can adjust the levels of amplification which are applied to signals received by the autodialer's audio transducer, e.g., speaker/microphone 114. In addition, the stored information for controlling amplification levels may be reprogrammed in response to signals received by the auto-dialer 100 with the reprogramming feature being enabled/disabled in response to the receipt of a preselected series or group of tones that may be stored in the RAM 108.

C. Errors Resulting From Insufficient Signal Power

In addition to third tones and excessive twist, errors may also result from insufficient signal strength, i.e., power, at the microphone of the receiver. As discussed above, one of the conditions for a tone pair signal being interpreted as a valid DTMF signal is that each tone in the tone pair received at the DTMF detector have a signal power level that falls within the range of 0 to –25 dBm.

As a practical matter, the minimum sound pressure level of an acoustically coupled and generated tone that will be recognized by a standard DTMF detector is a function of the distance of the tone source, e.g., audio output device 114 of the auto-dialer 100, to the inductor, microphone 118 of a receiving device. In addition, the power level of the received signal will depend on the energy of the signal output by the auto-dialer 100, the directionality of the sound waves, and any apparatus provided to focus the sound waves towards the microphone. Because of these factors, the movement of the speaker/microphone 114, of the auto-dialer 100 away from a microphone during detonation, i.e., output of the tones being generated, can result in a sufficient decrease in the power level of the signal received at the handset's microphone 118 to cause a tone-pair to be rejected.

The present invention is designed to insure that the audio signal received at the microphone 118 of a telephone 122 has sufficient acoustical power that the electrical signal produced therefrom will be detectable as a valid DTMF tone signal.

In one embodiment of the present invention, a proximity detector 228, such as a pressure switch or light sensor, is incorporated into the audio dialer 100 of the present invention to detect the auto-dialer's proximity to a telephone handset's microphone 118. In such an embodiment, when the autodialer's speaker 114 is placed in close proximity to the handset's microphone 118, the tone signal output of the auto-dialer 100 is enabled. In the event that a user moves the auto-dialer away from the handset's microphone 118, as indicated by the output of the proximity sensor 228 and detected by the microprocessor 104, the auto-dialer 100 will prevent or cease the output of DTMF tones and indicate, e.g., through the use of a user—noticeable signal, e.g., an audible signal or a message on the display of the auto-dialer 100, that the auto-dialer 100 should be placed closer to the microphone 118. Such a output may be incorporated into the display device 202.

In this manner, tones will be generated only when the speaker/microphone 114 of the auto-dialer 100 is in close enough proximity to the handset's microphone 118 to prevent or limit the number of errors that might otherwise occur due to lower or varying tone characteristics due to a varying or excessive distance between the output of the auto-dialer 100 and the corresponding handset's microphone 118 resulting from a user moving the auto-dialer 100 away from the handset's microphone 118 while tones are being generated.

As discussed above, in order to insure that a user keeps the auto-dialer 100 in close proximity to the microphone of a receiver when pulsing out tones, in one embodiment, as illustrated in FIG. 3, the auto-dialer 100 also includes an audio and/or visual tone output indicator 103, e.g., a light or buzzer, coupled to the DTMF encoder output, to indicate to a user when the auto-dialer 100 is pulsing out tones. In this manner, the auto-dialer 100 provides a signal to the user that the user should keep the auto-dialer 100 in close proximity to the receiver's microphone to avoid errors.

In addition to the use of a proximity sensor 228, the housing of the auto-dialer 100 of the present invention (see, FIGS. 10A–10D) is designed to be relatively small making it easy to visually or manually center the speaker/microphone 114 of the auto-dialer 100 over a telephone handset's microphone 118. Tests have shown that failing to properly align the speaker/microphone 114 with the center of the handset's microphone 118 can result in a wide range in terms of signal intensity as detected by the microphone 116. In addition to being small in size, the housing includes a circular area designed to easily mate with the speaker end of a standard handset. Thus, by the design of auto-dialer's housing, a user can easily align the center of the transducer with the center of an interfacing microphone or speaker so as to provide for the uniform transmission/reception of tones.

Referring briefly to FIG. 10A, a bottom view of the auto-dialer housing 101 is illustrated. As illustrated, the auto-dialer 100 has a housing 101 which has a head portion 130 with audio output openings 150 to allow sound out. From the bottom planar view of FIG. 10A, the head has a generally circular appearance. The head portion 130 is designed to be smaller in diameter than most telephone mouthpieces, e.g., less than 6 cm in diameter. In one embodiment, the circular head portion 130 is designed to be approximately 34 millimeters (mm) in diameter. This is sufficiently small to permit the auto-dialer 100 to be easily centered, by visual inspection, with the microphone of a wide variety of telephone handsets including the handset of a NYNEX public telephone which, in one field test, was found to contain a microphone having a diameter of approximately 6 cm. While other microphones used in mouthpieces will vary in size, the relatively small size of the head portion 130 should permit easy, yet relatively precise, visual and manual alignment, e.g., centering with most telephone handset based microphones in use today.

The ability to visually center the auto-dialer 100 of the present invention with the microphone of a handset is important because mouthpieces on handsets frequently vary in size and shape making it difficult to use a circular gasket or other device to aid in the centering of auto-dialer speakers with the microphone contained in a mouthpiece of an increasing number of telephones, which do not have a locating ring as was the custom with telephones built many years ago.

Thus, because of the shape, e.g., generally circular appearance when viewed from above or below, and small size of the head portion 130 of the auto-dialer 100 it is possible to easily center it using visual techniques which may not be possible using a rectangular shaped housing or other type of housing which makes it difficult to see the handset's microphone 118, and thus its center, when the auto-dialer 100 is placed in close proximity thereto.

Other features of the present invention are also designed to enhance the efficiency of the transfer of and acoustic DTMF signal to the microphone 118 of a telephone handset 121. For example, in one embodiment of the present invention a relatively sound transparent barrier, as opposed to a sound baffling barrier, is used to encircle the area of the autodialer's case near audio output openings 150. The barrier is used to reduce the resulting harmonics when the case of the auto-dialer 100 makes contact with an interfacing, e.g., telephone. However, the barrier is not designed to occlude ambient sound from entering the column between the device and microphone.

Testing has shown that when using a baffle in conjunction with an electret microphone it is important to maintain at least a 25% open air flow between the autodialer's speaker and the microphone.

Accordingly, while an isolating barrier, such as a gasket, may be used between the autodialer's speaker/microphone 114 and the handset's microphone 118 to reduce the level of ambient noise transmitted to the handset's microphone 118, in general, higher device output should be provided in lieu of such an isolating barrier. The use of higher signal output levels is generally more effective than the use of such isolating barriers because there will normally be some ambient noise present during the use of an auto-dialer 100 regardless of the presence of a gasket since, e.g., most handset housings are reasonably good conduits for ambient sound to the microphone 118.

Therefore, while a gasket interface between the auto-dialer 100 and the interfacing microphone may be appropriate to reduce the possibility of harmonics arising from the movement of the auto-dialer 100 on the surface of the microphone, the gasket should not be intended to provide isolation of the generated tones from the ambient noise environment.

The use of high audio output signal levels, e.g., 95 to 114 dB(spl), has proved to present advantages with regard to transmitting a DTMF signal to carbon microphones found in handsets 121. Significantly, testing has shown that such relatively high power levels do not present problems when the auto-dialer 100 is used with electret microphones, which are generally more efficient than carbon microphones at transferring acoustic signal into electrical signals, as long as there exists an air escape route in any baffle positioned between the interface of the auto-dialer 100 and the housing of the electret microphone. In particular, tests were performed using a 115 dB (spl) output level with a electret microphone and no significant deterioration in the signal to noise ratio (S/N) or increase in the relative power level of the third tone signal were detected.

While a transmitted tone of 115 dBm will most likely be received having an instantaneous power level in excess of the average power level permitted by the Bell System Spec 103 hereby expressly incorporated by reference, for a signal used for standard call processing, the average power level as defined in the specification is the average power level of a signal received over a three second period. Since DTMF tones must be followed by an interdigit period of at least 35–40 milliseconds, as long as the tone, even at the 115 dBm level, is generated for less than one second, the resulting average power level received at the receiving call processing switch will fall within the maximum permitted power level limits.

D. Manufacturing Tolerances And Their Effects On The Production Of Recognizable Tones The various methods of avoiding some of the normal errors associated with the acoustic transmission and reception of DTMF signals discussed above rely on the ability to accurately generate DTMF tones of a desired or nominal frequency, intensity and duration.

The ability to generate an audio tone at a designated frequency is a function of the hardware being used to produce the tone. Despite manufacturer's claims of close tolerances among similarly manufactured devices used in auto-dialers, it has been found that auto-dialer components and output devices in particular, vary in a significant manner with regard to the frequencies and power levels needed for accurate operation of an auto-dialer. For example, a variety of speakers from several manufacturers while being presented by the manufactures as being "identical" produced a wide range of variations with regard to their efficiency and ability to accurately generate particular tones.

Since the degree of variations between components is largely a function of the cost of the components, as one attempts to manufacture an auto-dialer at a commercially acceptable cost, the variation in the outputs of the auto-dialers produced can be significant.

In one test, otherwise identical auto-dialers manufactured by the same manufacturer to commercial tolerances exhibited output variations of as much as 15% in signal acoustic intensity levels. In addition, they exhibited variations in twist for the same tone-pair of between +3 dBm and −3 dBm.

While digital signal processing employed by some telephone switching systems may be capable of tolerating some of the variations that exist between known auto-dialers outputs, to insure acceptable error rates and compatibility with the vast majority of telephone systems, a method of generating precisely defined, stable tones is required.

In accordance with one embodiment of the present invention, variations in signal output that exist between auto-dialers are minimized by the individual calibration of each auto-dialer 100.

In particular, in accordance with the present invention, the auto-dialer 100 is designed to be programmable and to support both factory and auto calibration features which permit the auto-dialer 100 to be calibrated and adjusted by varying various calibration parameters stored in the RAM 108 and/or ROM 106. These calibration parameters control, e.g., the acoustic sound pressure level of each tone in a tone pair that may be generated as well as the frequency of the individual Lo-band and Hi-band tones that are generated. In the event of remote recalibration, pre-established bench marking tone levels are generated so as to compensate for microphone related transmission system line losses and distortions thus permitting accurate recalibration of tone characteristics.

In addition, calibration of the system clock may also be performed either at the factory or from a remote location, e.g., via communication of clock calibration information over a telephone system. For example, in one embodiment, the auto-dialer 100 is responsive to a calibration signal to permit the setting of the auto-dialer's system clock and, upon the subsequent receipt of another pre-determined signal, e.g., a sequence of tones stored in memory, permits the calibration of the clock based on the internal clock's deviation from the standard time since the clock's previous setting, as measured by a calibration device. Thus, in accordance with this embodiment, the auto-dialer 100, upon the receipt of a preselected and/or remotely generated signal, permits the establishment of a system time by setting the auto-dialer's clock, and, upon subsequent receipt of another pre-defined signal, permits the calibration of such system-time based on the deviation in time which occurred from the time the auto-dialer's clock was last set. Calibration of a clock in this fashion, i.e., establishing the number of counts that the clock being calibrated is divergent from a standard based not only on the actual current difference, but also the time interval since it was last calibrated, permits a much higher degree of future accuracy than can be achieved by simply setting and resetting the actual time.

As will be discussed further below, the auto-calibration and other programming features of the auto-dialer 100 of the present invention give it the ability to monitor, process, and store, the transmission-related characteristics of output tones, and to cause the device and its components to alter its output in accordance with pre-established characteristics or output parameters stored in the RAM 108 or ROM 106. Furthermore such auto-calibration procedures/features may be triggered by either the auto-dialer 100 receiving a pre-selected group of tones, or upon other pre-determined conditions, e.g., first use of the auto-dialer 100 after a 24 hour period of inactivity, when a thermistor indicates a change in temperature, when the battery voltage is at pre-determined levels, etc.

Thus, in accordance with the present invention, the microprocessor 104 can receive calibration commands instructing it to initiate a calibration routine via, e.g., the DTMF decoder circuit 112.

These commands may be received acoustically, e.g., from a speaker in a telephone handset or from alternative command generator devices (e.g. manufacturing test equipment, automated teller machines, etc.) via either electrical or acoustical connections to the auto-dialer 100, e.g., a secondary input/output device 133 coupled to the microprocessor 104. Accordingly, calibration may be done either remotely, e.g., by connecting the auto-dialer 100 acoustically to calibration equipment using a standard telephone or directly by placing the auto-dialer 100 in actual wired connection to calibration equipment.

As part of the calibration routine, the auto-dialer 100 generates one or more of the Lo-band tones and Hi-band tones in a predetermined sequence. These tones are received by calibration equipment acoustically coupled to the auto-dialer 100 and checked to determine how much the received tone output varies from the desired tone output in terms of such characteristics as frequency, output level and duration. Using the information gained in this manner, the calibration equipment determines the adjustments required in the parameters used to control the generation of each tone signal to correct for the detected deviations from the desired tone characteristics. The adjustments are then supplied to the auto-dialer 100 through, e.g., a series of acoustic signals, representing, e.g., programming commands and control data, which cause the auto-dialer 100 to store adjustment parameters in the RAM 108. In this manner, each auto-dialer 100 of the present invention can receive commands causing it to adjust the level and fundamental frequency of each tone pair and the overall twist of the tone pair. Accordingly each manufactured auto-dialer 100 can be easily calibrated on an individual basis to maximize auto-dialer performance. Furthermore, because such calibration can be done over a standard telephone line, individual auto-dialers 100 can be calibrated periodically, if necessary, by calling a central office or as part of a routine auto-dialer program update procedure conducted via a routine telephone call to an update service.

The adjustment parameters stored in the auto-dialer 100 in response to acoustic programming commands are used by the processor 104 when generating DTMF tones in the future. Thus, the auto-dialer 100 can be easily calibrated and programmed to compensate for manufacturing variations. In the described embodiment, the auto-dialer 100 contains software enabling the auto-dialer's output to be adjusted to conform to pre-determined standards, e.g., the standards set for telephone dialing and touch tone recognition, in response to a series of signals, such as a series of DTMF tones, received from calibration equipment.

Generally, the auto-dialer 100, under the control of the microprocessor 104, can, upon receiving a predetermined string of tones, respond with either a preestablished selection of data as indicated by the received string, or, if such selection is not available, respond with other data. Thus, the auto-dialer 100 will transmit pre-defined diagnostic and other condition indicative information upon the receipt of pre-defined tones.

In one embodiment, the auto-dialer 100, contains software enabling the calibration of the auto-dialer's audio output to conform to pre-determined standards whereby calibration equipment provides a pre-established set of tones which causes the auto-dialer 100 to send a string of tones which represent the spectrum of tones which the auto-dialer 100 will, in normal operation, be called upon to create, and the provision by the calibration setup equipment to provide instructions to the device to alter characteristics of any tone (or aspect there of) which fails to conform to the pre-established standard.

Because the auto-dialer 100 of the present invention provides for the storage of calibration information such as the adjustment parameters in its RAM 108 and the use of such parameters when generating DTMF tones, the need to use high tolerance components in the auto-dialer 100, and its audio section in particular, is greatly reduced. This permits the use of significantly lower tolerance components than would be possible if such calibration was not supported.

This decrease in component costs helps to offset the incremental cost of incorporating the calibration features described above into the auto-dialer 100 of the present invention.

The auto-calibration feature of the present invention also helps to offset the impact temperature changes will have on the output of the auto-dialer 100. As the temperature changes, the mechanical characteristics, e.g., shape of the auto-dialer housing 101, may change slightly. In addition, battery voltage and other electrical aspects may also change. These variations may have an effect on the output of the auto-dialer 100, both in terms of actual tone outputs (frequencies and their level as the housing serves as a resonating chamber of the auto-dialer's audio system.

However, as a result of the auto-calibration process, instructions can be provided to the auto-dialer 100 to compensate and correct its signal output for such changes in temperature thereby providing a degree of output accuracy that might not be possible absent such an auto-calibration feature.

Due to the inherent, unique harmonics that are associated with each individual auto-dialer 100 because of manufacturing variations in both housings and components, as discussed above, calibration of auto-dialers 100 should be performed on an individual basis.

One method that has been found to provide satisfactory results is to monitor the signal generated, in response to the auto-dialer's output through a telephone 122, in conjunction with other calibration equipment. In such a case, the signal that is monitored is the signal output by the telephone 122 to a telephone line connecting the telephone 122 to, e.g., centrally located calibration equipment.

To insure that the auto-dialer 100 will work properly with a wide range of telephone systems, calibration may be performed using data that is obtained from studying an assortment of different microphones and anticipated line-losses. During calibration, equipment that is programmed to analyze the received signal generated from the output of the auto-dialer 100 may be used to perform the required calibration analysis and calculate the required adjustment that may have to be made to the auto-dialer's control parameters to insure the generation of output signals, e.g., tones that will be recognizable to standard telephone switching devices.

In one embodiment, when determining the levels which each auto-dialer 100 should be calibrated to, carbon microphones are used as part of the calibration process. Carbon microphones that have been used for at least 30 days should be used to insure that the packing effects of the carbon granules contained in the microphone will represent those which can be expected during normal use. Furthermore, when using handsets 121 with carbon microphones for establishing calibration levels, the handset 121 should be, for best calibration results, those handsets which were stored vertically. In addition, calibration levels should be performed with the handsets located at a 30 degree angle relative to the horizontal and with the auto-dialer's speaker/microphone 114 placed in close proximity to the handset's microphone 118.

A plurality of handsets should be used for determining calibration levels. As auto-dialer components and housings will not be identical it is important that the calibration process be performed in such a manner as to test, modify, and re-test each auto-dialer 100 until the desired output levels and signal characteristics are achieved.

In addition to calibration features that are designed to support the calibration of the auto-dialer 100 7 in response to external commands or signals, e.g. a series of encoded DTMF tones, the auto-dialer 100 of the present invention incorporates several automatic calibration features that are designed to increase reliability. For example, as will be discussed further below, the auto-dialer 100 may include a temperature sensor 107 as illustrated in FIG. 3. In response to the output of the temperature sensor 107, the microprocessor 104 adjusts the output signal levels and or frequency, to compensate for, e.g., temperature related changes to the auto-dialer housing 101 or audio output components, i.e. speaker/microphone 114, that may effect the precision of the DTMF signals being generated by the auto-dialer 100.

In addition, sensors, such as the voltage comparator 210, may be used to check that there is sufficient battery power to accurately generate the desired tones and to signal a user when battery power is low, e.g., via the display 202.

While the ability of the auto-dialer 100 to be programmed to adjust the output frequency of generated tones has been described with regard to calibration features, it is also worthwhile to note that the auto-dialer 100 can, upon receiving a predetermined set of tones, accept and add/replace to the existing listing of acceptable tones to be generated or received, and that those tone pairs may or may not be among those commonly used for the transmission of telephonic communications.

II. Security Features

In addition to the above described error avoidance features, the auto-dialer 100 of the present invention incorporates numerous security features which are intended to enhance the security of both the data contained in the memory of the auto-dialer 100 and other important data which is transmitted by the auto-dialer 100 over a telephone line. The security features discussed below along with the auto-dialer's programmability, make the auto-dialer 100 of the present invention particularly well suited for use as a transaction card device wherein the auto-dialer 100 is programmed with billing and other credit information which can be used in accordance with conventional credit, debit and other protocols and transactions.

In order to minimize the risk of fraud, the auto-dialer 100 can be programmed to transmit only data which will enable an authorized and enabled service provider to decode the system-clock based encryption of the device number, with only an account routing prefix. Specifically, the device would not store an actual account number. Instead, it would only store that data which numerically describes the service provider.

In this scenario, the service provider would use the decrypted body number as the key to the corresponding account in the database. The routing prefix would be the standard routing numeric to direct the data to the appropriate service (credit/debit) provider using the traditional closed (non-publicly accessible) private network which exists for credit/debit authorizations.

By using this method of account information transfer and look-up, the data which is generated by the device is of no value as the device does not contain an account number which is, by itself, capable of being used as a credit/debit transaction.

Significantly, the acoustic coupling and programming features of the auto-dialer 100 permit the auto-dialer 100 to be used with standard telephone devices without the need for a direct electrical coupling to a receiving device generally required by other smart card type devices.

In the event of a security breach with respect to any aspect of the system-time or encryption techniques used in the auto-dialer 100, over-the-phone updates can be provided to each auto-dialer 100 to modify the key or keys programmed into the auto-dialer 100, the system-clock, or any other parameter which affects the security of the auto-dialer 100.

A. Encryption of Data Into DTMF Tones

A data encryption feature, which may also be described as a data encoding feature, of the present invention provides security for data transmitted by the auto-dialer 100. This feature will now be described. Many characteristics of DTMF tones may be varied without making a DTMF tone signal unrecognizable to standard DTMF tone detection circuitry. For example, the duration of individual tone signals, the twist associated with a DTMF tone pair, and the period of silence between DTMF tone signals being transmitted in a sequence, referred to as the interdigit period, may be varied over a wide range without affecting the ability of standard DTMF detectors to recognize the tone pairs being transmitted. In addition, it may also be possible to vary the transmitted frequency of the Lo-band and/or Hi-band tones slightly without substantially effecting the ability of a receiving device to detect and decode each DTMF tone pair based on the standard fundamental frequencies of the tones in the tone pair.

Such variations in a DTMF signal are possible because standard DTMF detectors are designed to allow for the wide variations in the time it takes different people to enter telephone numbers, e.g., in terms of how long some people hold keys or wait before pressing a next key representing the next digit of a telephone number, DTMF detectors accept a wide range of durations and silence periods between DTMF signals before they will disconnect because of the continued receipt of a DTMF tone or an extended period of silence.

As discussed briefly above, the existing standard for DTMF signals specifies a minimum signal duration, minimum period of silence between signals and a range of twist levels which are required for a DTMF signal to be considered valid. For example, standard telephone DTMF signal detectors which are used to detect the tone pairs that make up a DTMF signal require the following for a tone pair to be properly detected:

1. The tone-pair must be present for at least 35–40 milliseconds.
2. The tone-pair must include one tone, and only one tone, from the preselected Hi frequency band group of 4 possible Hi frequency tones and one tone, and only one tone, from the pre-selected Lo frequency band group of four Lo frequency tones.
3. The level of the Hi frequency tone can not be more than 4 dBm greater or 8 dBm less than the Lo frequency tone.
4. The level of both the Hi and Lo frequency tones of each tone pair must be in the range of 0 to –25 dBm.
5. Consecutive tone-pairs must be separated by at least 35–40 milliseconds of silence.

With modern digital signal processing equipment it is possible to accurately measure the characteristics of a DTMF signal that can be varied without affecting the validity of the DTMF signal. Furthermore, it is possible to use the auto-dialer 100 of the present invention, to generate DTMF and non-DTMF signals having specific characteristics, e.g. tone and interdigit durations, amplitudes, and twist levels.

By assigning selected values to the different alterable characteristics of a DTMF signal that can be changed without affecting the signal's ability to meet the above described requirements for a valid DTMF signal, it becomes possible to encode or encrypt information into a DTMF signal without affecting the validity of the DTMF signal for use and detection with conventional call processing equipment. For example, it is possible to define that, e.g., a particular period of silence between tone pairs of a DTMF signal will represent one character while another period of silence will represent a second character. Similarly a particular level of twist may be used to represent one value or character while another level of twist may be used to represent a different value of character. DTMF tone duration may be used in the same manner to represent yet other information. The overall aggregate power level of a tone pair may also be used to represent data. In addition, frequency variations or the deviation of the high and low tones from pre-selected frequencies within the range of recognizable DTMF tone frequencies may also be used to represent data. These alterable characteristics can be used individually to represent information or can be used in combination.

It has been found that when using the individual signal level of the Hi-band and Lo-band tones of a tone pair, or the overall signal level of the combined tone-pair to represent information, it is desirable to send a reference level to the receiver to serve as a measure against which to compare the level of other tones. This reference level may be determined from the level of a tone pair located in a pre-determined, e.g., fixed place in the series of tone pairs being transmitted, e.g., at every fourth tone pair, or it may be transmitted with a tone pair having a predetermined duration or other characteristic, e.g., the first tone pair having a tone duration of 60 ms. By sending reference levels to the receiving device in this manner, it is possible to compensate for varying conditions, e.g., microphones, line losses, etc., which effect tones transmitted from the auto-dialer 100.

An example of the encoding scheme of the present invention will now be described below with reference to FIGS. 11 through 13.

Referring now to FIG. 11, possible values for various characteristics of a tone pair of a DTMF signal representing the digit three are illustrated. As discussed above, it is possible to control these characteristics to represent data in accordance with the present invention.

Referring now to FIG. 12A there is illustrated a Lo-tone level to data conversion table that can be used in accordance with the present invention to convert the Lo-tone level of an encoded tone pair into data. By monitoring the received signal and detecting the level of the Lo-band tone, e.g., the value –6 dBm (as measured at the DTMF decoder circuit 112) in the example of FIG. 11, it is possible to use the conversion table to convert this value into a data value by a simple look-up operation. Thus, by looking up the value –6 dBm in the table of FIG. 12A it can be determined that the number 7 was being transmitted.

FIG. 12B which illustrates a Hi-band tone level to data conversion table, can be used to convert the Hi-band tone level into data in a similar manner, e.g., by monitoring the received signal and detecting or measuring the level of the Hi-band tone signal. Performing a look-up operation using the exemplary data of FIG. 11 indicates that the –6 dBm signal level of the Hi-band tone signal represent the number 7.

Similar look-up operations may be used to convert other detected tone pair signal values into data. For example, the table of 12C can be used to convert tone pair duration values into data while the table illustrated in FIG. 12D can be used to convert tone pair interdigit period values into data. Similarly the tables of FIGS. 12E and 12F can be used to convert measured frequency deviation values into data while the table of FIG. 12G can be used to convert twist values into data.

Referring now to FIG. 13 the results of using the tables of FIGS. 12A–12G to convert, i.e., decode, the measured signal values of FIG. 11 into data are illustrated.

Thus, as illustrated in the example set forth in FIGS. 11–13, it is possible to encode a seven digit number (7718832), e.g., a calling card number, into the DTMF tone pair representing the digit three without affecting the ability of a standard DTMF detector to decode the tone pair. Furthermore, in the described example the additional calling card number was conveyed in approximately 75% less time than that which is normally required for manual input.

Thus, as illustrated by this example, it is possible to transmit encoded DTMF signals which satisfy the minimum DTMF call processing standards while conveying both the conventional dialed digit, e.g., the digit three, as well as a substantial amount of additional information.

While the above described example illustrates the decoding of encoded DTMF signals it is possible to encode data using the same data tables that are used for decoding purposes as described above.

To add even a greater number of possibilities, the various alterable characteristics of a DTMF signal may be used in combination to represent values or characters. For example, a particular period of tone duration combined with a particular degree of twist may be used to represent one value while a second period of tone duration and a second level of twist may represent a second value.

Furthermore, to provide added security the encryption mechanism may assign different values to the same alterable characteristics of a DTMF tone pair as a function of the standard symbol/digit the DTMF tone pair represents. For example, a particular period of silence following the DTMF tone pair representing the digit one may be assigned a different value than the same period of silence following the DTMF tone pair representing the digit two.

It is readily apparent that a very large number of encoding combinations based on the numerous possible alterations that can be made to a DTMF signal without affecting the ability of standard telephone switching circuitry to detect and decode the underlying DTMF signal are possible. Thus, the above method of encoding data into a series of DTMF signals, makes it possible to transparently encode data such as calling card number or billing information into a telephone number represented as a series of DTMF signals.

In accordance with one embodiment of the present invention, the auto-dialer 100 encrypts sensitive information, such as the user's calling card number, directly into the telephone number being called, using the above encoding technique. In accordance with such an embodiment, the receiving system that detects the DTMF tones monitors the alterable characteristics of the DTMF signal that are being used for encoding purposes and then decodes the calling card information based on encoding information stored in a data base. In this manner, only the telephone number need be transmitted as a DTMF signal with the normal need to transmit a separate DTMF signal representing the calling card number, billing, calling party, or other identification information or data being avoided by encoding such information directly into the telephone number.

In a sense, the encoding method of the present invention may be described as the indexing of the alterable characteristics of a DTMF tone. In the case of a device seeking to transfer information using encoded DTMF tones, the device may use a lookup table containing a list of the characteristic that should be altered and how the characteristic should be altered to represent a particular symbol or number. In this manner, the value to be encoded is used as an index into the lookup table such as the exemplary tables illustrated in FIGS. 12A–12G, of a transmitting device such as the auto-dialer 100.

For a receiving device, the measured value of a particular alterable characteristic of a DTMF signal being monitored serves as an index into a lookup database or table such as the ones illustrated in FIGS. 12A–12G, containing information on the symbol or number represented by the particular characteristic or characteristics of the DTMF signal being monitored. By monitoring a particular alterable characteristic of a DTMF signal and comparing measured signal values to the values stored in the lookup table, a device is thus able to easily decode encoded DTMF signals.

In the above described manner encoded DTMF signals can be readily encoded and decoded using a lookup table or database and a device for controlling or monitoring the alterable characteristics of the DTMF signal being generated/received. Thus, the encoding technique can be implemented using relatively simple circuitry. Furthermore, the encoding and decoding of encoded DTMF signals can be performed without affecting the ability of a standard DTMF decoding circuit to decode the DTMF signal to determine the symbols/numbers represented by the standard tone pairs that comprise the encoded DTMF signal.

In accordance with the present invention, the relevant database needed for encoding/decoding encoded DTMF signals is stored in both the auto-dialer 100 being used to encode the information and the database being used to decode the information encoded into the DTMF signal. The ROM 106 of the auto-dialer 100 may be used to store such a database. However, for added security, the database may be stored in RAM 108 and periodically revised, e.g., in response to acoustic reprogramming commands received via a telephone.

As discussed above, in one embodiment of the present invention, the auto-dialer 100, uses the above described encoding method to encode calling card, long distance carrier information and other identification information, such as device body or identification number information, directly into the destination telephone number. This information is then decoded by the DTMF decoding system which receives the series of encoded DTMF signals, representing the telephone number, and processes accordingly. In this manner, a user is able to place a call and charge the call to a calling card or credit card without having to manually input the credit information thereby reducing the possibility of human errors. Furthermore, the device, using this indexed approach, can transmit data much faster than would otherwise be possible using conventional DTMF tones.

As discussed briefly above, a data string using indexed tone characteristics in the above-described manner can be processed much faster than a data string using only conventional DTMF signals to represent the same amount of data. A reduction in the time needed to receive and decode the data necessary to complete a transaction, determine a destination number, account number, etc., will reduce the requirement for additional tone detection equipment, i.e., switching equipment, as well as reduce the un-billable time that a long-distance carrier must absorb before it is able to connect the call and initiate billing. Accordingly, the encoding technique of the present offers important advantages over known systems.

These advantages are due in part to the inherent "data compression" feature of the encoding method of the present invention which permits information to be encoded into a DTMF signal without causing a significant increase in the time required to send the DTMF signal with its underlying information, e.g., telephone number information.

As discussed above, standard DTMF tones were designed for the transmission and detection of only a single number or character of DTMF alphabet (1–9, 0, a, b, c, d, *, #) for each DTMF tone pair transmitted. As standard DTMF detection equipment requires a minimum tone-length of 40 milliseconds and a minimum interdigit period of 35 milliseconds, the effective throughput of DTMF data can be no greater than 13 characters per second, with an alphabet limitation of only those contained in the DTMF alphabet.

As a an example, consider how long it would take to transmit Account #123-45-6789. Using conventional DTMF, each numeric would be transmitted at the minimum full-cycle time period of 75 milliseconds. At 13 characters per second, the minimum time required to transmit the account number would be 675 milliseconds.

Using the encoding method of the present invention, it is possible to substantially increase this data transfer rate. The increase in the effective transmission rate of data, e.g., the data compression feature referred to above, is achieved by the encoding of a standard DTMF signal such that alterable characteristics of the signal are controlled to represent data being transmitted. Thus, it is possible to "piggy-back" additional information on a standard DTMF signal, additional information which can relate to, e.g., the destination phone number or billing information.

Tests have indicated that the encoding technique of the present invention can increase the actual data throughput of information using DTMF signals from the current maximum throughput of about 13 characters per second to around 500 characters per second.

This level of increased transmission rates can be achieved through the indexing of the DTMF tones using various measurable characteristics. For example, if the indexing scheme ascribes 15 values to both the tone length and interdigit length, 3 values to the level of each fundamental frequency of each tone-pair, 2 levels of aggregate tone power levels, as well as the 16 actual frequencies, the indexed alphabet for each tone-pair is 64,800 possible variations. A modified alphabet to take advantage of this expanded set can easily include groups of the numeric characters, including all combinations of the 0–9 set.

If one further assumes that the range of tone-lengths to be 40 to 110 milliseconds, with 5 milliseconds between each period, and 20 to 48 milliseconds for interdigit silence periods, with 2 millisecond increments, the average indexed-signal period is 109 milliseconds, or 8 tone-sets per second.

Therefore, the indexed method can yield 56 digits per second. At this rate of transmission, the time required to transmit 123-45-7890 would be 0.18 seconds.

Further efficiencies can be achieved through the use of other compression techniques well-known in the art. Additionally, as the time needed for standard digital signal processing equipment to resolve an incoming signal is generally the inverse of the signal, the minimum signal length, as well as the increments of varying signal lengths, when using DTMF signals, can be reduced to a minimum tone signal period of the lowest frequency in its domain, e.g., 597 Hz, or 1.675 milliseconds. At this rate, allowing a similar increment for each one increment and an increment of 1 millisecond for the interdigit period, the effective throughput increases to over 174 characters per second.

The speed of data transmission using this technique can be increased by orders of magnitude by increasing the number of frequencies simultaneously transmitted, the number of frequencies to chose from, by using higher frequencies than those used in the DTMF spectrum, as well as the transmission of out-of-band tones during otherwise quiescent periods.

Thus, as described above, the auto-dialer 100 has the ability to use various tone characteristics, e.g., the duration of one or more tone pairs or the fundamental frequencies thereof, the aggregate power level of a tone-pair or either of its fundamental frequencies, etc. for the transmission of strings of data. In one embodiment, the particular characteristics used to encode data when transmitting data to a first device, e.g., a local switching office, are different than those used to transmit to a second different device, e.g., an enhanced switching office. Accordingly, in such an embodiment, the particular encrypting or encoding performed is a function of the device to which the auto-dialer 100 is transmitting the data. To support this feature, the auto-dialer 100 is programmed to encrypt data strings when it can be reasonably assumed that decoding equipment capable of decoding encoded DTMF signals will be available on the receiving end. In other cases, in such an embodiment, when there is no assurance that the switching center which will receive the generated tones will be able to decode an encoded DTMF signal, the auto-dialer 100 is programmed to use conventional DTMF exclusively in its transmissions.

While the data encoding technique of the present invention is described in terms of DTMF tones, the encoding technique is generally applicable to any signaling system which uses one or more frequency-based signals to communicate data. For example, it is possible to encode data into a signal which comprises a series of tones using, e.g., tone length, frequency, amplitude and interdigit duration. One should note that in most publicly accessible switching systems certain frequencies are restricted from use for switching or data transmission purposes.

Figure 6:
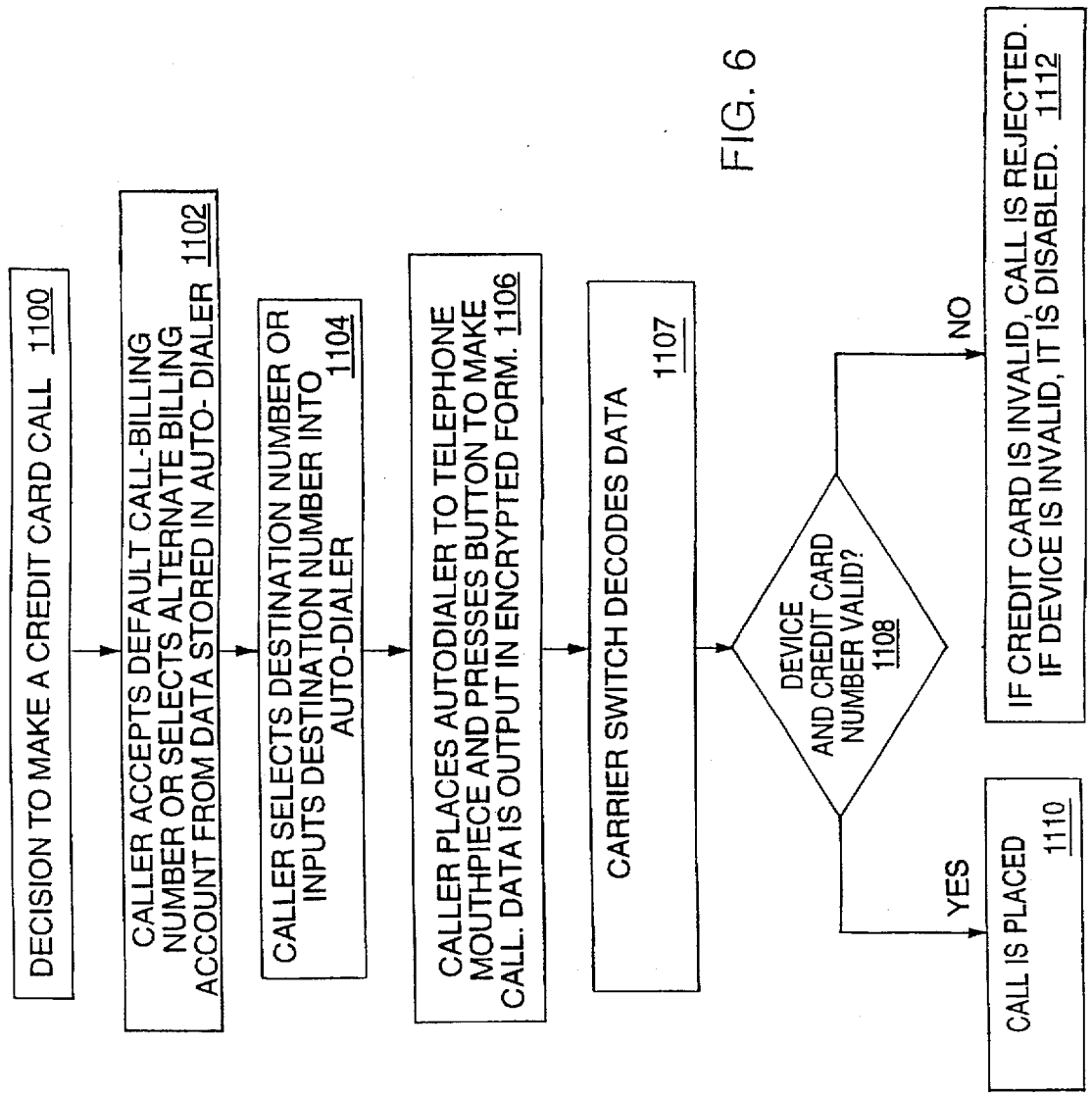
FIG. 6 is a flow chart illustrating the steps associated with the placing of a credit card call using the auto-dialer of the present invention.

Referring now to FIG. 6, there is illustrated a flow chart representing the steps involved with placing a call using the auto-dialer 100 of the present invention which encodes calling card and/or calling service information directly into the series of DTMF tones which represent the destination telephone number.

The flow chart of FIG. 6 assumes that an auto-dialer 100 is preprogrammed with one or more carrier access numbers and phone numbers as well as the encoding information, e.g., data characteristic/information tables, such as those illustrated in FIGS. 12A–12G, needed to generate encoded DTMF tones. As will be discussed tielow, the programming of user-accessible aspects of the auto-dialer 100 may be done, e.g., at the factory, from a remote location via use of the acoustic interface of the auto-dialer 100, by manipulation of device keys, or in conjunction with another coupling device which can either generate acoustic signals or is electrically connected to the device.

As illustrated in FIG. 6, the calling transaction of the present invention starts with a decision to make a credit card call as indicated in step 1100. The user of the auto-dialer 100 accepts the default credit card number from the numbers stored in the auto-dialer or, if desired, selects a credit card number as indicated in step 1102. Next, the user selects one of the destination phone numbers stored in the auto-dialer 100 or inputs into the auto-dialer 100, using the device control keys 105, the telephone number to be called as indicated in step 1104.

In the next step 1106, the user places the speaker/microphone 114 of the auto-dialer 100 in close proximity to the mouthpiece of a telephone and enables, e.g., by pressing a key, the auto-dialer 100 to output the access number, i.e., telephone number of the selected carrier, e.g., the carrier which has been pre-programmed to handle the particular call. The local office, which monitors this output, connects the line to the indicated carrier. When it is believed that the local office is not capable of decoding indexed tones, only traditional DTMF tones are generated by the auto-dialer 100 for this part of the call transaction.

Upon connection with the carrier, the carrier switch provides an audible signal to the user to depress a button to send the next string of data which includes the selected destination phone number as a series of acoustic encoded DTMF signals with the calling card number information and/or other information being encoded by the auto-dialer 100 into the DTMF signals that represent the destination telephone number. Device identification information, e.g., a unique device body number, may also be encoded into the telephone number as well. The sequence described above can be altered, on a carrier by carrier basis, such that the sequence matches the data processing protocol of the carrier or its ability to decode embedded data. Further, the requirement of a second button-push to initiate the transmission of the second string of data can be eliminated if the time requirement for the call to be connected with the second switch (e.g. the long distance carrier) can be reasonably predicted.

As illustrated by step 1107, upon receiving the encoded DTMF signals, in accordance with the present invention, the circuitry which receives the encoded DTMF signals decodes the received DTMF signals to determine, e.g., the desired destination phone number, the calling card number information and/or the device identification information which is encoded into the DTMF signals representing the received telephone number.

At this point, as illustrated by step 1108, the switching circuit system, e.g., the long distance carrier, checks a database, e.g., a central data base containing information about each auto-dialer 100, to determine if the device is an authorized or unauthorized, e.g., stolen, device. In addition, the provided account billing information, e.g., credit card number, is checked to determine if it is a valid number.

If the auto-dialer 100, used to place the call, is an authorized device and if the calling card number is valid, the call is placed as indicated in step 1110. However, if the calling card number is invalid, the call is rejected and not placed as indicated in step 1112. In the event that device identification information encoded into the destination telephone number is determined to be invalid, the auto-dialer 100, is disabled, by, e.g., being sent a series of acoustic tones to which the auto-dialer 100 is programmed to respond by deactivating itself.

In one embodiment, those tones which cause the device to become deactivated are preceded by a voice prompt by the switching system to the caller indicating that updated information is available and prompts the caller to hold the device to the earpiece and press a key, which signals the switch system that the device is ready to receive the instruction, e.g., in this case, the deactivation signal.

The above described calling procedure offers many security and convenience advantages over the standard calling procedure previously described with regard to FIG. 1.

First, by outputting the account billing information using the auto-dialer 100's indexing system, a user need not input the sensitive billing information using a viewable keypad, e.g., the telephone keypad. Accordingly, a person visually observing a call transaction cannot obtain the billing data from what he observes and, therefore thus, use the data for unauthorized purposes.

Second, because the calling card number is encoded into the telephone number, it may not be apparent to an observer that a calling card number is being transmitted. Furthermore, when the auto-dialer's system clock is used to encrypt the calling card number information, the recorded dialing sequence will only remain valid for a short period of time determined by the time period the specific particular encryption seed number is used.

Furthermore, even if the dialing sequence with the encoded calling card number is recorded, the recording can not be used directly to gain access to a long distance carrier to call numbers other than the number that was being dialed. As a result, the value of the recorded and subsequently decoded data is of little value due to its relatively short useful life and its restricted use during the validity period.

Thus, the problems relating to an unauthorized user recording a calling card number, which, in the known systems, is transmitted as a separate signal from the telephone number, and then playing it back to place calls to other telephone numbers are avoided.

Figure 7:
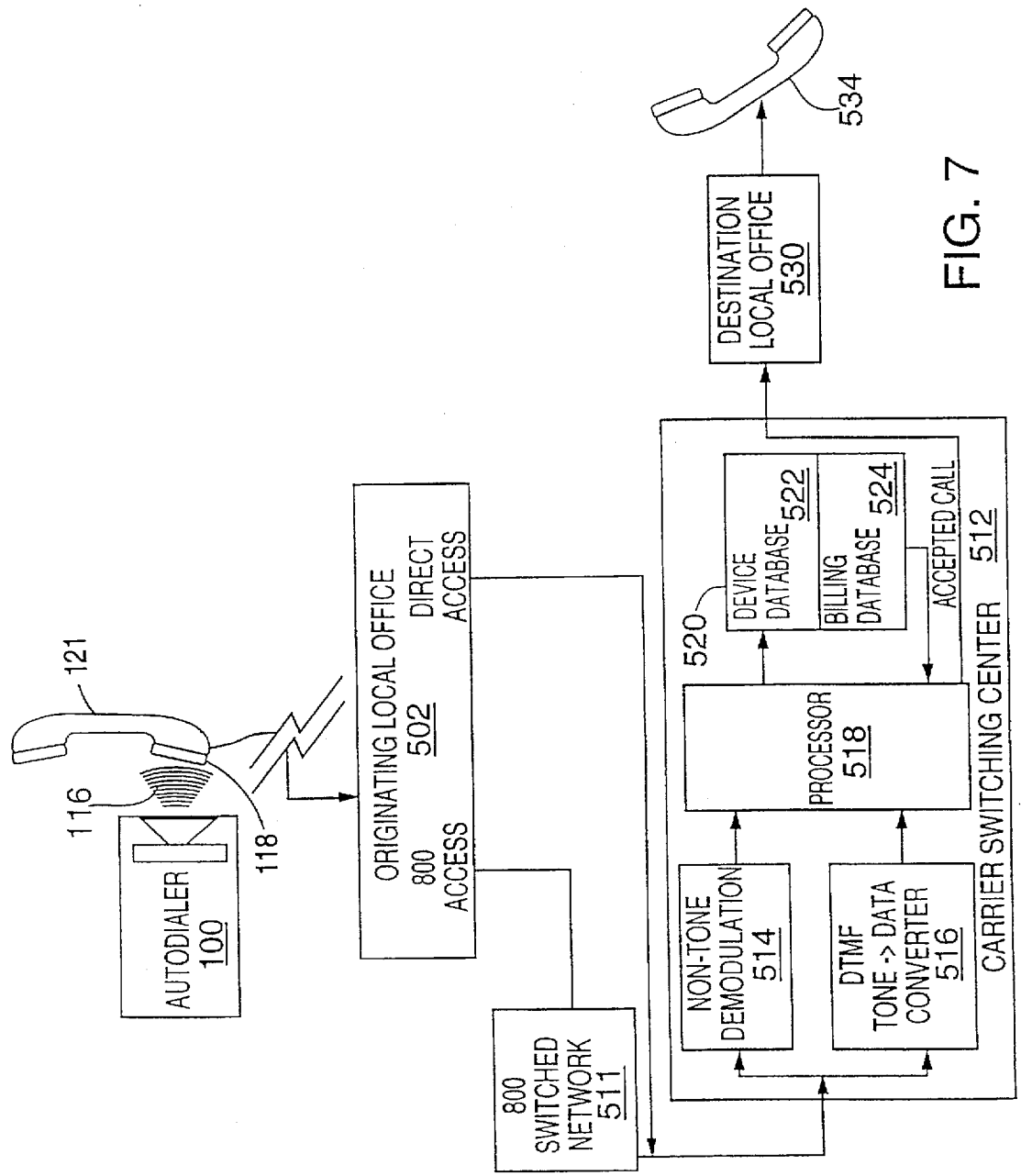
FIG. 7 is a block diagram of the auto-dialer of the present invention being coupled to a destination telephone via a carrier switching center.

Referring now to FIG. 7, the signaling relationship between the various devices involved with completing a call transaction using encoded DTMF signals, in accordance with the steps illustrated in FIG. 6, is illustrated.

As illustrated, acoustic signals 116 from the auto-dialer 100, including, e.g., encoded DTMF signals, if the receiving circuit is known to be capable of decoding encoded DTMF signals, are supplied to the microphone (e.g. of a telephone handset 121, or other interfacing equipment). These acoustic signals are converted by the microphone 118 of the handset 121 into electrical signals which are supplied, via a local telephone network, to a local telephone office 502. In the illustrated embodiment, the local office 502 couples the telephone handset 121 to a long distance carrier switching center 512, via the 800 switch network 511 if an 800 number was initially dialed, or by a direct access link if an inter-exchange code was received from the auto-dialer 100. In this manner, the DTMF signals output by the auto-dialer 100 are supplied to the carrier switching center 512. If the initial dialing sequence was preceded by an inter-exchange code (e.g., 10 XXX), the auto-dialer 100 will also transmit to the local office, using standard DTMF tones the desired destination number which the local office 502 will transmit to the long distance carrier switching center as non-tone data.

The carrier switching center 512, in this example, is responsible for decoding encoded DTMF signals. Upon connection with the carrier switching center 512, the auto-dialer 100 provides that data which is required to complete the call, e.g., desired destination number (if the call was preceded by an 800 connection), calling card and device ID information. The output of the carrier switching center 512 is coupled, e.g., via a long distance network, to a destination local telephone office 530 which, in turn, completes the connection to the destination telephone represented by the handset 534.

As illustrated in FIG. 7, the carrier switching center 512, includes a DTMF tone to data converter circuit 516 for converting the standard DTMF tone pairs of the received DTMF signals into their corresponding symbols/numbers. The carrier switching center 512 also includes a non-tone demodulation circuit 514 for monitoring alterable characteristics of the DTMF signal being received by the switching center 512 and decoding the encrypted information represented by the signal characteristics being monitored. The non-tone demodulation circuit 514 includes circuitry for determining the system time to be used when decoding data encoded as a function of a system clock 111. To perform the processing and description of the received signal, the carrier switching center 512 includes a processor 518 coupled with the non-tone demodulation circuit 514, a DTMF tone to data converter circuit 516 and a database 520. The data base 520 contains, e.g., a device database 522 including information concerning the body number or device identification number of valid auto-dialers 100, a billing database 524 and, e.g., other information relating to the user or the particular encoding scheme used by each auto-dialer 100 listed in its device database 522. The processor 518 operates to control the carrier switching center 512 to perform the functions described above in regard to FIG. 6 performed by the carrier switch.

While the encryption of data into a DTMF signal by using different characteristics, e.g., tone duration, to represent data has been described above, it is also possible to encode data into a DTMF signal by sending signal tones as opposed to a tone pair which would constitute a valid DTMF tone. As discussed above, unless a low tone and a high tone are received simultaneously for a minimum period of time a standard DTMF detector will not acknowledge receipt of a valid DTMF tone and will normally ignore the single tone being received.

In accordance with one embodiment of the present invention single tones, e.g., either a low tone or a high tone, are used to transmit data. In such an embodiment, each low tone and high tone used, individually, to transmit data is associated with a particular data element, e.g., a letter, numeral or word. To transmit the information, e.g., data element associated with the single tone, the tone is sent without a corresponding high or low tone being asserted. Thus, a standard DTMF decoder circuit receiving the single tone will ignore it, e.g., as an error. However, a decoder circuit according to the present invention detects the receipt of a single tone and uses a look-up table, as described above with regard to using signal characteristics to represent information, to interpret the encoded data, e.g., the data represented by the single tone. In addition to the frequency of the single tone, the various characteristics of the single tone, e.g., it duration, amplitude, etc., may also be used to represent data as described above.

In yet another embodiment, tones which are outside the range of a standard DTMF detector circuit, but within the passband of the filters used to filter either the high or low tone DTMF signals received by a detector circuit are used in a similar manner to transmit data.

Accordingly, by using high and/or low tones that are outside the range for standard high or low tones used for DTMF signals, it is possible to encode data into a DTMF signal by asserting such tones during the interdigit period or at the same time a DTMF tone pair is being asserted, e.g., as a third tone, without affecting the ability of a standard DTMF detector to detect the DTMF tone pair. In this manner, the amount of data that can be transmitted along with a DTMF signal can be greatly increased without effecting the ability to detect the tone pairs of the DTMF signal.

B. Limited Access to the Data Stored in the Memory of the Auto-dialer

In addition to the data encoding/encryption features described above, the auto-dialer 100 of the present invention contains several additional features which are designed to further enhance security. These additional security features which are described below may be used alone or in conjunction with the DTMF encoding scheme of the present invention.

As discussed above, the auto-dialer 100 of the present invention is programmable and may be programmed with a host of different types of information relating to, e.g., DTMF tone output levels and/or the tone output frequencies required for satisfactory performance, calibration parameters for adjusting the output of the auto-dialer 100 to achieve specific output signal levels and/or frequencies, a list of standard DTMF and non-standard DTMF signals (tone pairs which are not included in the set of 16 standard tone pairs) the device can generate and/or recognize.

In addition to this information, the device may be programmed to store data representing carrier access codes, the user's selected personal list of destination phone numbers, personal identification information and a wide variety of other types of information that can be stored in the device ROM 106 or RAM 108.

As will be described further below, the personal identification information stored in the device may also include voice recognition data. This voice recognition data, e.g., voice pattern information associated with the authorized user of the auto-dialer 100 may be supplied to a system (either local or remote) which is capable of comparing the stored voice recognition data to a live voice sample received from a user in response to a prompt, audio prompt. By storing the voice characteristics within the auto-dialer 100, the possibility of using voice recognition is vastly increased due to the diminished requirement of a centrally storage facility for such records, and the interconnection of the storage facility with each of the many places where voice recognition might be useful. One should also note that the requirements for a higher degree of certainty with regard to voice recognition are greatly reduced when the voice being compared is already reasonably verified by virtue of the person's possession of the auto-dialer 100, as opposed to when there is no basis for any presumption such as when one stores the voice file in a common database that the person being tested is the authorized person.

Because the auto-dialer 100 can be programmed remotely, the auto-dialer 100 permits the remote alteration of a predetermined sequence or tone strings which are stored in memory for use as an identification code for initiating telecommunications connection upon the receipt of a predetermined group of tones.

It is also possible to program the auto-dialer 100 to interject a pre-programmed and remotely alterable timing space between a string of tones such that the spacing conforms to a predetermined amount of time necessary for one call switching system to alter its conventional processing protocol or make contact with another and that the second or subsequent tone-strings will not begin to be de-toned until such pre-determined amount of time necessary for the switching system to make the anticipated transition and that the second or subsequent tone-strings will not begin to be de-toned until such pre-determined time has elapsed, and where the first string (e.g., access code, sequence) is stored in memory independently of the data which is subsequently transmitted to the second or subsequent call-processing system, and that the first access string is not within the control of the user. Further, it is possible to program the auto-dialer 100 to transmit indexed data at only certain points in a call sequence.

As will be discussed further below, the auto-dialer 100, via the microprocessor 104, ROM 106 and RAM 108, permits the storage of data relating to constraints associated with the access or use level which is to be afforded to an auto-dialer's authorized user. Such constraints might include overseas calling restrictions, ATM withdrawal restrictions, restrictions relating to the use of other systems, functions, or programs which are accessible by use of the auto-dialer 100. These constraints may be changed by re-programming the auto-dialer 100 from, e.g., a remote source.

In order to prevent the unauthorized access to the information stored in the auto-dialer 100, in one embodiment, a user is limited in the degree of access the user has to the information stored in the auto-dialer 100.

The amount of access a user is given to the various types of stored information in the auto-dialer 100 is determined as a function of the data's sensitivity. For example, in one embodiment, a user is given full access to his/her list of personally-selected destination telephone numbers with the ability to reprogram these numbers at will. However, a user is denied complete access to device identification number information and other device security information (e.g., system clock settings).

In another embodiment, entry of PINs, e.g., three PINs, in conjunction with a randomly selected group of words, e.g., three words, associated with the PINs (referred to as "PINWORDS") is required before a user is allowed to reprogram or access certain other data (e.g. user device preferences such as language preference, mailing address, etc.).

Furthermore, for business reasons, in some cases, it is desirable to restrict a user from changing the default calling services so that, e.g., the user can not change the default carrier access number, or related billing data stored in the auto-dialer 100.

While the device body number, billing information and identification number of various calling services which may be contacted using the auto-dialer 100, this information may be programmed into the auto-dialer 100 at the factory before supplying the device to the end user. In many cases it may be desirable to subsequently alter this information as well as the other information, e.g., calibration information, stored in the auto-dialer 100. However, as with access to the information contained in the device, it is desirable to limit a user's ability to re-program certain portions of the information stored in auto-dialer 100.

Accordingly, in one embodiment of the present invention, the auto-dialer 100 can be reprogrammed by signaling the auto-dialer 100 via a series of acoustic tones, e.g., a pre-selected series of tones stored in the RAM 108 or ROM 106, to perform various operations such as to store data or to replace data in memory with new data.

In accordance with the described embodiment, in order to prevent the unauthorized reprogramming of the auto-dialer 100, a particular signal, e.g., a series of DTMF tones or encoded DTMF tones stored in its memory (ROM 106, RAM 108), must first be received before the device will enter a controlled-access mode in which information in RAM 108 which cannot normally be altered is permitted to be reprogrammed, i.e., changed. The stored series of tones which, when received and decoded by the auto-dialer 100, are used to cause the auto-dialer 100 to enter the controlled access mode, may optionally include a pre-programmed unique device number which is only used as a security key in the re-programming process or as the basis of an encryption of an outgoing tone-string from the auto-dialer 100.

In the described embodiment, received signals are compared to authorization codes or "keys," taking the form, e.g., a string of tones, stored in memory to determine whether the person or system attempting to reprogram the auto-dialer 100 has the authority to do so. If a match is made between a received signal and an authorization code stored in the auto-dialer 100 the reprogramming tone-group and the pre-established operations and/or degrees of use permitted by the received authorization code are allowed, i.e., enabled. However, if an authorization code is not received, only the normal, limited access to the data and normal degree of programmability is permitted, e.g., a user is allowed to program the auto-dialer 100 with new additions or changes to his/her personal phone list, but not access or alter the calling card identification information stored within the device.

Accordingly, in one embodiment, the auto-dialer 100 permits the alteration of, e.g., a string of network access codes, dialing sequences and related protocols, stored in the RAM 108 which are used in the initiation of, e.g., a telephone call, upon the receipt of a remotely generated, pre-defined string of tones which are used to enable the alteration.

Various signals, e.g., acoustic, electrical, etc., that serve as "keys" may be required to alter, or re-program, the various types of data stored in the RAM 108 and/or enable/disable functions which can be accessed by the user. These signal "keys" may be any type of signal that the auto-dialer 100 can recognize, either standard DTMF signals, encoded DTMF signals, non-DTMF signals or, simply a sequence of signals generated by the proper manipulation of the keys of the input device 105. Alternatively, the desired recognition of certain encoded data may only be permitted if the data is received through a pre-defined input of the auto-dialer 100.

Further, so as to prevent unauthorized access and programming to various functional or storage areas of the device, the sequence of tones or signals required to perform such changes may be a function of the system-clock, the non-transmitted identifier held within the auto-dialer 100, the identifier of the system seeking to program the auto-dialer 100, a mathematical result based on two or more values stored in either the auto-dialer's memory or the device seeking to perform such changes, or any combination of these or other factors.

Accordingly, the auto-dialer 100 can receive and decode pre-selected and/or remotely alterable tone pairs, e.g., DTMF signals, as a "key" to place the auto-dialer 100 in a mode which may not be otherwise accessible to the user through the manipulation of keys on the auto-dialer 100.

The auto-dialer 100 is designed to permit various remote services to change various aspects of the auto-dialer 100 by changing the contents of particular locations within the auto-dialer's RAM 108. Therefore, a series of keys are recognized by the auto-dialer 100, with each key providing access to a limited portion of the device functionality and memory. For example, a first tele-communications manager may have the authority, and a first key required to alter the contents of a first memory location containing a calling pattern stored in the first auto-dialer memory location. The first key provided to the first tele-communications manager allows the first communications manager to alter only the contents of the first memory location. However, it does not enable the alteration of other memory locations, e.g., the containing debit account information which may be altered, e.g., by using a second key.

In addition to reprogramming the auto-dialer 100, the degree of functionality a user is permitted may also be altered or reprogrammed in response to the receipt of various signals. For example, when an unauthorized user attempts to use an auto-dialer 100 which is reported stolen, a signal, e.g., an acoustic signal, may be sent over the phone which when received, causes the auto-dialer 100 to deactivate itself. In such an embodiment, the user is unable to reactivate the auto-dialer 100 without assistance from a central service office. Similarly, an acoustic signal from a central service that can be provided via, e.g., a telephone, may be required to initialize devices shipped to a user or to reactivate a de-activated device.

Thus, the auto-dialer 100 permits the activation/suppression of features, attributes or other operating parameters stored in the ROM 106 or RAM 108, on a selective basis controlled by the initial calibration/programming procedure, and alterable through the receipt of remotely generated, pre-established, and remotely alterable tone pairs which may be used as keys to enable/disable certain functions such as memory location access and programmability. It also provides for the capability for the auto-dialer 100 to cease functionality, or have limited functionality, upon receiving a predetermined set of tones and to resume less restricted functionality or, alternatively, more restricted functionality upon the receipt of predetermined tones from an outside source. Furthermore, in one embodiment, the keys on the auto-dialer 100 cannot be used to alter the functionality of the auto-dialer 100, except as permitted by the privileges currently defined by control parameters stored in the ROM 106 or RAM 108.

Because the auto-dialer 100 of the present invention is designed to be acoustically coupled to a phone or other device capable of acoustically coupling with the device, e.g., calibration equipment, ATM equipment according to the present invention, etc., the signals which serve to enable the reprogramming of the auto-dialer 100 and to thereafter reprogram the auto-dialer 100 may be received, e.g., from a local device capable of creating appropriate signals, or, alternatively, from a telephone coupled to a remote center which is responsible for the programming and/or calibration of the auto-dialer devices 100 of the present invention.

Because the auto-dialer 100 can be easily programmed or reprogrammed from remote locations, e.g., via the use of a standard telephone coupled to a computer located at a central office or from locally enabled equipment, the auto-dialers 100 can be shipped to consumers without being programmed with any sensitive data, calling card numbers, credit card numbers, account number and balance information, etc., which is important to keep from unauthorized individuals because of security concerns.

In accordance with the present invention, a consumer, upon receiving an auto-dialer 100 which has not been programmed with user-related data, can call a central service which can initialize the auto-dialer 100 with the user related data by programming the auto-dialer 100 via an acoustic coupling to e.g., standard telephone lines, following the receipt of identification information only known by the authorized user and the central service. The information and data programmed into the auto-dialer 100, at the time of initialization, may include the calling card number and other account information which was not previously programmed into the auto-dialer 100 because of security concerns.

Alternatively, if it is desirable to send the auto-dialer 100 to the user fully programmed and enabled, the device can be placed into a "locked" mode which the user can unlock by selecting the predefined PIN in association with a device-prompted PIN word or upon the receipt by the auto-dialer 100 of a voice sample which was supplied at the time the order for the auto-dialer 100 was placed. Both of these security aspects are described below.

In either case, the auto-dialer 100, when in transit to the user, remains of little or no value to anyone other than its authorized recipient who is the only person with the information required to activate the auto-dialer 100.

C. Security Schemes and Methods

Because the auto-dialer 100 of the present invention is programmable, it may be programmed to support a wide variety of security schemes and to perform a wide variety of data storage functions. Discussed below are a few of the many possible security features that are incorporated into the various embodiments of the auto-dialer 100.

As discussed above, the auto-dialer 100 of the present invention incorporates a system clock 111 for generating a system time. In one embodiment of the present invention, this system clock 111 is used to provide a seed number to a pseudo random number generator 113. The output of the pseudo random number generator 113 is used in various data security schemes as will be described below.

In accordance with one embodiment of the present invention, the pseudo random number generator, is used as a basis for encoding data into DTMF tones in a time sensitive manner, e.g., the data table used to encode data may change as a function of the pseudo random number generated using the system clock contained in the auto-dialer 100.

Because the present invention provides for the calibration of the system clock prior to shipment to the customer and/or subsequent to shipment from a remote location via signals transmitted to and from the auto-dialer 100, the accuracy of the system clock can be maintained to a relatively high degree of accuracy even when inexpensive clock circuitry is used. The high degree of accuracy is achieved by storing in the RAM of the autodialer 100, at the time of setting of the system clock, or subsequent resetting, the precise time and date of the setting or resetting, as the case may be. At a subsequent time, the current clock setting is analyzed in relation to the precise moment when the clock was last set, providing an indication of the actual deviation of clock counts that the clock being calibrated varies from the standard. By adjusting the number of counts which represent a moment of time, based on the actual deviation of the current clock over the spanned interval by, e.g., altering a system clock control parameter in the RAM 108, one can achieve a very high degree of accuracy from the otherwise linear system clock circuit, and accomplish such accuracy without the need for more expensive components.

The system clock precision that can be achieved in this manner permits the pseudo random number generation scheme used in each auto-dialer 100 to be consistent with other similarly programmed devices and interfacing equipment, insuring a predictable outcome from the auto-dialer's pseudo random number generator at any give time, which enables the recognition and decoding of data encoded by the auto-dialer 100 by other similarly programmed devices.

In one embodiment, the auto-dialer 100 increases the level of difficulty associated with the unauthorized decoding of information encoded in a generated DTMF signal by inserting meaningless data into the data stream representing additional filler data which has no information significance.

The locations in the data stream at which this filler information is inserted is a function of the auto-dialer's pseudo random number generator 113. It may also be a function of other data relating to the device identification, the current function of the auto-dialer 100 and/or other characteristics of the auto-dialer 100, e.g., battery voltage.

As the system clock 111 in all auto-dialers 100 and switching offices capable of decoding encoded DTMF signals referred to as "enabled switching offices" share the same seed number at any moment in time, the location of the filler and real data can be predicted by the switching office which can then extract encoded data based on the current, time-sensitive encryption.

The central service center to which the telephone call is routed can determine the time the call was received and use that information in conjunction with the information about the pseudo random number generator and data placement scheme implemented by the auto-dialer 100. It can then use this information to distinguish between the filler data and the relevant data encoded into the received DTMF data stream.

To insure, that the central office can determine that embedded data has been decoded properly and to provide error correcting capability, check bytes are included in the encoded data. If the central office fails to decode the encoded data correctly using the predicted output of the pseudo random number generator, in one embodiment, it attempts to decode the data using the preceding and/or subsequent output of the pseudo random number generator. In this manner, the central office can accurately decode information which was transmitted in one system clock period and received in one or more adjacent period. Furthermore, minor errors in the system clock will not prevent decoding of encrypted data.

Thus, as described above, to minimize the effect of the system clock errors, the switching office may apply earlier and/or next valid check sums or other tests before, e.g., dropping the call. In the event that this additional latitude is provided, and the data is found to be intelligible, the caller may receive voice instructions to send an additional dynamically-based string of data which provides other data relating to the function of the auto-dialer. If the enabled switching office computer determines remote transmissions are, in fact, coming from an otherwise-active auto-dialer 100, perhaps after checking with its database, the user may be provided with a voice prompt which will guide the user through a recalibration of the device's system clock.

Accordingly, because of the regular scrutiny of incoming data, the enabled switching office receiving the signal from the auto-dialer 100 will be able to detect the difference between valid information and meaningless filler information while a person recording the telephone transaction may not be able to do so.

In accordance with still another embodiment of the present invention, after making a connection to an enabled switching office, the auto-dialer 100 transmits, using a series of DTMF tones or other tones which may or may not be encoded, additional data intended to be used, e.g., by the central telephone switching office. This data may include, e.g., additional billing information not encoded into the telephone number or other device identification information. The provision of this additional security information may occur only occasionally, either a result of system-timing, a particular desired function, or a computed check-sum based on the transmitted data.

As discussed above, with regard to the use of the system clock and random number generator for controlling the placement of filler data into data encoded into the destination number, the same method of placing filler data into the signals being transmitted to the enhanced switching office after the telephone number is sent may also be used. The enhanced switching office will be able to distinguish this filler data from the actual information data in the manner previously described.

The use of the system clock 111 may also be incorporated into the reprogramming of the auto-dialer 100 by using the derived pseudo-random number in conjunction with other data stored in the auto-dialer 100. Unless the auto-dialer 100 receives those pre-established values required to program certain aspects of the auto-dialer 100, and those values were modified in correct coordination of the current system-clock 111 of the auto-dialer 100, the auto-dialer 100 will reject such instructions.

In one particular embodiment, the auto-dialer 100, except during those programming periods when the user is programming a speed dial list, which can only occur following the correct selection of a PIN, is specifically designed not to display any phone number used for access purposes by the auto-dialer 100. When making a speed dial call, under certain circumstances, an alternate number is shown on the display device 202. However, this access number, when dialed manually, will permit the use of the auto-dialer 100 in its enhanced mode, and, by disregarding those digits which are emitted by the auto-dialer 100 which relate to the first access data (e.g., to the non-enhanced-local office), permit the user to make full use of the auto-dialer 100.

D. Using The System Clock In Conjunction With A Plurality of Stored Access Numbers While some unauthorized users gain access to calling card number information through monitoring telephone calls being placed by authorized users, others, known as hackers, attempt to gain improper access to private phone networks and other telephone accessible facilities (e.g., data centers), by a trial and error method. In accordance with such a method, a hacker attempts to place a call using a computer which generates calls to, e.g., a long distance service carrier or another target system such as a database and then enters a calling card number. Following connection to the target, upon request for a password or other authorizing group of symbols or numbers, e.g., a calling card number, the hacker directs his/her computer to generate a sequence, e.g., a randomly selected sequence, of DTMF signals or other signals to simulate the signals which an authorized user would provide. In the event that the sequence is not recognized by the target, the call is dropped by the target. The hacker's computer, when it receives a signal indicating that the call has been dropped, automatically re-tries the access number and attempts to gain access using a different numeric sequence or signal often thousands of times, thousands of calls. Accordingly, thousands of calls may be placed before unauthorized access is achieved in this manner. As one can assume that any facility which incorporates a password or authorizing group of symbols was designed for access by authorized persons only, and each call-attempt by a hacker or other unauthorized person or computer to gain access to the target system blocks one port of entry for authorized users, it is desirable to develop a means of eliminating the potential for such activity.

While using lengthy calling card numbers, and thus the number of possible numbers, increases the number of calls required, on average, by a hacker before the hacker will discover a valid calling card number, the target (e.g., long distance service carrier) is still confronted with the problem of responding to the numerous nuisance calls generated by the hackers.

In one embodiment of the present invention, the auto-dialer 100 is used to store a plurality of telephone access numbers for the same long distance service or carrier, each of the plurality of telephone numbers being valid for use at different tines. The particular access number that the auto-dialer 100 will select is a function of the output of the system clock and a preselected pseudo random sequence that is used to determine which number for the long distance carrier is active at any given time. A microprocessor coupled to the system clock selects, as a function of the system time, which one of the telephone numbers is valid for use at any moment in time. The microprocessor is also coupled to a pseudo random number generator. The pseudo random number generator generates a pseudo random number which is used by the microprocessor when selecting which one of the telephone numbers is valid for use at any moment in time.

A DTMF tone generator is coupled to the microprocessor. The DTMF tone generator generates a DTMF signal representing the telephone number the microprocessor selects as valid. An input device is coupled to the microprocessor. The input device is responsive to an input command to cause the microprocessor to select a valid telephone number and to cause the DTMF tone generator to generate the valid telephone number selected by the microprocessor.

The memory space of the auto-dialer includes X storage locations for storing the telephone numbers associated with the single carrier service, only one of the X telephone numbers stored in the X storage locations being valid for use at any given time. X is an integer greater than 1. In one embodiment, X is greater than 49. In another embodiment, X is greater than 99.

The service to which the call is directed, for its part, will selectively respond, i.e., answer calls made to the telephone number which is active at that moment in time. Calls made to inactive numbers will be traced to their source to identify hackers or will be otherwise blocked from accessing any system protected by the enabled switching office.

Thus, in this embodiment, the auto-dialer 100 dials only the particular access number which is active at that moment. However, a hacker will be confronted with the possibility of now having to dial multiple numbers before even reaching an active telephone line of, e.g., a long distance carrier. In one embodiment, the telephone system is assigned a plurality of telephone numbers which correspond to the telephone system. Only a limited subset of the telephone numbers is valid for use at any given time. The telephone system determines which limited subset of the plurality of telephone numbers is valid for use as a function of time. The telephone system detects calls made to the plurality of telephone numbers. The telephone system responds to calls made to telephone numbers that are valid for use at the time the calls are received so that the calls may be successfully completed. The telephone system further responds to calls made to telephone numbers that are invalid for use at the time the calls are received in a manner that inhibits successful completion of the calls and traces the calls to determine the origin of the calls. In one embodiment, the step of determining which limited subset of the plurality of telephone numbers is valid for use as a function of time includes obtaining the current time from a clock, generating a pseudo random number using the current time, and using the pseudo random number to determine which of the plurality of telephone numbers constitutes the limited subset of the telephone numbers that are valid at the time the current time is obtained.

Using the above scheme in combination with the auto-dialer 100 of the present invention, can greatly reduce a long distance carrier's burden of responding to calls placed by hackers attempting to gain access to the long distance carrier service while placing no additional burden on the authorized user who is attempting to place a call using the auto-dialer 100. Furthermore, because the origin phone number is often included within the data exchanged by the local office with all subsequent switching facilities including the station assigned to the destination phone number used for the placement of a call, it provides a method by which hackers can be readily identified for referral to appropriate law enforcement organizations.

Accordingly, the above-described method of altering the active telephone numbers a long distance carrier responds to on a pseudo random basis offers potential cost savings by decreasing the effort a carrier service must take to respond to hackers and by decreasing the chances that a hacker will be able to obtain a valid calling card number through the use of the above-described trial and error method.

The response of a carrier service or switching center made to an active number will now be described in greater detail. While the process described below can be executed in various scenarios, the example provided here assumes that a carrier service or switching center is providing calling-party screening services for multitude of facilities.

When a call comes in on the currently active access number, the carrier service or switching center receiving the call will, after providing a voice or data prompt to the calling party, and receiving from the user's auto-dialer 100 the string of data that follows, decode the data, e.g., in accordance to the system-clock-based encoding method valid at that moment, to determine which restricted-access facility or function (the target) the caller is intending to contact or utilize. The switching center also determines the identity of the auto-dialer 100 being used to place the call from the received data. As an option, the switching facility then initiates, using a separate line, a data inquiry to the target to determine if it will accept the user identified by the particular device number, and, if appropriate, the origin phone number of the requesting user.

The inquiry to the target may not include the origination phone number of the device/user making the request to access the target, and the target system may or may not verify the appropriateness of the origination phone number as an eligible origination point for the particular user/device. Alternatively, if a lower level of security is desirable, once the device data has been properly decoded, and the desired facility is determined by the enabled switch, the call is transferred without prior approval of the target system.

If the target determines that the requesting user/device should be granted access to the limited access facility, e.g., based upon its examination of the data provided by the switching center, as well as other data which may be stored within the target system, the switching center transfers the call to the target.

This same scenario can be applied to the calling card industry where unauthorized users apply the same methods to achieve long-distance theft by repeatedly trying various account numbers until one is accepted by the carrier for the placement of long distance calls.

In this scenario, the auto-dialer 100 will generate those tones which represent the only currently active access number for the long distance carrier. If the unauthorized user dials an inactive access number, the long-distance carrier can note the originating phone number of the caller without allocating switching and data-base retrieval resources to the call.

In addition to the above scheme for using varying access numbers to, e.g., a long distance carrier, in another embodiment, the auto-dialer 100 selects various access numbers to the same particular carrier service or switch system from a list stored in its memory according to a usage based numerical sequence stored in the RAM 108. The numerical sequence is incremented by the microprocessor 104 each time the auto-dialer 100 is used, e.g., to contact the particular long distance carrier. In such an embodiment, the receiver, e.g. particular long distance carrier, stores the usage information about each access-authorized auto-dialer 100 and the numerical sequencing system in each authorized auto-dialer 100.

For example, as part of a call transaction, in such an embodiment, the auto-dialer 100 transmits a usage based incrementing indicator based on the numerical sequence, with other data, e.g., the auto-dialer's body number, an account number, the desired destination number etc.

The received indicator is compared by the central data-base against the last such information which was received from the particular auto-dialer 100 to determine if: 1) the indicator has been incremented as expected, thus indicating that a valid device had initiated the call, or 2) the indicator has not been incremented indicating that a valid device had not initiated the call. Upon determination that the data has not incremented properly since last contact, the desired activity, e.g. placement of a call is refused.

The systems described above to provide greater access security can be incorporated into computerized communications equipment, e.g., modems and other equipment designed to provide communications interfaces between, e.g., computers. In this embodiment, the system clock 111, its operating algorithm and other basic hardware instructions, are incorporated into the embedded processor of the modem or remote interface equipment, while other user-related software is made part of the communications software of the computer. The modem is shipped without any setting or calibration of its system clock.

Following installation of the enhanced modem referred to above, to make contact with a target database or computer system which is protected by the screening protocol described above, the user provides data to the software which will cause the target database or system to recognize the user (e.g. user name, address, user #, etc.). Upon completion of these entries, the modem dials a single phone number which terminates at the modem initiation system which will, once approval has been achieved, provide one or more access numbers to enable future connections with target systems through the designated enhanced switching system.

Upon connection, the initializing system sends to the remote system a series of tones which the remote system, if properly enabled, responds to in a dynamic fashion so as to indicate to the initializing system that the remote system is using the appropriate protocols and is enabled with the correct system-time settings. The remote system then transmits, following the receipt of predetermined codes, certain values contained in its embedded controller of the modem (e.g. its publicly-transmittable identity) and some or all of the data which the user entered into the communications software, including an indicator of the target database (s) for which the initializing service provides screening-access services and the user wishes to contact in the future.

For each target database which the requesting user is seeking to gain access, the enhanced switching system queries the target database to determine if the requesting user is eligible, at this time, to gain access into the target database.

If at least one of the targets authorizes access, the enhanced switching system transmits to the embedded controller of the remote modem an instruction to enable its system-clock according to the current system standard time, and records such time followed by those access numbers which will be used in the future as well as the identifiers for each of the targets which the user has been authorized to access.

Upon authorization by each target database(s) to permit the user access, the enhanced switching system transmits to each authorizing target the publicly-transmittable identity of the now-authorized modem, which then records the received value to the user's record. Future requests to the target for access by the user, through the enhanced access system, will be based on this value. During the first month, the enhanced switching system monitors the progress of the system-time, and after a preselected number of days have past since the initial setting of the system-clock, the enhanced switching system provides that data which is required to calibrate the system-clock.

If a target database determines, either upon first request or subsequently, that the user is not eligible to gain access, the target database or system informs the enhanced switching system of its findings. The enhanced switching system can then transmit to the enhanced modem and its related communications software that entry has been denied. If the key number for the target has been supplied earlier, the enhanced switching system sends a command to disable its future use. If there are no other target systems with which the user is eligible to access through the enhanced switching system, the access number file and the system-clock are also disabled.

Once properly installed and access to a target system has been enabled, it is desirable to minimize the value of the unauthorized removal of the modem from the computer, the data relating to the system-time is stored in electrically-dynamic memory within the embedded processor. Thus, upon the removal of the electricity required to sustain the data, any information stored in the memory is erased irretrievably. The alternate source of power to be used to maintain this data when the computer's power supply is not available is located on the opposite side of board from the embedded controller. An electrical connection among the alternate power supply and the embedded controller is provided by the copper connections of an unused, u-shaped connector within the slot of the mother board. Upon the removal of the modem from the motherboard, the data held in the embedded controller is discharged.

Additional methods of guarding against improper access to remote databases and data contained within the auto-dialer 100 may be accomplished by the use of voice recognition, other means of biometric identification, and the use of rotating PINs. Such additional security methods are discussed in detail below.

E. Voice Recognition and Other Means of Biometric Identification

In addition to the above described security features, the present invention can incorporate voice recognition features for added security and/or convenience. As described above, the auto-dialer 100 is responsive to acoustic signals to perform various operations including the enablement of various functions.

In accordance with one embodiment of the present invention, information concerning one or more characteristics of an authorized user's voice is stored in the RAM 108. This voice information is of a type suitable for doing voice comparisons, e.g., it may represent a recorded voice pattern of the authorized user of the auto-dialer 100 when the user is saying a certain word or phrase. Alternatively, the auto-dialer 100 can store a string of data which interfacing equipment may use to access a user's data file. The voice characteristic data stored in the auto-dialer 100 may be obtained from a central office which analyzes the user's voice pattern, and then converts the pattern, or an aspect thereof, into digital data, which is then transferred and stored in the auto-dialer 100 in the same manner that other data is programmed into the RAM 108.

Because the ability to reprogram the RAM 108 may be limited, e.g., by a requirement that a stored preselected sequence of tones be received before allowing reprogramming of the RAM 108, the auto-dialer 100 can serve as a secure, portable, library for the voice identification stored therein.

The auto-dialer 100 may be used as a secure source of other identification information as well, height, weight, eye color, etc.

The auto-dialer 100 described above has several features that make auto-dialer 100 useful for implementing a voice based identification system. First, storage of a user's voice file in the auto-dialer 100, with the auto-dialer ability to subsequently transmit it quickly, eliminates the need for searching a data base for the user's voice file. As it is impractical for a voice recognition system to search all files to determine which one is the caller on the line, the first step in this process must be to access the applicable voice data file to base a voice comparison.

The storage of a person's voice or other biometric information in an auto-dialer 100 can substantially speed the successful use of voice recognition systems. First, because of its use of indexed tones, the auto-dialer 100 is capable of transferring data quickly, the auto-dialer 100 can provide voice processing equipment with the user's stored voice characteristic data file in very little time.

As referred to above, when the particular data file used for voice comparison is selected based solely on information provided by the person seeking access to the system, it is important to be discriminating when the voice instructions are analyzed, assuming that there is no other means to guard against abuse (such as the person having a physical object which is unique to him/her, e.g., the auto-dialer 100,) that the switching system can authenticate. As it is possible to record another's voice without his her knowledge, the risk of unauthorized access remains with voice processing systems, thus requiring reasonably precise matching of the current speech with the stored speech. By using the auto-dialer 100 to provide the voice file to the analyzing system, there is much less risk of unauthorized access due to its ability to provide a dynamic way of discriminating the authorized user from the unauthorized user, permitting an appropriate relaxation of voice recognition standards which otherwise must be applied since the likelihood that an impostor in possession of an auto-dialer 100 can replicate even coarse qualities of the authorized user is relatively small. In such a case, possession of the auto-dialer 100 serves as a degree of proof that the person making the call is the authorized user.

Additionally, because the auto-dialer 100 is designed to not block out ambient noise through the use of barriers, the voice recognition system has the opportunity to sample the ambient noise, during a deliberately interposed period of silence by the auto-dialer 100, the voice recognition system is afforded the opportunity to quantify the background noise and reflect such ambient influences from those which are presented when the user provides the voice sample to be analyzed. Also, the auto-dialer 100 can also provide a pre-established tone level at a particular point during its transmission, e.g., a point based on the current system time of the system clock, thereby providing the voice system with a means to compensate for line and microphone noise influences on the subsequent voice samples.

A further reduction in the applied security criteria can be achieved by the incorporation of the concept of rotating voice PINs. In this embodiment of the current invention, a multitude of voice prints, e.g., of the user's name, birth city, or favorite relative, are recorded and placed in the memory of the auto-dialer 100, and, on a rotating, random basis, the auto-dialer 100 transmits a different voice print to the speech recognition system which is operating in conjunction with the auto-dialer 100. These words serve as the basis for validation of the user, thus permitting all other instructions by the user to be speaker independent. A further advantage of this concept is that by the storage of voice prints in a portable device, they can be used in off-line applications, where there is no ability to access a central database.

By incorporating these aspects of the current invention, it is possible for a voice processing system according to the present invention to safely relax the matching requirements which it otherwise needs in order to avoid unauthorized access, while improving the achieved level of performance, e.g., system security.

Further, many of the voice-recognition systems being installed today are designed for use by travelers, requiring each system operator to either duplicate the voice processing system, with duplicative voice files in each location, or to provide high-speed access from a process-only facility to a central facility in which all records are stored. The amount of data which is required to be transmitted back and forth between the remote switching center and the central authenticating system or to be duplicated at each of several locations for voice based security system can be extensive. By quickly obtaining the data needed to perform the analysis from an auto-dialer 100 or other device in the user's possession, the associated costs in time and money of transporting the data and/or providing duplicated data storage facilities is eliminated.

The cost of providing such data storage, whether it be duplicated in each such voice processing system or centralized can be significant, considering the requirement that such systems be fault-tolerant, and, usually requiring further redundancies. These costs are eliminated in accordance with the present invention by the storage of the user's voice file within the auto-dialer 100, where the cost of including sufficient additional memory to hold the user's voice characteristic file, when compared to the cost of either centralized storage or the cost of providing duplicative storage in a multitude of locations, is relatively insignificant. Furthermore, to the extent that the cost of providing voice processing is in direct relation to the time needed to complete the process (authenticate or drop a call), the reduction in the time required to complete the request, e.g., obtain the required voice characteristic data, is important.

Thus, the use of auto-dialer 100 for the storage of user speech data for voice processing and verification provides substantial opportunity to improve voice verification systems and to substantially reduce the cost of voice verification systems. Additionally, there are numerous applications where speech recognition systems would be useful, e.g., immigration identification, facility access control, etc., but the high current costs, slow process and high number of false negatives, e.g., when an authorized user is not recognized by the analyzing equipment due to high level criteria or false-positives, e.g., when an unauthorized user is authenticated due to low level criteria, make these systems unattractive alternatives. Equipping persons with a portable means to provide the necessary data would make possible off-line speech verification systems, without affecting its ability to operate with on-line systems, with greatly improved performance and significantly lower operating and capital costs.

Figure 14:
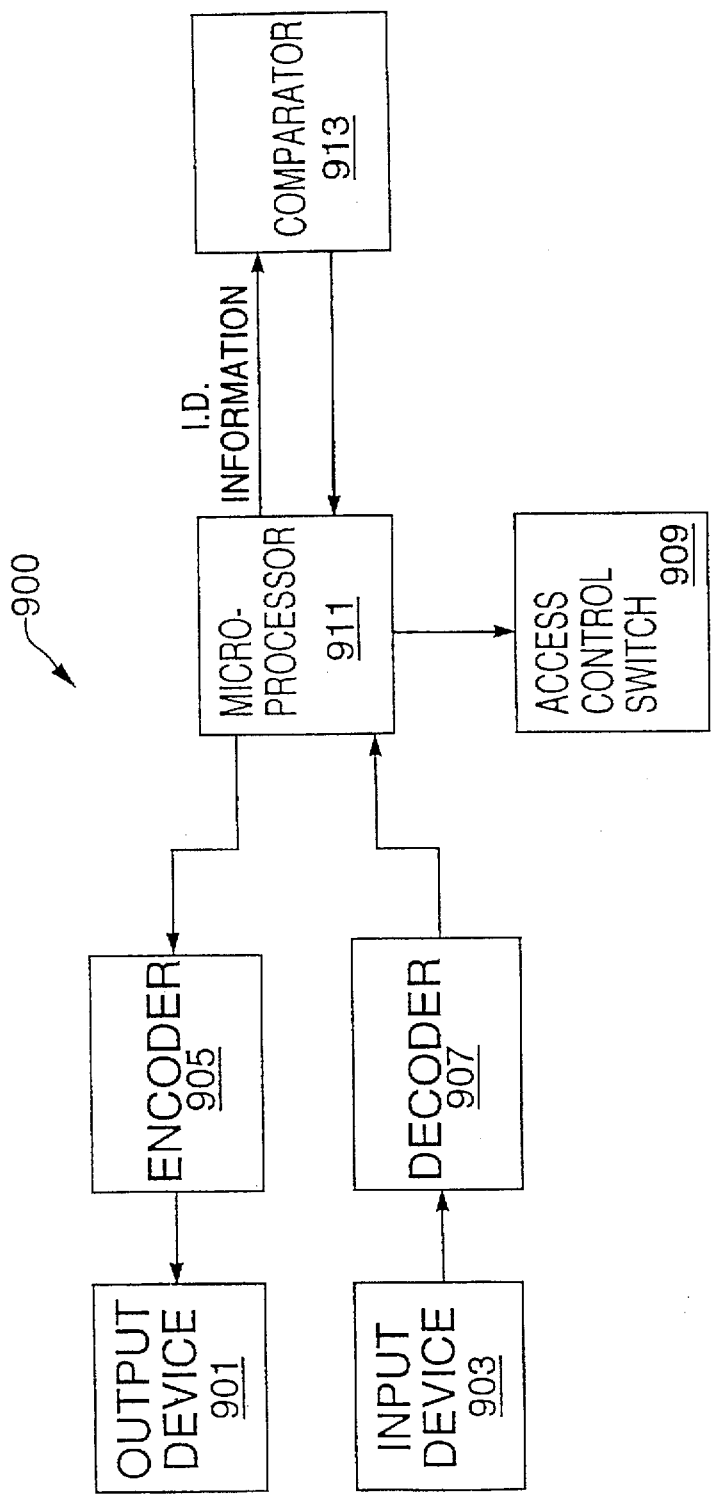
FIG. 14 is a schematic block diagram of an access control device implemented in accordance with one embodiment of the present invention.

In accordance with one embodiment of the present invention, the autodialer is used to store and supply biometric information to an access control device used for controlling access to a system, e.g., a telephone system, building, etc. Referring now to FIG. 14, an access control device according to the present invention is illustrated.

As illustrated, the access control device 900 includes an input device 903, e.g., a microphone, which is coupled to a decoder circuit 907 for decoding encrypted information, e.g., encoded DTMF tones, received via the input device. The output of the decoder 907 is coupled to a microprocessor 911 which is programmed to control the operation of the access control device 900. In this manner, the microprocessor 911 can receive biometric information or live samples of biometric identification via the input device 903 and decoder 907.

The microprocessor 911 is also coupled to an encoder 905 which is capable of encoding commands and data output by the microprocessor 911, e.g., into encoded DTMF tones. An output of the encoder 905 is coupled to the input of an output device 901, e.g., a speaker for outputting the commands and other information generated by the microprocessor 911.

The microprocessor 911 is coupled to a comparator 913 which is used to compare biometric identification received from a portable information storage device, e.g., an auto-dialer 100, to a live sample of biometric identification information to determine if there is a match. If the microprocessor determines, as a result of the comparator operation, that the identification information received from the portable storage device matches the live sample, the microprocessor 911 enables an access control switch 909 to grant the individual seeking access to the system the requested access. Otherwise, access is denied.

A description of the process involved in the use of the auto-dialer 100 with voice recognition systems follows. When a user of the auto-dialer 100 seeks access to a secure network or facility, the network or facility requests that the auto-dialer provide the voice identification information recorded in the RAM 108. This information may be transmitted to the network or facility by, e.g., a series of encoded DTMF tones.

To insure that it is the authorized user of the auto-dialer 100 that is attempting to gain access to the secure network or facility, the network or facility requests a voice sample from the auto-dialer user. The auto-dialer user may provide the "live" voice sample via a conventional telephone handset microphone and telephone network. The actual, received voice sample, is then compared to the voice characteristic information received from the auto-dialer 100.

If the actual, received voice sample matches the received voice characteristics, the network or service facility then gives the auto-dialer user access to the requested service or facility. Otherwise, access is denied and appropriate action can be taken with regard to investigating and identifying the person attempting to gain access to the network or facility.

In this manner, the auto-dialer 100, can be used in combination with separate voice recognition circuitry provided at the network or facility which is implementing the voice recognition security test, to provide voice recognition capability without the need for the network or facility implementing the test to store voice characteristic data files on each person who is authorized to access the network or facility.

The same process of storing voice-related data into the auto-dialer 100 can be applied to other biometric measures of a user including fingerprint(s), retina or other eye-related characteristics, weight, height, or graphical aspects of a user's body, e.g., face, hand, etc. As each of the aspects can be assigned to a different protocol function of the auto-dialer 100, it is possible for the auto-dialer 100 to accommodate different security methods for different applications. For example, in over the phone access applications, voice technology may be most appropriate. In other access applications where the user is present, it may be appropriate to use one or more of the biometrics measures describing an aspect of the user. The selection of which data-description of the user is to be provided is based upon the auto-dialer programming of the function selected which is a matter of design choice that may be varied as appropriate depending on the security application. In the event of a telephone based access to a long distance carrier for the placement of a calling card call, the auto-dialer 100 may be programmed to automatically transmit the voice-related data among the data sent to the carrier. Alternatively, if the auto-dialer 100 also stored, for example, data describing a physical characteristic of the user, i.e. a composite of standardized features, when the auto-dialer was used to initiate a call to emergency services, e.g., 911 calls, the receiving station could quickly have some approximation of the caller, thus facilitating assistance if, for example, the person calling was a child who was being held against his/her will and only had a brief moment to alert authorities.

In another embodiment of the auto-dialer 100 in its use with voice call processing, the data which is transmitted from the auto-dialer 100 would include key words (and their associated PINs) and data relating to the user's speed dial list, but not include the user's voice file. In this case, the switching office would decode the data, and, if appropriate, prompt for a speech or keyboard entry of the associated PIN, and upon the correct entry, permit the user to speak, on a speaker independent basis, those commands which would be common phrases (Call Home, Conference Call, etc.) and if the data supplied by the auto-dialer 100 contained such references with associated instructions, i.e. destination number, or the spoken instruction was a system stored instruction, e.g. conference call, the instruction would be executed, i.e. call placed.

In this embodiment, the switching service equipment would serve several functions. In addition to extracting the key words, the related PINs, and the data relating to the user's speed dial list, e.g., system-recognized names such as John, Paul, as well as the destination numbers, the system would also extract, if available, data which relates to a dialect or language table to be used in analyzing the incoming speech commands from the particular caller.

By indexing dialects, and storing such words in isolatable directories, the system is able to further reduce the errors and or search time that may otherwise occur. This embodiment also suggests that the selection of the phone number which the device dials in order to make contact with the enhanced switching platform be based on a look-up table which indicates which language and dialect, if possible, is native to the caller. As the switching service can receive the number information prior to the connection with the caller, the receiving processing system is thus able to load that dictionary which relates to the speaker, thus reducing the error rate and or search time that may otherwise occur.

The advantages of this embodiment are numerous over the current system of voice access calling. First, it eliminates the need for voice dependent processing, reduces the associated false negatives which commonly occur with its use, and the added expense in both capital and operating expenses, e.g., longer processing time resulting in more ports being required to handle the same number of users, associated with such processing. Second, it maintains the security of the switching office because the office has the option of requesting the entry of one or more additional PINs, e.g., based on its voice prompt to the user. Third, it reduces the amount of memory needed in the auto-dialer 100 since there is no need to store both the user's voice file and speed dial list. Fourth, it enables the same speech recognition equipment to be used in programming the auto-dialer 100, thus increasing the ease and convenience by which the auto-dialer 100 can be programmed or re-programmed, Fifth, when the auto-dialer 100 is programmed to operate in, e.g. a country where it is known that speech decoding equipment has not yet been installed, the auto-dialer 100 can continue to be fully functional as a non-voice controlled device. Sixth, it eliminates the need for one or more databases to store the voice files of all authorized users, thus vastly reducing the cost of implementing voice processing, while providing its user-perceived conveniences. Lastly, as the user's instructions are not voice dependent, when new features are added to the switching system of the present invention, the user is able to access them, without the requirement of recording a new voice instruction, thus reducing costs, and increasing the likelihood that a user will take advantage of them.

As discussed above, in one embodiment, the data which is generated by the auto-dialer 100 and decoded by the switching service according to the present invention is a function of the system-clock and random number generator output, thus making a tape recording of the auto-dialer's output unusable for more than a brief period of time. Additional security methods may also be used with either voice dependent or voice independent processing systems.

The first such method involves the storage of the actual time of the voice sample or provided voice instruction in the case of a voice independent use. As it is practically impossible for a human to speak the same phrase in the same amount of time, where time is resolved by, e.g., 50,000 slices per second, the repetition of a phrase within say 10 milliseconds would clearly indicate a recording. As the voice to noise ratio must be substantial, there should be no difficulty in discerning the beginning of the speech pattern nor its end.

As it is equally unlikely that a person can speak the same word identically in each case, even a cursory quantification of the incoming speech pattern should be stored as to avoid possible tape recording. To decrease the number of errors associated with the use of such a system, the overall level not be the only signal characteristic measured. Instead, it is recommended that the frequency span of, e.g., 5 Hz, with the highest level be quantified and stored. In the event of a repetition of the level of the identical frequency span, one can assume that a recording is in use.

The signal to noise ratio, by itself, may also be used as a reasonable indicator of potential recording as the level of a speaker's output will normally vary.

Whether the auto-dialer 100 is to enable access to a speaker dependent or independent switching system according to the present invention, the opportunity arises for new uses of voice independent speech processing, particularly when the auto-dialer 100 is used to segment language and dialects so as to reduce error rates. For many marketing companies, having a single world-wide access system is advantageous. Equipped with the auto-dialer 100, a user might be able to say, e.g., the name of a device provider from anywhere in the world, and be connected to the service providers nearest location, with, e.g., the call being answered in the native tongue of the caller, with the telephone representative being able to have a screen-full of data about the person placing the call in front of him when answering.

Alternatively, it provides the opportunity for the service provider, according to the present invention the opportunity to be of further service to the customer by handling information requests, e.g., a request to call a particular individual. In those cases where the user's identity has been reasonably verified, i.e., when calling a bank to get balance information, providing a telephone confirmation to the tax collectors regarding the filing of an electronic tax return, the switching office can, when the destination call is noted to require such verification, require the user to provide one or more PINs before connecting the call.

Another embodiment of the auto-dialer 100 is designed for providing a non-portable means of identifying a user and providing access to an switching system. In this case, the auto-dialer 100 is a small rectangular container which contains a similar processor to that which is required to perform the same functions as the auto-dialer 100 except that there is no display, and no input controls. In accordance with such an embodiment, the device has two ports, e.g., RJ11 inputs; one leads to a telephone and the other leads to the wall. The device is battery powered, though its power is fully isolated from the telephone line.

During use of the device according to such an embodiment, the invention performs the following functions: whenever the telephone goes off hook, it awakens from a quiescent state and turns on its DTMF detector so as to enable the circuit to sense a predetermined tone-set from the attached phone, e.g. **1. Upon sensing this tone-set, it initiates a call to a switching system according to the present invention, using an access number, if appropriate, which will provide the switching system with a pre-alert as to the language and dialect of the user. Upon sensing the ready state by the switching system, by its receipt of a DTMF signal, it transmits the data, using the standard transmission protocol (e.g. indexed DTMF, indexed non-DTMF) relating to the user who was identified by the device, including, as applicable, the voice file, the speed dial list , and other appropriate information. Upon the conclusion of its transmission, the device resumes its quiescent state, awaiting an off-hook condition which is not preceded by a ring voltage.

This embodiment includes the storage facility and the ability to transmit different data for each different person for more than one individual based on their individual access number (e.g. 1, 2, etc.), and, in a similar embodiment, can monitor and transmit over a multitude of lines. Alternatively, the device can be designed such that it would be centrally located and be accessible by any phone connected to the same circuit.

As described above, the provision of calling-individual information provides substantial opportunities to enable voice command calling. Although each telephone call carries with it the calling party phone number which can be received by interfacing switching equipment, the fact that a call came from one line does not indicate the specific individual making the call. In many large businesses, even when an individual is assigned a telephone number, rarely, is an outgoing call carried on the same telephone line as might be assigned to the individual. This is primarily due to the fact that most businesses find that they require less lines than telephones as rarely is everyone on the phone at the same time. Because switching equipment can match an available line to any requesting telephone, there is no need to dedicate any particular line to a particular telephone.

In yet another embodiment, a receiver device according to the present invention is mounted on the phone line and does not store any data, but, instead, provides a receptacle for the auto-dialer 100, such that the output of the auto-dialer 100 is focused into a cavity which contains an interface (e.g. speaker, microphone, light emitter, receiver). Additional significant hardware contained in the receiver device would include a processor and a DTMF detector. In use, when the electrically coupled receiver device senses a pre-defined combination of tones, e.g. *11, it provides a signal, e.g., an acoustic or light based signal, to the auto-dialer 100 to cause it to transmit, e.g., acoustic or light signals, to the receiver or base device which, in turn, converts the signals into the standard transmission protocol established for this purpose.

While this receiver device, i.e., base unit embodiment is designed to accommodate one person, it provides an easy way for an individual, perhaps, in an office, to identify himself remotely, without the necessity of having to duplicate the intelligent portion of the auto-dialer 100 in order to provide the user with the flexibility that the auto-dialer 100 can provide once the data contained in the receiver device has been transmitted, and, as appropriate, the user authenticated.

In the event that the receiver device is to be used in conjunction with facility access, the interfacing equipment can, if so enabled, provide a system-clock based set of codes to the auto-dialer 100 which will prompt the auto-dialer to respond, using a similarly system-clock based set of tones, e.g., indexed DTMF tones, related to the particular set of biometric aspects which the interfacing equipment has requested and may be stored within the auto-dialer 100. The transmission of such information may be based on the presence of additional data in the receiver device which indicates that the provision of this data to the particular interfacing equipment is permitted, and thus, eliminate the possibility that the receiver device will provide such data to another, unauthorized interfacing device which makes a request for such biometric data. In this way, the interfacing access system will only receive such biometric data when the receiver device has been programmed to transmit the data to the particular access system.

The use of voice and other biometric aspects of a user can provide additional secure access methods and convenience without the requirement that the user carry multiple access cards or devices, while eliminating the requirement that interfacing equipment store or access data for each potential permitted individual.

Additionally, because the device requires a system-clock coordinated program to install either a voice sample or other biometric sample, and in some cases knowledge of information held in each auto-dialer 100 which is never transmitted in any form or otherwise available to the public, e.g., a device number or data relating to a particular application, it is much less unlikely that the corruption of this system will occur.

Finally, because the auto-dialer 100 can transmit the biometric data to the interfacing equipment, and the person using the auto-dialer 100 is, in theory, present at the time of the access request, there is a reduced requirement as to the level of biometric file detail which is needed for validating the access request, or the scrutiny which must be applied to the information. As was discussed earlier, the likelihood that an impostor could have possession of the auto-dialer 100, know all three of the keywords and their associated PINs, and have a voice quality, retina shape, fingerprint or facial construction reasonably similar to that which is indicated from the data held in the auto-dialer 100, is not great. Because of the availability of other methods of preventing the use of recordings as a substitute for an authorized voice, and similar techniques known to prevent duplication of other biometric features, it is reasonable to reduce the level of file detail which is used when the auto-dialer 100 is used to control access to a facility.

Alternatively, in some cases, it may be appropriate to use the data of the auto-dialer 100, or an aspect thereof, to provide the basis for a system look-up of biometric or voice data related to the presumed user of the system. In this manner, the data which is transmitted from the auto-dialer 100 may include an alpha and/or numeric string of data which the interfacing equipment will use as the basis of accessing a record or group of records which contain voice or other biometric details of the user. In this manner, the requirement for manual input of identification to initiate the access of the relevant records is eliminated and results in a faster, less error-prone access system to such records.

In yet another embodiment of the present invention, the RAM 108 is programmed to store information needed to generate a visual representation of the authorized user of the device. In response to a command to output such data, e.g., the activation of one or more control keys by the user or the receipt of a particular stored set of DTMF tones representing a command to output the data, the auto-dialer 100 will generate a series of, e.g., encoded DTMF tones which represent stored data needed to generate the visual representation of the authorized user. A device receiving such information may decode the image information and generate a visual representation of the authorized user. Because the auto-dialer 100 can transmit such data over standard telephone lines, the ultimate device receiving and displaying the representation of the user may be located at a location which is remote to the auto-dialer 100. This feature may be used as part of a security system wherein it is important to obtain data that can be used to visually confirm a person's identity or in conjunction with an emergency, e.g., a 911 system, such that the receiving station would be able to receive an a physical representation of the user/caller, thus enabling the location of such person in distress. This feature may be particularly significant with auto-dialers designed for use by smaller children who, if in distress could quickly transmit a physical representation, rather than attempting to rely on the youngster to provide information (e.g. hair color, height weight, etc.).

For computer database access, the use of voice recognition in conjunction with the system described above, a conventional telephone or, more simply, a small microphone with interfacing circuitry, would be connected to the alternate RJ11 port of the enhanced modem. Following the connection to the enhanced switching system by the method described earlier, and the transmission from the enhanced modem, based upon its earlier receipt of a processed voice file which the user provided in the initialization procedure, to the switching system, with its ability to provide voice recognition, the RJ11 port into which the requesting user's telephone or microphone is connected, would be electrified, and, at which time the user would be provided with a voice or screen prompt indicating that the user should pronounce one or more of those voice samples which the switching system could evaluate. Upon satisfaction that the currently provided voice sample reasonably matches that which had been recorded earlier, the process of querying the target database can continue, and if appropriate, connection among the requesting user and the tarpet database is completed. By the central provision of voice processing as a method of screening access users, substantial economic advantages are provided to each of the target databases, each of whom would save the cost of such an installation and requisite set-up costs for each user, etc.

F. PIN Scheme

While the auto-dialer 100 of the present invention can be programmed to work with a variety of known personal identification number (PIN) schemes, both as a method of controlling access to data within the auto-dialer 100, as well as a method to provide access to security interfacing devices, it may also be used with the new and novel PIN scheme of the present invention.

In accordance with the PIN scheme of the present invention, a user is required to select a plurality of different PINs with each PIN being associated with a keyword or phrase that the user may also select. The keyword or phrase is intended to help remind the user of the PIN. For example, a user may select his social security number as a PIN that is to be associated with the phrase "social security" or a user may select the street number of his residence as a PIN to be associated with the keyword "house".

Once a user selects a plurality of such PIN numbers and associated phrases, the PIN numbers and phrases are stored in the auto-dialer's memory at, for example, the time the device is initialized by being programmed with user specific data.

In this manner, as with the voice recognition security scheme described above, the auto-dialer 100 is used to store important identification information, i.e., the key words and phrases and PIN numbers associated therewith, alleviating the need for storage of this information at the service facility or device which is being contacted by the auto-dialer 100.

In accordance with the PIN scheme of the present invention, when placing a call to a destination number not on a preprogrammed speed dial list stored in the RAM 108, or initiating another transaction, the auto-dialer 100 transmits to the service receiving the call, the stored list of key words and phrases and the PIN numbers associated with the key words and phrases. The transmission of this information is done in an encrypted form, e.g., by using the DTMF data encoding scheme of the present invention, to prevent an unauthorized user from learning the PIN number information.

After receiving the list of key words and phrases, and PIN numbers associated therewith, the service receiving the call selects one of the key words or phrases and prompts, e.g., by a voice request, the auto-dialer user to supply the PIN number associated with the selected key word or phrase. The user may supply the requested PIN number by using, e.g., the keypad of the telephone which is being used to make the call. Alternatively, if the service facility is capable of receiving and interpreting voice data, the user may provide a voice response to the offered key word.

In accordance with the present invention, if the user provides the correct PIN number in response to the prompt, the desired action, e.g. placement of a call, is performed.

However, if the wrong PIN number is provided, the user is given a second prompt to enter the requested PIN again and to enter a second PIN associated with a second key word or phrase selected from those supplied by the auto-dialer 100. Only upon entry of the correct first and second requested PINs is the user given access to the requested service.

If the user fails to enter correct PINs in response to the second request, the user is given another prompt requesting that the user enter the first two PINs that were requested as well as the PIN associated with a third key word or phrase selected from the list supplied by the auto-dialer 100.

If the user enters all three requested PIN numbers in response to the third prompt the user is given access to the requested service, e.g., the desired call or transaction is completed.

However, in the event that the user fails to provide three correct PINs in response to the third prompt, the user is given no more chances to enter PINs.

In response to the third failed attempt to enter the requested PINs, the user is instructed to place the auto-dialer 100 in close proximity to the speaker of the telephone. An acoustic signal is then sent to the auto-dialer 100 instructing it to deactivate itself. In addition, the records of the central office are updated to indicate that the auto-dialer 100, which was used to place the unsuccessful call, is not longer an authorized device. This prevents the particular auto-dialer 100, which was being used by an apparently unauthorized user, from being used again in the future to place calls unless it is reactivated by, e.g., the central office. Additionally, or alternatively, the service provider may mark its records to disallow any further requests from the particular auto-dialer 100.

After the tone to deactivate the auto-dialer 100 is transmitted, the user attempting to place the call with the auto-dialer 100, is instructed to call a central service office to have the auto-dialer 100 reactivated.

Upon contacting the central service office further steps can be taken to determine if the auto-dialer 100 was stolen or if the user merely had difficulty entering the correct PINs for some other reason. Since the auto-dialer 100 can be reactivated via, e.g., an acoustic command signal which can be received from a standard telephone, the auto-dialer 100 can be readily reactivated by the central service office when the authorized user calls requesting such re-activation.

In another embodiment, the key words or phrases and associated PIN information is not transmitted to the switching service receiving the call. Instead, when a user attempts to use a function which is protected by this security method, the auto-dialer 100 uses its pseudo random number generator to select a keyword or phrase from the list of words and phrases stored in the auto-dialer's memory. The user is then prompted by, e.g., displaying the selected key word and phrase on the device 202. The auto-dialer 100 then selects a set of numeric sequences to serve as a list of possible PIN numbers. The list of possible PIN numbers associated with the key word or phrase is then displayed, with the correct PIN with the list serving as camouflage for the valid PIN.

The user is then required to scroll to the correct PIN number from the list of PINs, by, e.g., using the keys of the input device 105, before the user will be permitted to place a call or access a protected function. To facilitate this process, in one embodiment, the placement of the correct PIN can be 'locked' into place, such that the user, when seeing a particular key-word, will, by memory, know that the correct PIN is situated in a particular place, e.g., two button presses of the left key.

In the event that an incorrect PIN is selected as a response, the user is prompted a second and a third time, if necessary, as previously described above. In the event that the user fails to respond with all the requested PINs in response to the third prompt, the auto-dialer 100 will deactivate itself and give the user a message to contact a service center as previously described.

While the above described PIN security method of the present invention requires a user to remember more then a single PIN number, the keyword or phase memory association feature makes it easy for an authorized user to remember the required PIN numbers.

While it might at first appear that the above PIN security method makes it easier for an unauthorized user to guess the correct PIN number, it should be noted that because multiple PIN numbers are used and there is no fixed pattern in which they will be requested, it is unlikely that an unauthorized user will be able to repeatedly guess the correct PIN numbers.

Furthermore, the fact that the auto-dialer 100 is designed to deactivate itself in response to multiple failed attempts to select a correct PIN number in response to a prompt or in response to a signal from the central office, until being reactivated by, e.g., entry of a re-activation code in the form of a pre-selected sequence of DTMF signals, greatly decreases the chances of an unauthorized user being able to use the auto-dialer 100 to make multiple calls even after guessing one or two PIN numbers.

The incorporation of on-device security, such as the above-described embodiment, does not preclude the use of the same techniques when the auto-dialer 100 is in communications with a switching office. In fact, the present invention anticipates that in some cases the same method will be used in different situations. For example, in one embodiment when the auto-dialer 100 is directed to initiate a call to switching office, the data relating to user's selections of keywords and associated PINs is also transmitted using the indexed tone system. If the switching service requires further identity verification prior to the placement of the call, it will select one of the keywords and its associated PINs and provide a voice prompt for the user to enter, or speak, the correct PIN.

By the use of a common method of securing the use of the auto-dialer 100 for preprogrammed uses, both on-device and through voice prompts when connected to a switching office, ease of use is enhanced without diminishing the security needed to protect the information contained within the auto-dialer 100. Additionally, it permits the use of the auto-dialer 100 for secured transaction with off-line system which may not have the ability to provide voice prompts, e.g. current debit/credit card input devices.

G. Use of Input Keys to Enable Auto-dialer Operation

While the use of PIN numbers and PIN security methods adds a degree of security to various transactions involving the use of the auto-dialer 100, in one embodiment the pressing of a sequence of buttons is used as a password to enable the operation of one or more features associated with the particular password or sequence of buttons. In such an embodiment, a sequence of buttons which are, e.g., part of the input device and selected by, e.g., the user, to be associated with all such secure functions of the auto-dialer 100 are stored in the RAM 108. Before a function associated with the password is enabled, the auto-dialer 100 requires a user to activate the stored sequence of buttons. If the stored sequence of buttons is entered, the auto-dialer 100 enables the associated function. However, if a user attempts to enable a function by pressing buttons in a sequence other than the selected stored sequence, and does this for more than X times, wherein X is a pre-selected integer, e.g., 3, the microprocessor 104 will disable the auto-dialer 100 until the device receives acoustic instructions, e.g., acoustic signals to enable the auto-dialer 100, from e.g., a central office responsible for maintaining records on the auto-dialers 100. Significantly, in this embodiment, the user is enabled to establish which aspects of the device function must be preceded by the entry of a particular password or sequence of buttons.

H. Additional Security Features

In addition to the PIN and other security schemes described above designed to reduce the number of unauthorized calls that are permitted to be completed, in accordance with one embodiment of the present invention, yet another screening technique is used.

In accordance with this embodiment of the present invention, a telephone switching office is designed to receive calls, e.g., placed with the auto-dialer 100, which are intended to be connected to the destination telephone numbers indicated by the caller. These destination telephone numbers may represent various service providers, e.g., telephone long distance carriers, computer networks, credit card companies, etc.

As discussed above, one problem is that such service providers, which may have a relatively limited number of telephone ports, are frequently overwhelmed by the number of calls generated by hackers trying to gain unauthorized access to the service provider.

In accordance with the present invention calls to multiple service providers must first pass through the central telephone switching office used to process calls from auto-dialers 100. The central telephone switching center, with its relatively large number of phone ports, provides a convenient point of intercepting many of the calls from hackers preventing them from jamming the smaller number of phone ports which may service providers have.

In accordance with the present invention, in one embodiment, this intercepting or screening function is provided by sorting calls to particular service providers, arranging identification information or other caller information into an orderly format suitable for using in a data base search.

After arranging the identification information or other caller information into the desired format, the central switching office contacts the service provider via, e.g., a dedicated high speed link, providing the information on the caller and requesting the service provider to indicate whether or not it wishes to service the call.

In response to the query by the central telephone switching office the service provider checks a database of authorized clientele to determine if the information provided by the central office indicates that an authorized user is calling or a hacker is calling. If, after a quick search of its database, it appears that an authorized user is attempting to call the service provider, the service provider indicates to the central telephone switching office that it will accept the call and the call is connected to one of the service provider's local telephone ports.

On the other hand, if the service provider indicates that it believes the caller to be a hacker, and therefore indicates it does not want to accept the call, the call is not connected to the service providers local telephone port. Instead, the central telephone switching office traces the call and/or takes other action appropriate for dealing with the caller who is believed to be a hacker.

While the above scheme requires a communication link or telephone connection between the central telephone switching office and the service provider, it does not require the service provider to support the number of telephone ports that would otherwise be required to deal with telephone calls from hackers.

Accordingly the above described method of filtering or intercepting calls before they reach the local telephone ports of telephone service providers offers potential cost advantages by reducing the amount of telephone equipment the service provider must purchase.

II. Use of Non-Standard Signals

In yet another embodiment of the present invention, after the auto-dialer 100 connects to, e.g., the local telephone switching office which, in response to the signals of the auto-dialer 100, creates the first connection, to a service provider, e.g., a long distance carrier designed to operate with the auto-dialer 100, the auto-dialer 100 stops transmitting data using standard, unencoded DTMF signals and by the use of switches to another data format to transmit data, such as billing information, e.g., encoded DTMF signals or signals of a frequency other than standard DTMF, to the service provider. For example, the auto-dialer 100 may begin placing a call by outputting the necessary DTMF signals required to connect to a selected long distance carrier. Once connected to the selected long distance carrier, assuming that at the time that the auto-dialer 100 was programmed, the long distance carrier was known to be capable of decoding encoded DTMF signals and/or signals of non-DTMF frequencies, the auto-dialer 100 transmits billing data in the form of tone pairs' comprising tones having a multiple of the normal number of frequencies used for standard DTMF tones. Such signals which are non-standard DTMF signals, may be generated with relative ease using the same basic circuitry used to generate standard DTMF tones. However, because of the tones non-standard frequency, they will not be recognizable to standard telephone switching circuitry making the data represented by the non-standard DTMF tones more difficult to interpret and use in later unauthorized transactions. There are numerous advantages in using non-standard frequencies. First, they are not easily created using conventional phone equipment or modems, thus creating a reduction in the likelihood of fraud. Second, is the much greater data transmission speed that can be achieved using more than two simultaneously transmitted frequencies. In fact, four frequencies, can transmit data at many times the rate which can be achieved with two frequencies, assuming that the frequency ranges can vary throughout the full voice band (avoiding those frequencies which are already reserved for in-band signaling). As a result of the increased speed, less time is required to transmit data, thus reducing the cost of the call.

III. Convenience Features

It should be noted that while the numerous above described features of the auto-dialer 100 are directed primarily to security concerns, many of the features make the auto-dialer 100 easier to use than the manual alternatives.

Referring now to FIGS. 10A, 10B, 10C, 10D and 10E which show various views of an auto-dialer 100 implemented in accordance with one exemplary embodiment of the present invention, some of the convenience features resulting from the general shape of the auto-dialer housing 101 will be described.

Referring not to FIG. 10A there is illustrated a bottom planar view of the auto-dialer housing 101. As illustrated the housing comprises the head portion 130 which has a generally circular appearance when viewed from above or below, an elongated handle section 140, audio output ports or openings 150 and a depression or indentation 141 used for centering the auto-dialer 100 with a matching housing of e.g., an automatic teller machine. In addition, the housing includes a light reflective surface 160. The auto-dialer housing 101 also includes a ring collar 170 which can be attached to, e.g., a key ring for convenient storage.

As described above, the generally small size of the head portion 130 facilitates alignment of the auto-dialer 100 with the center of the microphone of a handset 121 while the indentation 141 aids in inserting the auto-dialer 100 with a corresponding housing on a receiver of a device which is designed to receive data from the auto-dialer 100.

Figure 10B:
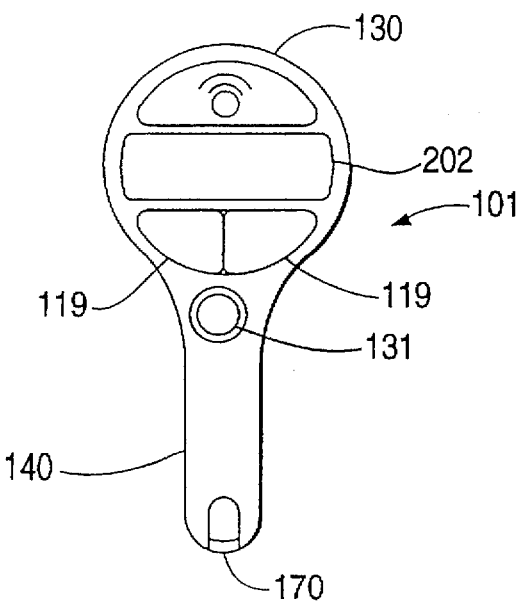
FIG. 10B is an illustration of a top view of the auto-dialer illustrated in FIG. 10A.

Referring now briefly to FIG. 10B there is illustrated a top view of the auto-dialer housing 101. From this view, the switch 131 which can be depressed to activate the auto-dialer 100 or to select an item highlighted in the display screen 202 can be seen. Scroll buttons 119 which can be used to cause the screen display to scroll is also illustrated. To facilitate easy one handed operation of the switch 131 and/or scroll buttons 119 using the same hand used to hold the autodialer 100, the scroll buttons 119 and switch 131 are located on the top side of the housing 101 within 6 centimeters of the end of the housing's elongated handle.

The display device 202 is visible from the top thereby permitting a user to see messages and other indications of activity while the auto-dialer 100 is positioned in close proximity to the speaker or microphone of the telephone handset.

Referring now to FIG. 10C a side view of the auto-dialer housing 101 is illustrated. From this view, the generally slender shape of the auto-dialer 100 can be seen. As illustrated, in one exemplary embodiment, the auto-dialer 100 is approximately 7 cm long and 1.65 cm wide. This small size and slender shape make the auto-dialer 100 easy to hold in a single hand and to transport and store in a pocket of a users shirt or pants.

Referring now to FIG. 10D, a cut away side view of the auto-dialer 100 is shown. The general internal arrangement of the elements which comprise the auto-dialer 100 are visible from this view. In the illustrated embodiment, a circuit board 117 is used to mount the microprocessor 104 and other circuitry previously described. A liquid crystal display 202 is mounted above the circuit board 117 and below a clear plastic window 201 located in the top of the of the housing 101.

The speaker/microphone 114 is positioned over the openings 150 and in electrical contact with the circuit board 117. The main battery 208 is located between the circuit board 117 and the speaker/microphone 114 as illustrated.

To protect the contents of the housing from water and dirt, a water resistant membrane 190 is positioned between the speaker/microphone 114 and the openings 150 to prevent water from entering the inside of the housing 101 while permitting sound to exist the housing 101 through the openings 150. In addition, rubber gaskets and device control keys 105 are used to prevent entry of dirt and water from the top side of the auto-dialer housing 101.

To provide a convenient way of storing the auto-dialer 100 on, e.g., a key chain, the housing 101 includes a rotating ring collar 170.

One significant convenience feature of the present invention has to do with its physical shape which permits it to be stored on a key chain such as the key chain 125 illustrated in FIG. 10E. As illustrated in FIG. 10E, the auto-dialer case 101 includes ring collar 170 in the elongated portion 140 of the housing 101 which extends from the generally saucer shaped head portion 130.

Studies have shown that most people are far less apt to forget to take their keys with them when they go out shopping, to the office, etc., than they are to forget their wallets or a specific card usually contained in the wallet. Furthermore, when they do forget their keys, they are frequently reminded to return to the place where they left them as soon as they are unable to open their car, house, or office door because they left their keys behind. Comparatively, people often leave credit/debit cards behind following their use, and tend to take much longer to recall the absence of the card than key rings that are left behind.

The auto-dialer 100 of the present invention takes advantage of this relatively unique aspect associated with key rings by being designed to be mounted on a key ring 125. In this manner, the auto-dialer 100 is designed to be as readily accessible as standard keys 127 on a key ring and to move from place to place with the authorized user the same as an ordinary physical key 127.

The small size of the auto-dialer 100 and relatively smooth yet durable surface which may be made of plastic or other suitable material also facilitates the transportation and storage of the device. For example, the device may be stored in a persons pocket and transported from place to place as the user moves throughout the day in the same manner as a standard mechanical key can be moved about.

The generally water resistant construction of the housing 101 provides yet another convenience feature in that a person need not be concerned about taking the device to wet or damp locations which might prove damaging to other electrical devices.

Accordingly, it is apparent that the size, shape and durable nature of the housing 101 used to house the auto-dialer 100 all provide the convenience of portability and low maintenance.

The relatively limited number of buttons 131, 119 used to operate the auto-dialer 100, e.g., less than 5 buttons, provides yet another convenience advantage, i.e., control simplicity. Furthermore, because of the auto-dialer's shape and positioning of the control buttons 131, 119 it is relatively easy to operate the auto-dialer 100 using a single hand by scrolling to desired options displayed in the display 202 and selecting the option or telephone number selected by pressing the button 131.

Accordingly, the auto-dialer's design illustrated in FIGS. 10A–10E provides a device that facilitates use by handicapped individuals who may find it difficult to operate devices with more keys or requiring two hands to use.

Other convenience features result not from the shape of the auto-dialer's case 101 but from its ability to provide data compression features. For example, because the auto-dialer 100 is capable of encrypting or encoding calling card number information directly into a telephone number, the time required to place a call using a calling card number can be substantially reduced. Furthermore, the user need not remember the calling card number since it is programmed into the auto-dialer 100. In addition, since a user need not manually input telephone number and calling card number information, the chance of having to repeat a dialing sequence because of an input error is greatly reduced.

Furthermore, because the auto-dialer 100 can be programmed using acoustic signals, programming of the auto-dialer 100 can be performed via a standard telephone connection with a remote service center. Thus, a user need not program the auto-dialer 100 but merely has to call the remote service center and place the auto-dialer 100 in close proximity to the speaker of the telephone. The remote service center can than program the auto-dialer 100, by sending the auto-dialer a series of acoustic signals, in accordance with a user's request.

In addition to the convenience features already described, the auto-dialer 100 can be programmed to place international calls and to insert pauses, where required in a dialing sequence, to permit for proper telephone connections. The memory of the auto-dialer 100 can also be used to store international calling codes, area code, and other types of dialing information making it relatively easy for a user to place long distance calls from foreign countries.

While the security and other features of the present invention have been generally described above in regard to an auto-dialer embodiment. It is to be understood that the above described features can be incorporated into a wide variety of devices where security is of concern.

For example, the above described technique of encrypting data into standard DTMF signals and other signals comprising a series of tones may be used in a host of telephone, security and other communications applications. For example, features of the present invention may be included in telephones which are coupled electrically, as opposed to acoustically, to telephone lines.

In addition, the security features of the present invention may be incorporated into standard lock devices, computer network security devices and other systems where it may be useful to use a series of acoustic or electrical signals as an access key.

In one embodiment of the present invention some of the features described above are incorporated into a facsimile machine to provide a degree of security to insure that only the party or individual intended to receive a facsimile is in fact the party that receives the message.

In its most general form, the facsimile embodiment of the present invention includes a facsimile machine which transmits an identification code, e.g., the recipient's name, or the device number of the user's device, to a receiving facsimile machine. The code is used to identify the person or party to which the facsimile is directed. The transmitting facsimile machine may also transmit a specific PIN or other code which the receiving machine will require to be entered before the facsimile is printed out. In accordance with this facsimile embodiment, the facsimile machine receiving a facsimile message will store the message in electronic form, e.g., in memory or on a hard disk until it receives the proper PIN or code which matches the PIN or code transmitted with the message.

In this manner, only the person to which the facsimile message is directed, e.g., a person who knows the transmitted PIN or code will be able to print and read the transmitted message.

In accordance with the present invention the information identifying the person to whom the message is directed, the PIN, and/or other code transmitted to the receiving facsimile machine may be transmitted using the data encoding scheme, e.g., DTMF data encoding scheme, described above.

In addition, to provide a heightened degree of security, the PIN or code that must be entered into the receiving facsimile machine may also be an encoded DTMF signal which may be programmed into the auto-dialer 100 of the individual to whom the message is directed. To obtain a printout of the facsimile message, the user of the auto-dialer 100 can supply the PIN or code number required by the facsimile machine either acoustically or electrically using the auto-dialer 100 to generate the required encoded DTMF signal which would be programmed into the auto-dialer's memory.

In this manner, the auto-dialer 100 can be used as a key to enable the printout of facsimile messages from a secure facsimile machine in accordance with the described embodiment of the present invention.

Even where data security concerns are not significant, the data compression and other convenience features of the present invention make the present invention's various features suitable for incorporation into a number of consumer device, e.g., fax machines, computers, etc.

To facilitate the use of the auto-dialer 100 as a debit/credit card, e.g., in toll transactions, a secondary input/output device with a higher data rate than that of the acoustic coupling device may be incorporated into the auto-dialer 100. In one embodiment, an infrared transmitter/receiver device is incorporated into the auto-dialer 100 to provide for the rapid exchange of debit/credit information at toll booths and turnstiles. In accordance with this embodiment, a corresponding infrared receiver/transmitter device located at the toll booth or turnstile is used to interact with the auto-dialer 100 and to credit or debit money to an account maintained for the purposes of toll payment.

In another embodiment the auto-dialer 100 includes a secondary input device for acquiring user-related data, as opposed to data which otherwise would be stored in the ROM 106. In such an embodiment, the secondary input device may be coupled to a mated transmitter where the method of transmission is, e.g., modulated light signals, radio signals, or electrical signals transmitted to the device by a direct electrical coupling. For example, the connection of a modular jack of a handset to a compatible interface which is part of the auto-dialer 100 may be used as such a secondary data input.

In another embodiment, the auto-dialer 100, using either the acoustic communications method described above, or one or more of the secondary communications methods can be used as a portable automatic identification device. For example, upon receiving a package from a courier, a user could place the auto-dialer 100 within a proximate distance of the courier's data input equipment to record the user's name and other information. The emitted request from the courier's data-input device would use the data encryption method described above. In an embodiment where the data was encrypted or encoded using the auto-dialer's system clock, the received data would be system-clock dependent, thus substantially avoiding the risk of forgery associated with current signature based identification systems. If further certainty was required as to the receiving person's identity, as might be the case with valuable papers, the requesting interface equipment could send a request to the user's auto-dialer 100 which would require that the user unlock the auto-dialer 100 using any one of the many methods described earlier. Through the use of the auto-dialer 100 as a portable, digital identification device, the current practice of storing paper to preserve a person's signature could be eliminated.

The advantage of using the auto-dialer 100 as a portable identification device is also useful in controlling access to electronic documents among computers when it is advantageous to have, at the receiving end, some degree of certainty as to a user's identity, and, when appropriate, the ability to have a higher level of certainty which can be accomplished through the use of voice verification or other security features as discussed above.

The use of the auto-dialer 100 to facilitate transactions in a secure manner has been discussed at length above. The practical convenience of the auto-dialer 100 as both an on-line and off-line transaction device enables substantial advantages to both the user and the counter-party. In an on-line environment, where substantial data regarding the user is available, the processing of the transaction is enabled by the auto-dialer's ability to quickly and securely transmit that information which is needed for the interfacing equipment to locate the relevant records, and make those computations and database searches which relate to the transaction. Since the auto-dialer 100 communicates on a non-contact basis using, e.g., sound, light, etc., the interfacing equipment to transmit such data is less expansive, more reliable, and easier to maintain than that which is needed with magnetically-stripped plastic cards which store information on magnetic strips with their inherent limitation for data storage.

It is widely known that the cost of on-line transactions, e.g., interactive computer transactions is expensive. In many transactions, on-line or real time processing of data or requests is unnecessary. However, on-line transactions make it possible to use a centralized data base with a higher degree of security than can be associated with de-centralized processing of information, e.g., credit and debit information. Since the auto-dialer 100 provides substantial protection against both fraudulent use and tampering, the auto-dialer 100 can be used for secure transactions and debit/credit processing without the need for a centralized secure data base which might otherwise be required to achieve the same level of security. Further, its use as a transaction instrument for over the phone transactions, without the need for any local interfacing equipment, other than a telephone, enables far more transactions to be handled in this manner, thus improving convenience for activities such as voting, bill payment, and other transactions currently requiring written signatures, personal appearance, or other means of identification not presently communicable, with certainty, over the phone or via facsimile machine.

The use of the auto-dialer 100 in on-line transactions, when compared with the common method of using magnetically-stripped plastic cards, with their vulnerability to be easily copied and read, their inherent ability to store substantial data, the physical vulnerability of the card to scratches, etc., is more convenient because one auto-dialer 100 can accommodate substantial, multiple purposes and data and because the auto-dialer 100 has inherent security features as discussed above.

IV. Additional Embodiments and Features

In addition to the above described embodiments, the auto-dialer 100 can be implemented as a pager or beeper device. Alternatively, only particular selected features of the auto-dialer 100 may be incorporated into a pager device. For example in one such embodiment, the display of the device comprises a screen suitable for displaying text messages. In such an embodiment, the microprocessor 104 decodes and displays messages and other data that is received, e.g., in the form of encrypted DTMF tones. In the more standard auto-dialer embodiment, a screen may also be included for the display of information and data.

As part of the central or local office computer system according to the present invention, a central office computer has the ability to receive, decode and process encrypted DTMF signals, the computer system may also include the necessary data transmission circuitry required to relay information received in encrypted DTMF signal form to a paging device. Such transmission may include the steps of decoding the data and then re-transmitting the data with the data being preceded by paging device address information.

While the above description of the present invention was discussed largely in terms of an auto-dialer embodiment, it will be apparent to those skilled in the art that the features of the present invention are not limited thereto but may be embodied in a wide variety of communication and other security devices. Accordingly, nothing in the above description is intended to limit the scope of the present invention to the auto-dialer embodiment described above. Furthermore, any reference to any specific set of tones, except as they may relate to those tones needed to establish the first link of a call, i.e. DTMF, should not be interpreted as the only frequencies or tone patterns which the features of the present invention are appropriate and useful.

It should be noted that the above headings provided in the detailed description of the patent application are merely provided as an aid to the reader of the detailed descriptions. It is intended that the various sections of the detailed description be read together and viewed as a whole for what they teach and describe of the present invention.

What is claimed is:

1. A remote access security device for transmitting user-associated data to a telephone service, comprising:

a system clock generating a system time;

a memory device storing data and a plurality of telephone numbers, each of the plurality of telephone numbers capable of accessing a telephone service at different predetermined times;

a processor electrically coupled to the system clock and the memory device, the processor selecting from the memory device, at a system time corresponding to one of the predetermined times, one of the plurality of telephone numbers which is presently capable of accessing the telephone service; and a tone generator electrically coupled to the processor, the tone generator generating a first set of tones representing the selected one of the plurality of telephone numbers to access the telephone service.

2. The remote access security device of claim 1, further comprising:

a number generator in electrical communication with the system clock, the memory device and the processor, the number generator using the system time to generate a predetermined number, wherein the processor selects the one of the plurality of telephone numbers which is presently capable of accessing the telephone service as a function of the predetermined number.

3. The remote access security device of claim 2, wherein the number generator is a pseudo random number generator, a random number generator or an incrementing register.

4. The remote access security device of claim 1, further comprising:

an input device electrically coupled to the processor, the input device being responsive to an input command to cause the processor to select the one of the plurality of telephone numbers which is presently capable of accessing the telephone service and to cause the tone generator to generate the first set of tones.

5. The remote access security device of claim 1, wherein the memory device includes a plurality of storage locations storing the plurality of telephone numbers.

6. The remote access security device of claim 5, wherein the number of telephone numbers in the plurality of telephone numbers is greater than 49.

7. The remote access security device of claim 5, wherein the number of telephone numbers in the plurality of telephone numbers is greater than 99.

8. The remote access security device of claim 1 wherein the system clock is calibrated with a system clock of the telephone service.

9. The remote access security device of claim 1 wherein after accessing the telephone service, the tone generator generates a second set of tones representing the stored data.

10. The remote access security device of claim 9 wherein the stored data is user identification information.

11. The remote access security device of claim 9 wherein the stored data is biometric identification information.

12. The remote access security device of claim 9 wherein the stored data is a user's voice file.

13. A method of limiting access to a telephone service which is remotely accessible using a communication system, comprising the steps of:

assigning a set of telephone numbers to a telephone service, the set of telephone numbers comprising a plurality of subsets, each subset being capable of accessing the telephone service at different predetermined times;

detecting a call made to a telephone number within the set of telephone numbers assigned to the telephone service, the detected call being received at one of the predetermined times;

determining the subset capable of accessing the telephone service at the predetermined time the call is received;

responding in a manner that can successfully complete the call when the telephone number is within the subset capable of accessing the telephone service at the predetermined time the call is received; and responding in a manner that inhibits successful completion of the call when the telephone number is outside the subset capable of accessing the telephone service at the predetermined time the call is received.

14. The method of claim 13, wherein the step of determining the subset capable of accessing the telephone service further comprises the steps of:

obtaining a system time from a clock; and processing the system time to determine the subset capable of accessing the telephone service at the predetermined time the call is received.

15. The method of claim 14 wherein the step of using the system time to determine the subset capable of accessing the telephone service further comprises the steps of:

generating a pseudo random number in response to the system time; and processing the generated pseudo random number to determine the subset capable of accessing the telephone service at the predetermined time the call is received.

* * * * *